United States Patent [19]
DeGeorge et al.

[11] Patent Number: 4,596,478
[45] Date of Patent: Jun. 24, 1986

[54] AUTOMATIC FORMAT, MODE CONTROL AND CODE CONVERSION FOR DATA PROCESSING AND PRINTING APPARATUS

[75] Inventors: Peter J. DeGeorge, Lexington, Ky.; Roger F. Ross; Donald E. Sims, both of Austin, Tex.

[73] Assignee: International Business Machines Corporation, Armonk, N.Y.

[21] Appl. No.: 228,733

[22] Filed: Feb. 23, 1972

Related U.S. Application Data

[63] Continuation of Ser. No. 871,424, Oct. 22, 1969, abandoned, which is a continuation-in-part of Ser. No. 609,670, Jan. 16, 1967, abandoned.

[51] Int. Cl.[4] .............................. B41J 11/44
[52] U.S. Cl. ..................... 400/76; 400/280; 400/281; 400/283; 400/314; 400/316; 235/432
[58] Field of Search ............... 197/16, 19, 20, 63, 197/65, 66, 176; 340/172.5; 400/279, 76, 280–281, 283, 314, 316; 235/432; 364/518

[56] References Cited

U.S. PATENT DOCUMENTS

| | | | |
|---|---|---|---|
| 2,164,422 | 7/1939 | Pitman | 197/63 |
| 2,919,002 | 12/1959 | Palmer | 197/16 |
| 3,040,859 | 6/1962 | Toeppen | 197/63 |
| 3,082,854 | 3/1963 | Becker et al. | 197/19 |
| 3,260,340 | 7/1966 | Locklar et al. | 197/19 |
| 3,297,124 | 1/1967 | Sims | 197/19 |
| 3,326,347 | 6/1967 | Danielson | 197/63 |
| 3,340,986 | 9/1967 | Adams et al. | 197/20 |
| 3,346,091 | 10/1967 | Cralle et al. | 197/176 |
| 3,579,193 | 5/1971 | Bernier | 197/19 X |

*Primary Examiner*—E. H. Eickholt
*Attorney, Agent, or Firm*—John L. Jackson

[57] ABSTRACT

The present invention is concerned with the control of the format of documents, such as letters, prepared automatically on a printer in response to code signals read from a record medium (magnetic storage medium), and to mode control means for associated apparatus. The invention concerns itself particularly with the handling of left margins and indentation levels for different paragraphs in a document especially when a document under preparation has line lengths that are either shorter or longer than the line lengths of an original document that was prepared concurrently with the storage of the coded signals on the record media. A preferred embodiment includes an input/output printer having a keyboard for entry of information and a single element print head for printing of information and an associated unit including an associated recorder for recording key entries as code signals on a magnetic tape record medium and an associated reader for subsequently reproducing the code signals for printing. Counter means are provided for controlling identation levels during playback of information from a magnetic tape. In a first version, the single element print head is returned all the way to the left margin and tab operations are performed to bring the print head to the beginning of the line for the individual paragraphs.

Provision is made for reading format, character, and functional code signals on a source media according to one indentation format, translating and printing characters according to another indentation format, and recording another media in accordance with the printer action by performing code conversion of signals.

53 Claims, 52 Drawing Figures

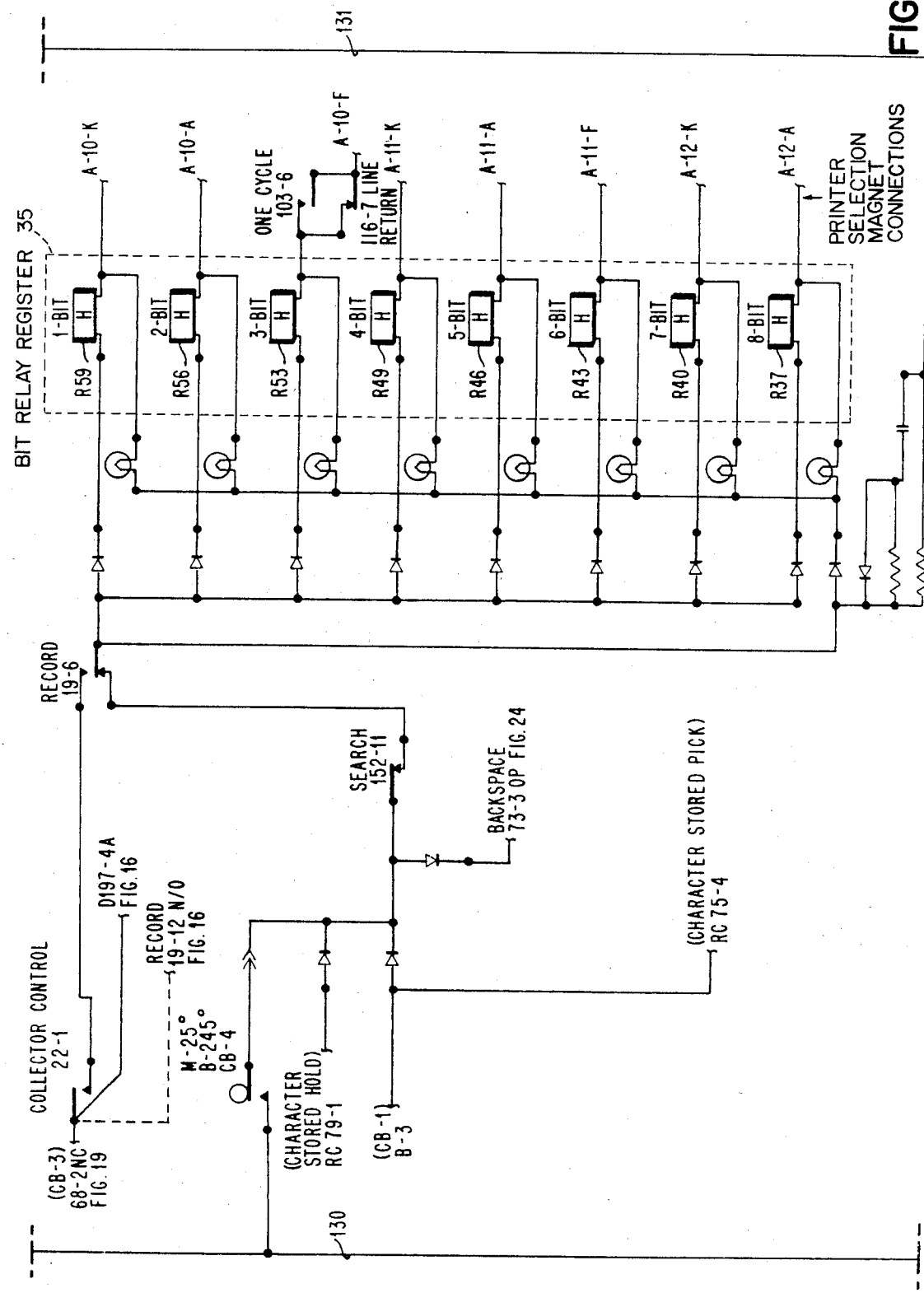

AUTOMATIC FORMAT, MODE CONTROL AND CODE CONVERSION FOR DATA PROCESSING AND PRINTING APPARATUS

PRIOR APPLICATIONS

This is a continuation of application Ser. No. 871,424, filed Oct. 22, 1969, now abandoned, which was a continuation-in-part of application Ser. No. 609,670, filed Jan. 16, 1967, and now abandoned.

CROSS-REFERENCES TO RELATED APPLICATIONS AND PATENTS

The following patents and applications are of interest, and are hereby incorporated by reference.

U.S. Pat. No. 3,260,340, Henry C. Locklar and Donald E. Sims, inventors; entitled "Revision System for Data Recording and Printing Apparatus."

U.S. Pat. No. 3,297,124, Donald E. Sims, inventor; entitled "Data Recording and Printing Apparatus Capable of Responding to Changed Format."

Application Ser. No. 555,091, filed June 3, 1966, Roger F. Ross, inventor, now U.S. Pat. No. 3,490,004, issued Jan. 13, 1970 entitled: "Data Processing and Printing Apparatus", assigned to the same assignee as the present application.

U.S. Pat. No. 2,919,002, L. E. Palmer, inventor; entitled "Selection Mechanism for a Single Printing Element Typewriter."

U.S. Pat. No. 3,082,854, F. E. Becker, et al, inventors; entitled "Typewriter Input Checking Mechanism."

OTHER REFERENCES

The following additional references are of interest;

IBM Customer Engineering Instruction Manual for the "Selectric"* Printer, Form Number 241-5032-2, dated January, 1966. (*Trademark).

IBM Customer Engineering Manual of Instruction for "Selectric" Input/Output Keyboard Printer, Form Number 241-5159, dated 1965.

IBM Customer Engineering Universal Reference Manual for "Selectric" Input/Output Keyboard Printer, Form Number 241-5182, dated June 30, 1963.

IBM Customer Engineering Instruction Manual for Magnetic Tape "Selectric" Typewriter (MT/ST), Form Number 241-5240.

IBM Customer Engineering Reference Manual for Magnetic Tape "Selectric" Typewriter (MT/ST), Form Number 241-5194.

BRIEF BACKGROUND OF INVENTION (1) Field

The field of art to which the invention pertains is automatic power printing or typewriting apparatus having provision for recording signals on an associated record media and for printing documents automatically in response to the signals as they are read from the media. Further, the invention relates particularly to the control of paragraph indentation levels as printing on documents proceeds during the playback of information from the storage media. This involves the establishment of left margins and indentation levels that may vary from paragraph to paragraph and that are primarily established under counter control.

(2) Prior Art

The Locklar, et al, Sims, and Ross patents, as well as the Palmer and Becker patents noted in the Cross Reference section above are considered to be the most direct prior art in so far as the teaching of a printer interconnected with a tape unit for recording code signals on a tape media in response to key depressions on the printer and for subsequently reproducing the code signals and supplying them to the printer for the automatic preparation of documents. During the preparation of conventional letterhead documents or documents, such as patent specifications, a left margin is usually selected and retained throughout the preparation of an individual document. There is seldom any requirement for changing of indentation levels of individual paragraphs as printing proceeds. Under these conditions, the apparatus disclosed in the cross references noted operate in a highly capable fashion and with considerable flexibility and speed.

Under some circumstances, a variety of paragraph indentation levels are required in the same document and it is this area of document preparation with which the present invention is concerned.

A number of other references are of interest in connection with the establishment of a plurality of left margins or indentation levels during the document preparation. Counter control of document format or indentation levels has been known but, to the present time, has been manually or semiautomatically oriented. In one case, for example, a counter is used to control tabulation in a printer in opposite directions but the count level is established by means of switches that are manually manipulated. In another case, a prewired program controls the establishment of appropriate left margins during the preparation of documents. To change the indentation or format control, it is necessary to rewire the program. In still another case, a counter controls the printing of characters from a memory at specific individual horizontal printing locations but is not operable to control paragraph indentation levels. In another prior art apparatus, character signals are derived from a perforated tape that also contains special carriage return codes that are recognized and that serve to select one of a plurality of left margins. As is evident, the codes are stored in a permanent fashion and a different punched sequence of left margin format or indentation operations requires the preparation of another tape record media.

The present inventive arrangements overcome much of the inflexibility of the prior art since counter means is provided that may be set up differently as typing proceeds during the preparation of any document and, in fact, during the printing of individual paragraphs.

SUMMARY

The handling of left margins and indentation levels when they differ from paragraph to paragraph and when a document is under preparation with line lengths that differ from those originally recorded on a record media has been attended with considerable difficulty in the prior art. In accordance with a preferred embodiment, as well as a number of other embodiments, the prior art difficulties are eliminated by providing counting means that is effective to establish the margins and indentation levels required in an automatic fashion as printing of a document proceeds. The tab operations during the printing of the first line of any individual paragraph are effective to establish a count level in a primary counter in the apparatus. The counting action is gated only as a result of the recognition of the termination of a previous paragraph and the fact that the first line of a new paragraph is in progress. Subsequently, the count stored in the primary counter is compared with tab operations accummulated in a secondary counter in order to insure that the print head returns to the same indentation level for each line of the paragraph currently being printed. In addition, provision is made for the recognition of special paragraph identification codes, other codes that control the adjustment of lines of information on individual documents, etc. In the preferred embodiment of the invention, the electronic controls are emphasized and no mechanical changes are proposed for the "Selectric" Printer in order to perform the operations required.

In a second embodiment of the invention, a counter retains the number of tab or indentation levels necessary as to each individual paragraph and a margin rack having a plurality of variable length left margin members thereon is selectively actuated under control of the counter to establish a particular one of the left margins as to each paragraph. In another embodiment, a counter also retains the number of indentation levels required for the individual paragraphs and cooperates with a program tape perforated in various channels to establish required indentation levels for individual paragraphs in a document.

In still another embodiment, the counter means is dispensed with and a follower is moved along with the carrier as tab operations occur to take up new left margin positions for individual paragraphs during printing. Predominantly mechanical, this version is still controlled by recognition of paragraph endings and the beginning of a first line of a new paragraph, as in the other embodiments.

When in an Adjust mode of operation, the printer and magnetic tape unit are operated so that the original format criteria on the magnetic tape are altered under control of the margins in the printer to establish new line lengths for a document. An advantage of the present invention, is that indentation levels are determined in a dynamic fashion while printing is in progress for each individual paragraph and using the codes, such as Carrier Return codes, that are normally encountered during the recording of information on the magnetic tape. In the preparation of letters, a single Carrier Return code normally occurs at the end of each line and two Carrier Return codes occur at the end of an individual paragraph. Accordingly, two Carrier Return codes indicate the end of one paragraph and the beginning of a new paragraph. Each Carrier Return code also effects an indexing operation on the printer thereby giving a double space between each successive paragraph. Under some circumstances, it may be convenient to have single spacing between paragraphs and in this event, according to the present invention, a special Paragraph Identification code is provided which effects only a single Carrier Return but which indicates the end of one paragraph and the beginning of the next. Also, other codes are provided including an Adjust On-Off code that is effective, when recognized, to reset the counter control means and thereby initiate a new indentation count operation to establish a new indentation level.

In addition, the Adjust On-Off code is available during normal operations of the equipment to change the mode of the equipment from an Adjust mode to a non-Adjust mode, as may be desired. This is particularly useful in the preparation of letters when heading information, such as a name and address, are to be printed exactly as they were recorded on the original tape and are not to be readjusted to conform with the longer lines in the body of the document.

As indicated, the equipment has provision for reading a tape record media to derive code signals and to supply the same to a printer for preparation of a document.

The configuration of the source of signals on the printer is not significant in practicing the present invention. Hence, the source may be a magnetic tape, a paper tape, a core memory or other source for retaining signals representative of data including characters to be printed and/or functions to be performed. The printer may have typebars or other printing means and a movable carriage, rather than a movable print head as in the "Selectric" printer.

In an Adjust mode, the actual document will usually differ from the originally recorded information. Therefore, the equipment has provision for establishing a Transfer mode wherein a new tape record media is prepared concurrently with the sensing of the signals from the original tape. It is desirable that the new tape reflect the actual printing including line endings, format signals, paragraph originations and terminations and the like, rather than the arrangement on the original tape. Due to the fact that the physical line length of the new document in an Adjust mode is different from the original length recorded on the original tape, it is necessary to convert certain codes, such as Carrier Return codes to Space codes, as appropriate, and Space codes to Carrier Return codes when they occur in the Region and effect a Carrier Return operation. Also, the Tab codes on the original tape will not be reliably positioned to effect the proper tabbing required for the document and for recording on the new tape. Accordingly, according to the present invention, a counter is set to a predetermined tab count condition corresponding to the indentation level required for an individual paragraph during the first line of printing of the paragraph and subsequently controls the actual tabbing required for the succeeding lines of the same paragraph. In addition, the counting means is effective to control the recording of Tab codes for each of the succeeding lines and to ignore the original Tab codes, when they occur on the original tape, unless they occur during the first line of the paragraph.

With the foregoing in mind, it is accordingly an object of the present invention to provide for the automatic establishment of margins and indentation levels during automatic document preparation.

Still another object of the invention is to enable the handling of a wide variety of paragraph formats during automatic document preparation when line lengths are readjusted from what they are on an original source document.

A further object of the present invention is to provide for establishment of document format control by making use of normally available code configurations.

Also, an object of the invention is to provide additional code configurations for specialized format conditions not normally encountered during document preparation.

A still further object of the present invention is to provide for automatic changes from an Adjust mode to a non-Adjust mode, and vice-versa, automatically as printing of a document proceeds in response to code signals recognized in a record media.

A still further object of the invention is to provide for flexible and dynamic document format control that is changeable from sentence-to-sentence or from paragraph-to-paragraph or any other information category, as required, during document preparation.

In addition, it is an object of the present invention to provide for automatic format control concurrently with the adjusted printing of information and code conversion operations required during the reading of a first tape and the preparation of a second tape.

Another object of the invention, is to provide for the preparation of a new record media that accurately reflects the operations and printing of a printer during preparation of a document.

Also, an object of the present invention is to provide for the conversion of regular printed characters encountered in an original tape under some conditions into tab operations and Tab characters to effect proper indentation levels under count control.

An additional object of the invention is to establish paragraph indentation control based on recognition of the termination of either the originally recorded first line of a paragraph or the actual line termination of a paragraph on a document, whichever occurs first.

The foregoing and other objects, features, and advantages of the invention will be apparent from the following more particular description of the various embodiments of the invention as illustrated in the accompanying drawing.

DESCRIPTION OF THE DRAWING

In the drawing:

FIGS. 14-34, when arranged as shown in FIG. 35, show detailed circuits involved in the various data handling and control aspects of the apparatus of FIG. 1.

DETAILED BACKGROUND FOR VARIOUS EMBODIMENTS

Basic Magnetic Tape "Selectric" Typewriter (MT/ST)

The invention has particular utility in connection with automatic printing apparatus having facilities for recording and reproducing information stored in coded form in a magnetic tape record media, such as the apparatus disclosed in the Locklar, et al, and the Sims patents cross-referenced above.

The apparatus disclosed in the Sims and Locklar, et al patents incorporates a single head printer that is interconnected for entry and printing purposes with a magnetic tape recording and reproducing unit. The printer is generally of the type disclosed in the Palmer patent as modified for input/output operation in the Becker patent. Reference is made to the "Selectric" manuals for structural and operational characteristics of the basic "Selectric" and the Input/Output "Selectric". The printer has the usual functional and informational character keys with a single printing element mounted on a carrier for escapement and printing movement adjacent to a stationary platen 360 that remains in a relative fixed location except for rotation during line spacing operations. The magnetic tape recording and reproducing unit has a number of control knobs and buttons for establishing Record, Playback, Transfer, and Adjust modes of operation, for entering particular character codes to which the magnetic tape unit is responsive, for selecting and initiating a Search operation for particular blocks of information stored on the magnetic record media, and various indicator lamps to indicate the status of the equipment.

System Description

Figure 1:
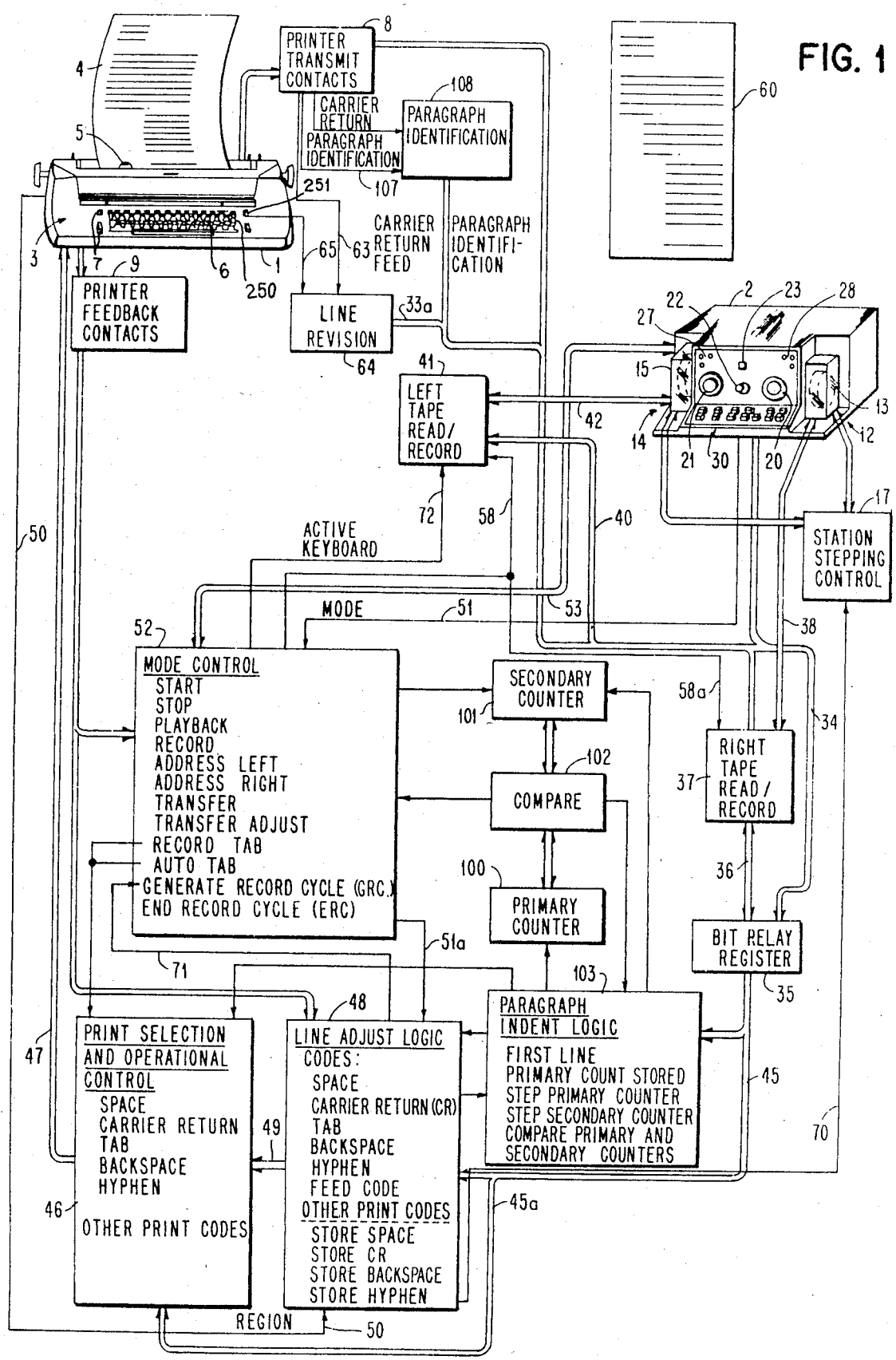
FIG. 1 is a system diagram of a tape recording-reproducing and printing apparatus embodying the principles of the present invention.

FIG. 1 illustrates a suggested arrangement of apparatus for practicing the present invention. The apparatus includes a printer 1 interconnected with a magnetic tape processing unit or means 2. Printer 1 has the usual keyboard 3 with data keys such as keys 6 for effecting printing of characters on a document 4 by operation of a single element print head 5, and functional keys such as keys 7 for selecting functional operations, such as Space, Backspace, Carrier Return, and Tab. During the selection of a character for printing, as well as during functional operations, printer transmit contacts in block 8 are operated to establish a coded configuration representative of the printer character or function involved. Also, during operation of printer 1, printer feedback contacts in block 9 are operated to transmit signals for control purposes. The printer feedback contacts included in block 9 are designated C1, C2 Print Feedback contacts, FIG. 19, C3 Upper Case contacts, FIG. 20b, C4 Lower Case contacts, FIG. 20b, C5 Tab, Space, and Backspace contacts, FIG. 19, and C6 Carrier Return contacts, FIG. 19. The printer 1, FIG. 1, also has Carrier Return interlock contacts 210, FIG. 19, and Tab interlock contacts 211, FIG. 20a.

Tape unit 2 has a right-hand tape station 12 with a magnetic tape cartridge 13 in position and a left-hand tape station 14 with a magnetic tape cartridge 15 in position. The tape stations 12 and 14 in tape unit 2 include facilities for recording and playing back coded characters on the magnetic media (tapes) in the cartridges 13 and 15, together with various tape loading, winding, rewinding and stepping mechanisms. Tape unit 2 has an associated stepping control block 17 for control of stepping of tape at right tape station 12 and left tape station 14. Tape unit 2 includes a control panel with a mode control knob 20. Mode control knob 20 ordinarily has positions for selecting Left Record, Right Record, Left Playback, Right Playback, Left Adjust, Right Adjust, Transfer Type, and Transfer Adjust. A Start Condition knob 21 controls the amount of data played back and has positions designated Auto Start, Auto, Line, Word, and Character. A Search knob 22 is rotated to select a particular block of information on one of the tapes as indicated in a reference number window 23. A number of indicator lamps at 27 and 28 indicate the status of the equipment. The tape unit 2 also has a number of control and encoding buttons generally indicated at 30. These include buttons designated Start, Stop, Skip, Search, Rewind, Line Return, Load, Backspace Code, Stop Code, Feed Code, Reference Code, Auto Search Code, Stop Transfer Code, Switch Code, and Unload. They control switches shown in FIG. 27.

Reference is made to the aforementioned patents and application for a complete description of the aforementioned various control buttons and other facilities associated with printer 1 and tape unit 2.

Various modes of operation of the apparatus are established, as appropriate, for recording and playing back information, primarily under control of mode control knob 20.

During a Record Left or Record Right mode, data characters and functional characters are supplied from the printer transmit contacts in block 8 or from the data encoding buttons 30 (shown in greater detail in FIG. 27) by cable 34 to a bit relay register 35, shown in more detail in FIG. 28. Register 35, FIG. 1, comprises the Relays R37, R40, R43, R46, R49, R53, R56, and R59, FIG. 28. The coded characters are then directed by cable 36 to the Right Tape Read/Record block 37 and by cable 38 to the right tape in cartridge 13, or by cable 40 to Left Tape Read/Record block 41 and by cable 42 to the left tape in cartridge 15.

During a Playback Left or Playback Right mode of operation, characters read from the right tape pass by cables 36 and 38 and Read/Record block 37, serving as an associated reading means, or by cables 40 and 42 and the Read/Record block 41 also serving as an associated reading means to bit relay register 35. The characters are then supplied by cables 45 and 45a to the Print Selection and Operational Control block 46 for operating printer 1 by cable 47.

During the Adjust Left, Adjust Right, or Transfer Adjust modes of operation, the characters are supplied by cable 45 to the Line Adjust logic 48 and then by cable 49 to operate the Print Selection and Operational Control block 46 in accordance with the line ending conditions indicated by "Region" signals supplied by line 50 from printer 1.

During a Transfer Type mode, characters are transferred from the right tape to the left tape without adjustment.

Mode control signals from tape unit 2, as established by mode control knob 20, are directed by lines 51 and 51a to the Mode Control block 52 and Line Adjust logic 48, respectively. Various controls of tape unit 2 are exerted by mode control 52 by cable 53. During any Transfer operation, including a Transfer Type mode and a Transfer Adjust mode, data read at the right-hand station 12 is supplied through the Read/Record block 37 and by cable 36 directly to the left tape Read/Record block 41 for recording on the magnetic tape at the left-hand station 14. Concurrently with the direct transfer of data from the right tape to the left tape, the data is also provided through the bit relay register 35 to the Print Selection and Operational Control block 46 either directly through cable 45a or when in an Adjust mode, through block 48 and cable 49. The Read/Record blocks 37 and 41 are conditioned for a Transfer operation by mode control signals on lines 58 and 58a.

As described in the Locklar, et al patent, whenever a Carrier Return button 250 is depressed on printer 1, a signal by line 63 controls the Line Revision circuit 64 to provide both a Carrier Return and a Feed code by cable 33a for recording on the tape selected at station 12 or 14. Later, the Feed code serves as a redundant code to which printer 1 is non-responsive and can be used for expanding the lines of information during revision procedures. Depression of a Carrier Return Revise button 251 on keyboard 3 supplies an indication by line 65 so that the Feed code is not recorded on the tape.

Information Category Selection

By setting the Start Condition knob 21, the apparatus is rendered effective during the Playback of information to select various types of data units, such as blocks, lines, words, and characters for reading and printing, thereby maintaining a measure of control by the operator for the addition, deletion, or correction of the information previously recorded. This capability is fully described in the Locklar, et al, patent.

Adjust and Transfer Adjust

The Sims patent describes apparatus of a comparable nature having provision for preparing documents automatically according to desired format arrangements that may be the same or different than the format arrangements established during the preparation of an original document. During the preparation of an original document and the recording of the related data on a magnetic tape, the lengths of lines are generally established by the left and right margin limits on the printer 1. During a subsequent playback of the recorded information, it may be desired to shorten or lengthen the lines of information. Accordingly, the left and right margin limits are repositioned to the desired line length. During playback, the data is printed according to the new format with the apparatus responding to recorded code combinations in different ways depending upon whether they are encountered in a line ending area referred to as the "Region," which is approximately 10 characters wide, or in an area outside the Region.

The automatic adjustment of lines of information is performed during a mode of operation referred to as the "Adjust" mode. The Adjust mode involves the playing back of one of the magnetic tapes at a right-hand station 12 or left-hand station 14 in the Sims apparatus as well as the apparatus described herein. During another mode of operation, referred to as "Transfer Adjust," the equipment reads a magnetic tape at the right-hand station 12, operates the printer 1 under control of the data and the functional codes encountered in the tape and concurrently records the information on another magnetic tape at the left-hand station 14. In order to establish a high-speed operation, and as fully described in the Ross U.S. Pat. No. 3,490,004, the data recorded passes through electronic logic directly from the right-hand tape station 12 to the left-hand tape station 14, and in general, duplicates the data originally recorded on the right-hand tape. That is, the codes read at the right-hand station 12 are recorded on the left-hand tape with no modification or conversion. However, new entries may be made from the printer keyboard 3 onto the left-hand tape.

During the Adjust or Transfer modes, the response of the printer 1 varies depending upon whether the print head 5 is or is not, in the line ending Region. As an example, a Carrier Return code encountered in the Region effects a Carrier Return operation of the printer 1, while the same Carrier Return code encountered outside the Region effects a space operation of the printer 1. As another example, a Space code in the Region effects a Carrier Return operation of the printer 1, while a Space code outside the Region results in a normal space operation. In a Transfer Adjust mode of operation, while the printer 1 responds differently to the code combinations encountered in order to adjust the printed lines of information, no such variable response is provided for the recording of characters in the left-hand tape in response to characters read in the right-hand tape.

For reference purposes, the Line Adjust logic described in the Sims U.S. Pat. No. 3,297,124 is set forth in the following Table A.

TABLE A

LINE ADJUST LOGIC

| Code Sequence | Codes on Tape | TYPEWRITER ACTION | |
|---|---|---|---|
| | | No Line Ending Condition | Line Ending Condition |
| A-1 | Successive Carrier Returns | Space, Successive Carrier Returns | Normal |
| A-2 | CR,TAB(S) | SP,CR,TAB(S) | Normal |
| A-3 | CH,SPACE(S) SP,CH | Normal | CH,SPACE(S),SP, CR,CH |
| A-4 | CH,SPACE(S), CR,CH | CH,SPACE(S) SP,CH | Normal |
| A-5 | CH,SP,CH | Normal | CH,SP,CR,CH |
| A-6 | CH,CR,CH | CH,SP,CH | Normal |
| A-7 | CH,SP,HYP(S), SP,CH | Normal | CH,SP,HYP(S), SP,CR,CH |
| A-8 | CH,SP,HYP(S), SP,CR,CH | CH,SP,HYP(S), SP,CH | Normal |
| A-9 | CH,HYP(S),CH | Normal | CH,HYP(S),CR,CH |
| A-10 | CH,HYP(S), CR,CH | CH,HYP(S),CH | Normal |
| A-11 | CH,SP,BSP, HYP,CH | CH,SP,BSP,CH | CH,SP,BSP,HYP, CR,CH |
| A-12 | CH,SP,BSP, HYP,CR,CH | CH,SP,BSP,CH | Normal |
| A-13 | CH,BSP,SP, HYP,CH | CH,BSP,SP,CH | CH,BSP,SP,HYP, CR,CH |
| A-14 | CH,BSP,SP, HYP,CR,CH | CH,BSP,SP,CH | Normal |
| A-15 | CH,TAB | Normal-If tabulation ends beyond end of line, machine stops | Normal-If tabulation stops beyond end of line, machine stops |

CH - Designates any print character except hyphen.
HYP - Hyphen
SP - Space
CR - Carrier Return
BSP - Backspace The code sequences that are encountered during the reading of the tape at the right-hand station 12 are designated A-1 through A-15 for reference. The action of the printer 1 in response to the codes read from the tape at right-hand station 12 will vary depending upon whether or not the print head 5 has escaped into the line ending Region, as fully described in the Sims patent.

Code Conversion

Frequently, while in a Transfer Adjust mode, reading of the right-hand tape stops, either under manual control or under control of a Stop code sensed in the right-hand tape, to permit the typing of additional information or revised information on the printed document 4. The apparatus is manually placed in a Record Left mode during which characters are recorded on the left-hand tape at the same time as they are printed on the document 4. Functional characters are also recorded in response to functional operations, such as Carrier Return, Tab, etc. When this occurs, the information recorded on the left-hand tape is a true representation of the action of the printer 1, in contrast with the Transfer operation from the right-hand tape when the action of the printer 1 may or may not follow the code representations stored in the right-hand tape. Due to the fact that the printer responses to data and functional characters are likely to differ considerably from the original data and functional characters arrangement on the original tape in cartridge 13 at the right-hand station 12, and also due to the fact that the left-hand tape in cartridge 15 contains information both from the right-hand tape and from manual keyboard entry, it is necessary to use the left-hand tape only in an Adjust mode of operation and not as an original tape for normal playback. This is true, primarily due to the fact that the line ending areas for the data recorded on the left-hand tape vary considerably.

Whenever the data recorded on the left-hand tape is derived in this intermixed fashion from the right-hand tape and from the printer 1, the left-hand tape does not always reflect the actual document printing. Therefore, the left-hand tape cannot be conveniently used as an original tape in any mode, except the Adjust mode, for preparing additional documents 4, as desired. It is desirable, however, to maintain the arrangement for directly transferring data from the right-hand tape, since a higher speed of operation is achieved. In many cases, it is also desirable that the information, both data and functional, recorded on the left-hand tape, be an accurate representation of the data and functional response of the printer 1 during operation. This is advantageous if subsequent revision of the revision just completed is necessary. In accordance with the invention set forth in the Ross patent, the foregoing is accomplished by maintaining the normal data transfer operations and by automatically modifying the mode of operation, as and when required, to effect conversion of coded information so that the information recorded on the left-hand tape accurately reflects the printing and functional actions of the printer 1.

The Ross apparatus with two magnetic tape reading and recording stations 12 and 14 and an associated printer 1, is operable in one mode of operation to transfer data and functional characters from one tape station 12 to another tape station 14 directly while effecting printing of the data in accordance with a desired line ending format, and is further operable, when the characters transferred from one tape to the other do not agree with the actual characters printed of functional operations of the printer 1, to automatically change the mode of the apparatus so that characters not in agreement are revised directly under control of the printer 1 on the newly prepared tape.

The apparatus is operable to effect forward stepping, no stepping, and back stepping of the tapes, as required, to insure appropriate reading and revision of characters.

Figure 38:
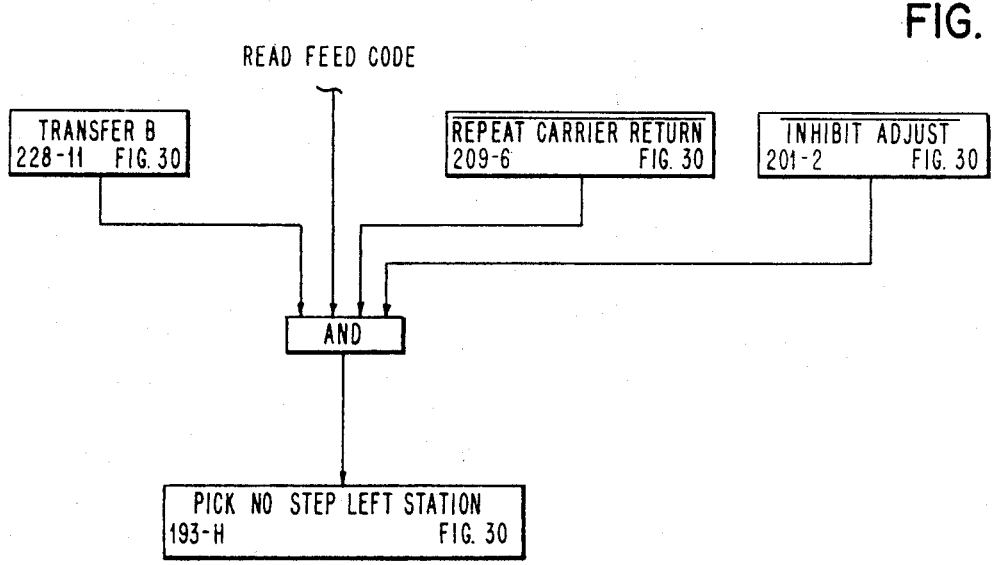

Redundant Feed codes provided for expansion and accompanying Carrier Return codes on the original tape are deleted whenever, during the line adjustment procedures, the printer 1 does not perform a Carrier Return operation. The operation is illustrated in FIG. 38 with recognition of the Feed code being combined with Transfer contacts 228-11, FIG. 30, contacts 209-6 and 201-2, FIG. 30, to energize relay R193, FIG. 30, in order to prevent stepping of the left tape at station 14, FIG. 1. Space codes read in the original tape are converted in the line ending Region to Carrier Return codes accompanied by Feed codes, thereby insuring that any newly prepared tape is completely compatible with original tape in the apparatus. The recognition of Space codes in the Region occurs in FIG. 8. The conversion to a Carrier Return code plus Feed code is initiated in FIGS. 8 and 3.

Provision is made in the Ross apparatus as document 4 is prepared to delete the Carrier Return codes and associated Feed codes when they occur outside the line ending Region and to record a Carrier Return code and an associated Feed code whenever a Carrier Return operation is effected in the line ending Region on the new document 4.

Essentially, the operation during a Transfer Adjust mode according to the Ross invention involves the transfer of data and functional information from the right tape Read/Record block 37 directly to the left tape Read/Record block 41 for recording on the tape at the left-hand station 14. Ordinarily, the Transfer Adjust mode is maintained effective so that the data and functional information applied through the Line Adjust block 48 operates the Print Selection magnets, such as magnetes R37, R40, etc., FIG. 28 and Operational magnets, such as magnet 252 in FIG. 21a in printer 1, as required, to readjust the lines of information on document 4. Therefore, the characters, both data and functional, read from the right-hand tape station 12 are recorded at the left-hand tape station 14 prior to or concurrently with the related printer action. Whenever a situation is recognized by the Line Adjust logic 48 that requires the revision of the tape in cartridge 15 at the left-hand station 14, the Line Adjust logic 48 provides a No Step Left Station (NSLS) signal by line 70 to prevent the left-hand tape from stepping. A Generate Record Cycle (GRC) signal by line 71 to mode control 52 is effective to change the mode of the equipment automatically from a Transfer Adjust mode to an Active Keyboard mode indicated by line 72 to establish a Record Left mode of operation for recording characters on the left-hand tape under control of the printer transmit contacts in block 8. Since the tape at the left-hand station 14 is prevented from stepping, any character generated by the printer transmit contacts in block 8 is recorded directly over the previously recorded character, thereby effecting an automatic revision of the left-hand tape to reflect the actual printer action. In some cases, it is necessary to revise two character locations on the left-hand tape and a Back Step Left Station (BSLS) signal by line 70 controls stepping block 17 for back stepping the magnetic tape at the left-hand station 14. It is also necessary at times to read the same character a second time at the right-hand station 12, and a No Step Right Station (NSRS) signal on line 70 effects the necessary control of stepping control block 17.

Table B summarizes the printer action and code conversion for the conditions and code sequences of Table A:

TABLE B

| Code Sequence | Right Tape Code Sequence | No Line Ending Condition | | Line Ending Condition | |
|---|---|---|---|---|---|
| | | Typewriter Action | Left Tape Code Sequence | Typewriter Action | Left Tape Code Sequence |
| B-1 | Successive Carrier Returns | Space, Successive Carrier Returns | *Normal | Normal | Normal |
| B-2 | CR,TAB(S) | SP,CR,TAB(S) | *Normal | Normal | Normal |
| B-3 | CH,SPACE SP,CH | Normal | Normal | CH,SPACE (S),SP,CR CH | *CH,SPACE (S),CR,CH |
| B-4 | CH,SPACE (S),CR,CH | CH,SPACE(S) SP,CH | CH,SPACE (S),SP,CH | Normal | Normal |
| B-5 | CH,SP,CH | Normal | Normal | CH,SP,CR,CH | *CH,CR,CH |
| B-6 | CH,CR,CH | CH,SP,CH | **CH,SP,CH | Normal | Normal |
| B-7 | CH,SP,HYP (S),SP,CH | Normal | Normal | CH,SP,HYP (S)SP,CR,CH | *CH,SP,HYP (S),SP,CR,CH |
| B-8 | CH,SP,HYP (S),SP,CR CH | CH,SP,HYP (S),SP,CH | **CH,SP,HYP (S),SP,CH | Normal | Normal |
| B-9 | CH,HYP(S), CH | Normal | Normal | CH,HYP(S), CR,CH | *CH,HYP(S), CR,CH |
| B-10 | CH,HYP(S), CR,CH | CH,HYP(S) CH | **CH,HYP (S),CH | Normal | Normal |
| B-11 | CH,SP,BSP, HYP,CH | CH,SP,BSP, CH | Normal | CH,SP,BSP, HYP,CR,CH | *CH,SP,BSP, HYP,CR,CH |
| B-12 | CH,SP,BSP, HYP,CR,CH | CH,SP,BSP, CH | CH,SP,BSP, HYP,CH | Normal | Normal |
| B-13 | CH,BSP,SP, HYP,CH | CH,BSP,SP, CH | CH,BSP,SP, HYP,CH | CH,BSP,SP, HYP,CR,CH | *CH,BSP,SP, HYP,CR,CH |
| B-14 | CH,BSP,SP, HYP,CR,CH | CH,BSP,SP, CH | **CH,BSP, SP,HYP,CH | Normal | Normal |
| B-15 | CH,TAB | Normal-If tabulation ends beyond end of line, machine stops. | Normal | Normal-If tabulation stops beyond end of line, machine stops. | Normal |

*The first Carrier Return in these sequences is generated and is followed by a Feed code.
**Feed codes in these sequences are omitted.

Table B indicates the printer action and the left tape code sequence that is established in response to various code sequences on the tape at the right-hand station 12, FIG. 1, when print head 5 is in the line ending Region or not in the line ending Region. The code sequences are designated B-1 through B-15 to relate them to the corresponding code sequences A-1 through A-15 previously shown in Table A for the line adjust operation as described in the Sims patent.

Detailed Circuits

Reference is made to the Locklar et al, Sims, and Ross patents for a detailed description of the various modes of operation of the MT/ST apparatus including Record Left, Record Right, Playback Left, Playback Right, Adjust Right, Adjust Left, Transfer Adjust, and Transfer Type. Some circuit changes have been made herein including the renaming or renumbering of the various relays in the machine circuits. However, the basic operations of the present apparatus are similar in many respects to the operations disclosed in the referenced patents. Only so much of the detailed circuits as are believed necessary for an understanding of the present invention are incorporated in the present case. For convenience, the figures in the present case are compared with those in the Ross patents to more clearly relate the same with comments concerning the similarity.

| FIG. No. Ross Patent 3,490,004 (Application Serial No. 555,091) | FIG. No. Present Case | Comment |
| --- | --- | --- |
| 1 | 1 | Similar |
| 2 | 2 | Similar |
| 3 | 3 | Similar |
| 4 | 4 | Identical |
| 5 | 5 | Identical |
| 6 | 6 | Similar |
| 7 | 7 | Identical |
| 8 | 8 | Similar |
| 9 | 9 | Similar |
| 10 | 10 | Identical |
| 11 | 11 | Identical |
| 12 | 12 | New |
| 13 | 13 | New |
| 14 | 14 | Identical |
| 15 | 15 | Identical |
| 16 | 16 | Identical |
| 17 | 17 | Identical |
| 18 | 18 | Identical |
| 19 | 19 | Identical |
| 20 | 20a,20b | New |
| 21 | 21a,21b | New |
| 22 | 22 | Identical |
| 23 | 23 | Identical |
| 24 | 24 | Identical |
| 25 | 25 | New |
| 26 | 26 | Identical |
| 27 | 27 | Identical |
| 28 | 28 | Identical |
| 29 | 29a,29b | New |
| 30 | 30 | New |
| 31 | 31 | New |
| No corresponding FIGS. (32-52) | 32-52 | New |

Wherever possible, figures in the present case that are similar or identical to those in the Ross patent are designated with the same figure number used in the Ross patent. It is believed that this will clarify the relationship between the drawings in the present case and the Ross patent and simplify cross reference between the two.

The code conversion sequences B-6, B-1, and B-5 were particularly described in detail in the Ross patent. Because of the inter-relationship of the flow charts in the Ross patent and the present case and to show the changes involved in order to practice the present invention, as will be described in a later section herein, a brief summary of sequences B-6, B-1, and B-5 in the Ross patent is presented below:

Sequence B-6, Conversion of Carrier Return Code (Right Tape) to Space Code (Left Tape)

The procedure in the Ross patent involves the conversion of any Carrier Return code on the right tape encountered outside the Region to a Space action by the printer 1, and a Space code on the left tape. The procedure is essentially set forth in flow charts, FIGS. 2, 3, 4, 5, 6, and 7. These flow charts as well as the others in the case include AND and OR blocks that represent logical decisions and conditions, as in conventional. Thus, an AND block indicates all inputs must be active to condition the logical output. An OR block indicates any one of the inputs active will condition the block for a logical output.

Figure 2:
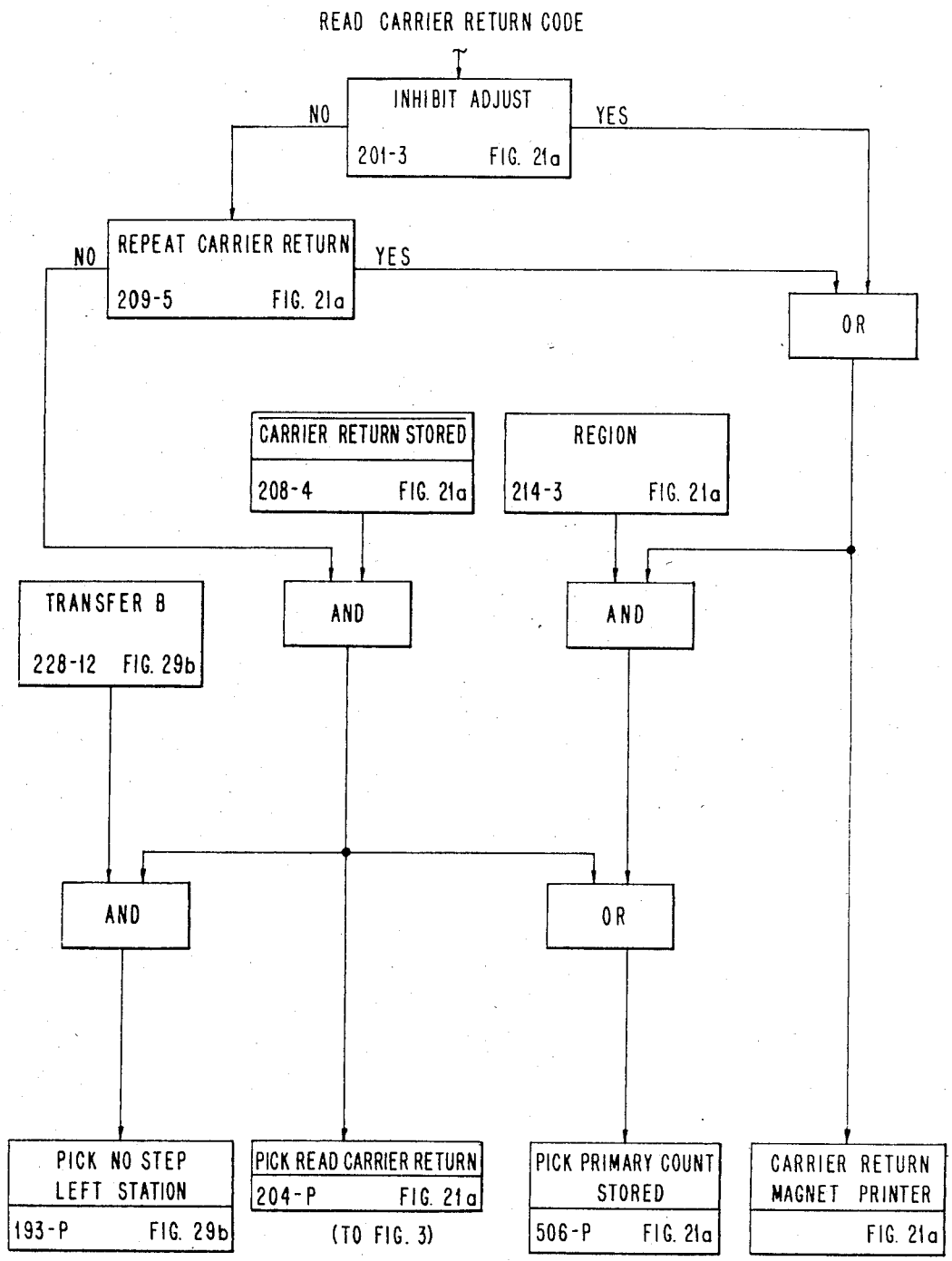
FIGS. 2-13 are flow charts illustrating various data handling and control situations encountered in the apparatus of FIG. 1 during its operation.
Figure 14:
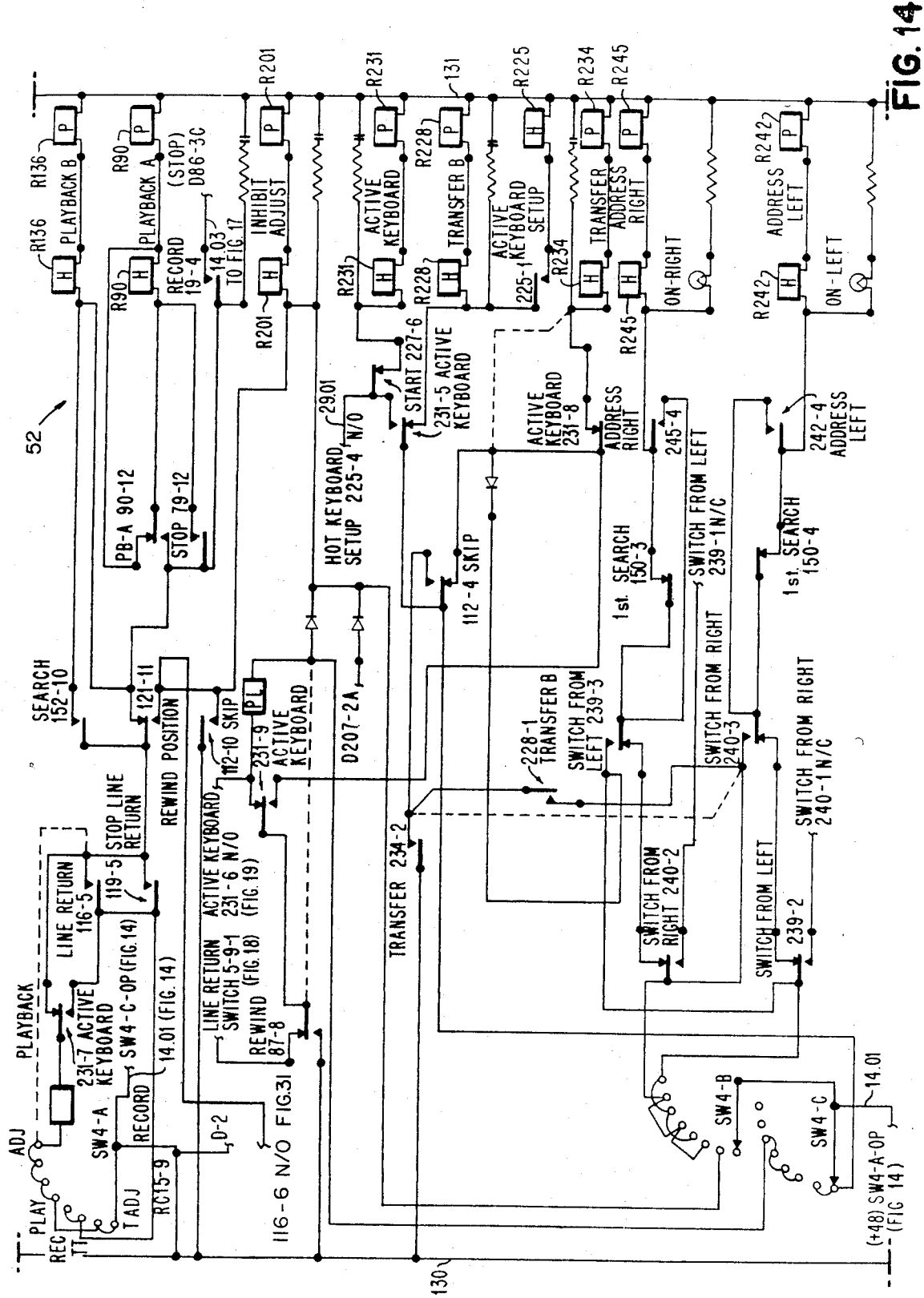

With the equipment in an Adjust mode, Inhibit Adjust is inactive, FIG. 2. It is assumed that a Transfer operation is in progress and, therefore, the Transfer B relay R228, FIG. 14, is energized. When a single Carrier Return code is recognized, a signal is routed through the 201-3 contacts, normally closed, the 209-5 contacts, normally closed, and the 208-4 contacts, normally closed, to pick relay R204, the Read Carrier Return relay, FIG. 21a. A branch logical sequence picks the No-Step Left Station relay R193, FIG. 29b.

Figure 3:
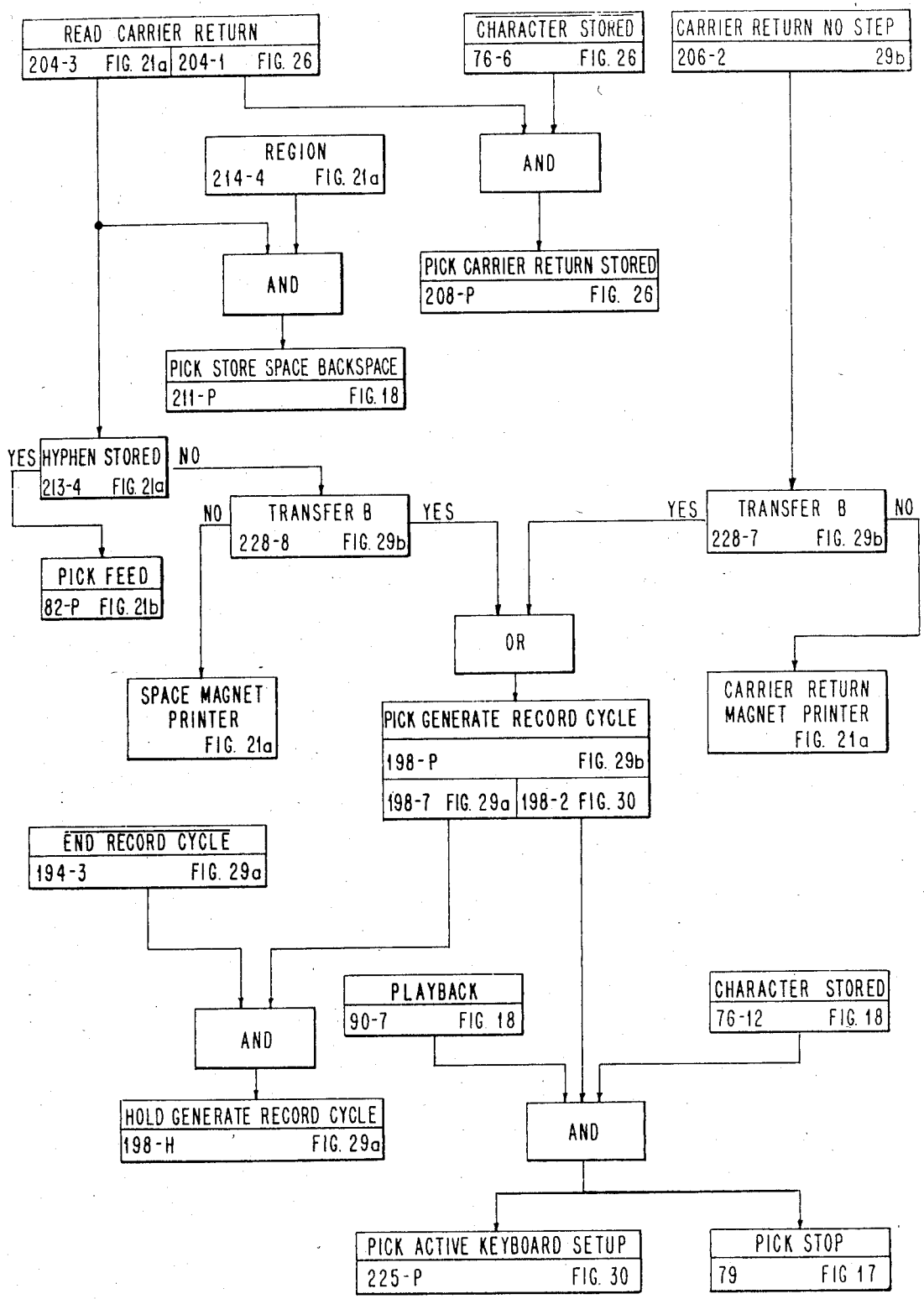
Figure 17:
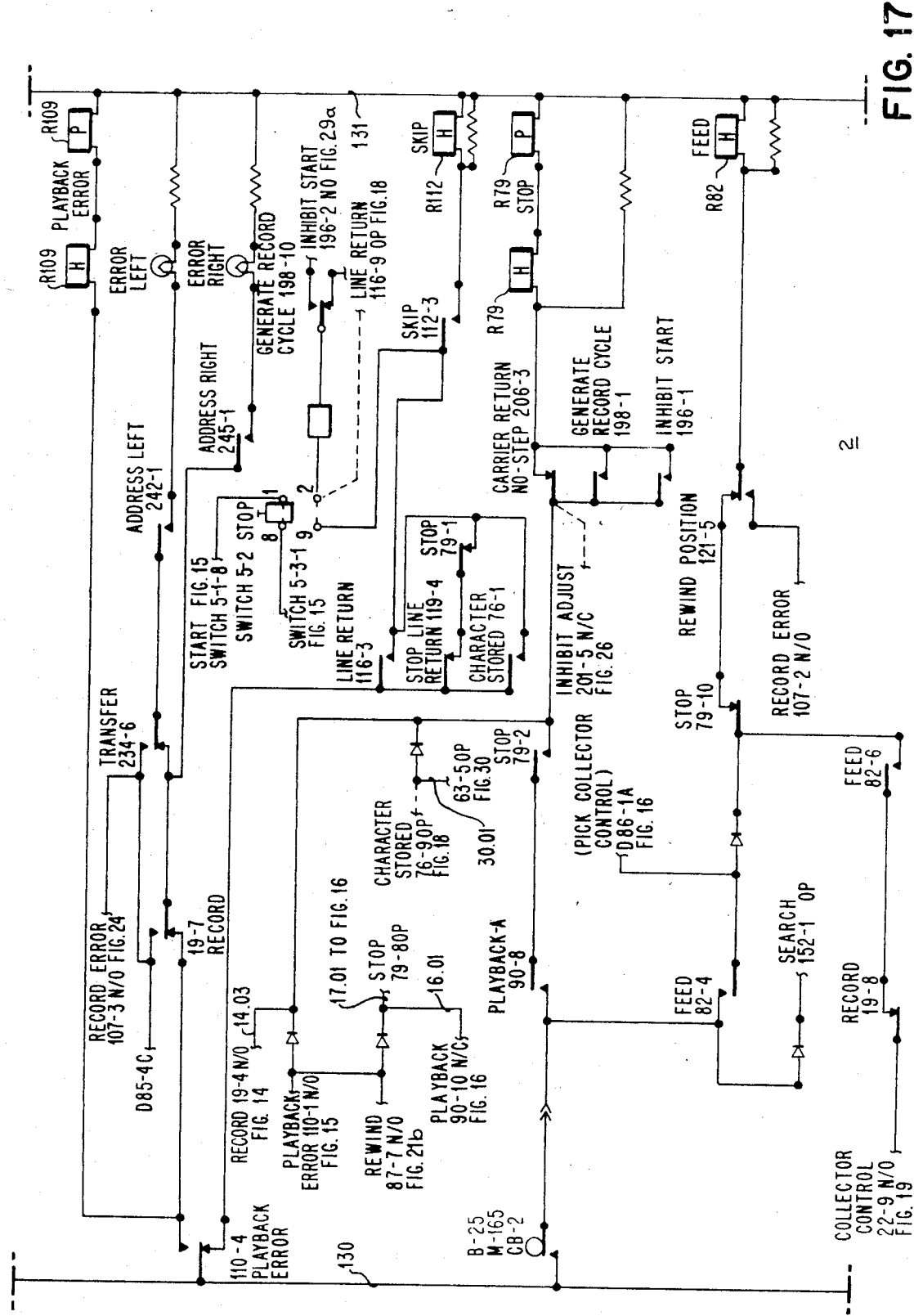
Figure 29A:
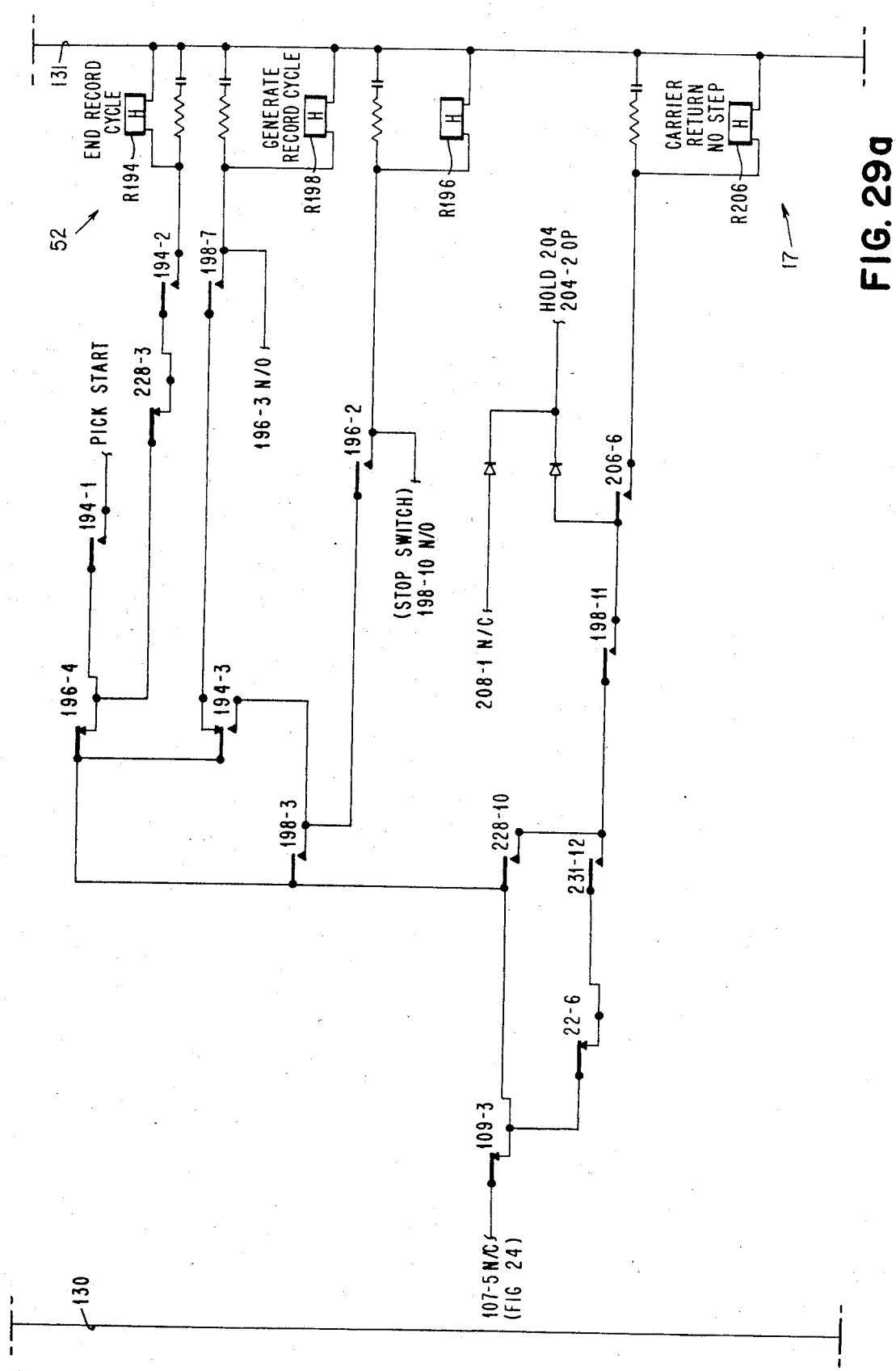
Figure 29B:
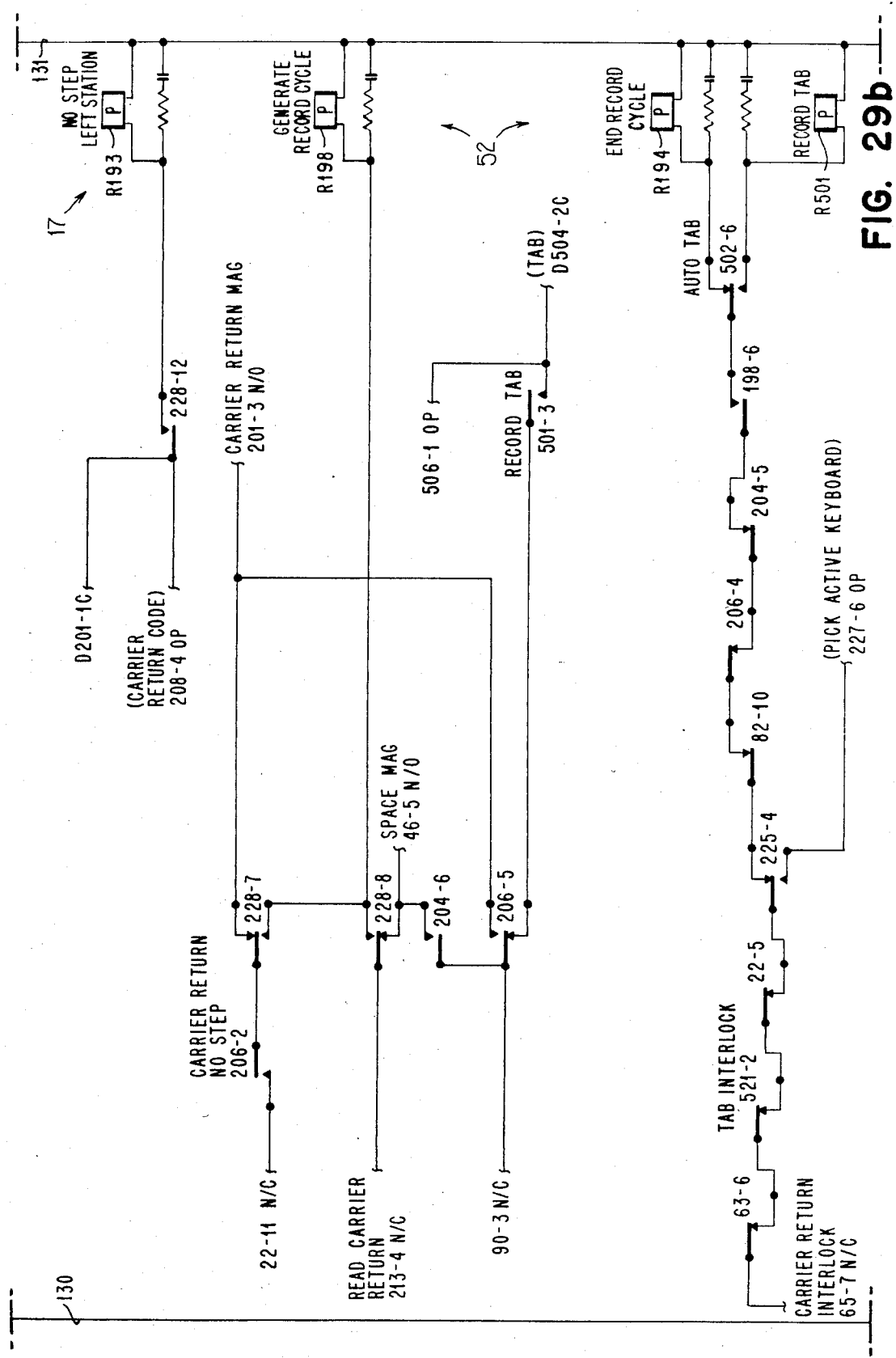
Figure 30:
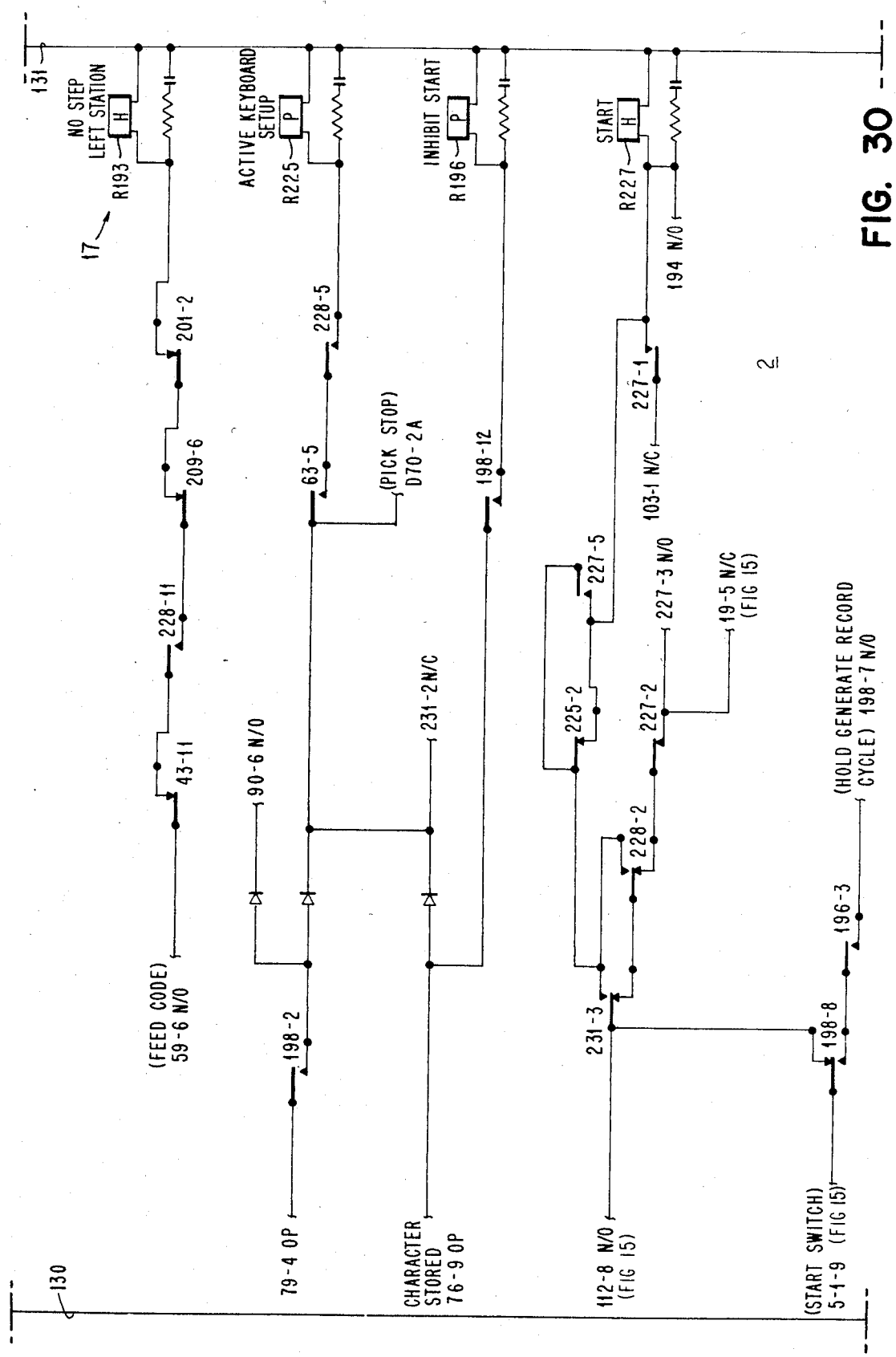

In the Ross patent, the mode of the apparatus is changed from a Transfer Adjust mode to an Active Keyboard mode by picking of the Generate Record Cycle relay R198, FIG. 29b (held in FIG. 29a), the Active Keyboard Setup relay R225, FIG. 30, and the Stop relay R79, FIG. 17, as illustrated in FIG. 3. Not all details of the operation are presented here, but in FIG. 4, the Active Keyboard relay R231, FIG. 14, is energized and drops the Playback relay R90, FIG. 14, the Transfer B relay R228, FIG. 14, and the Address Right relay R245, FIG. 14. Concurrently, the Record relay R19 is energized, FIG. 18. This establishes a Record mode in the equipment with the Address Left relay R242, FIG. 14, retained in an energized condition.

Figure 5:
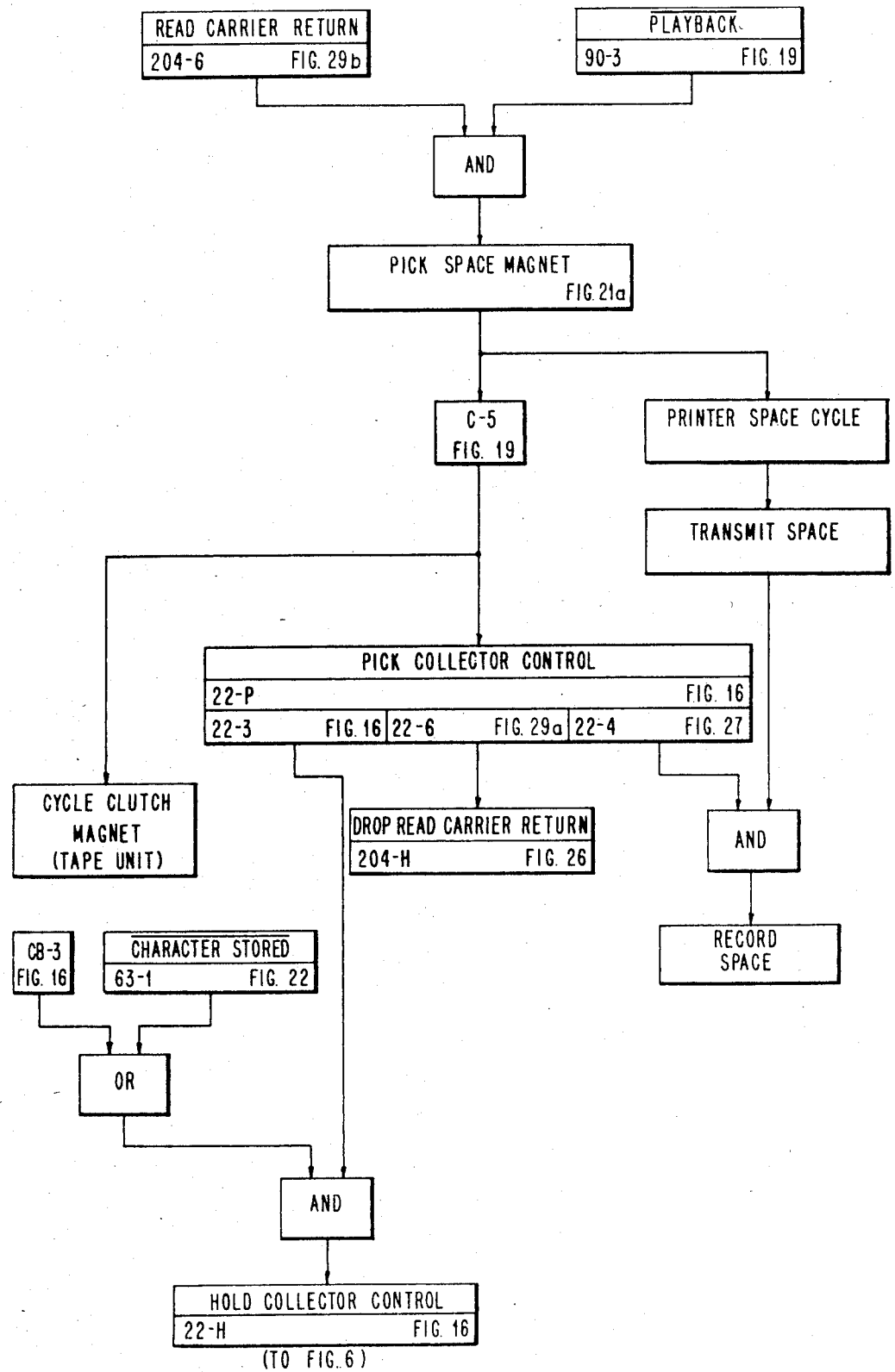
Figure 21A:
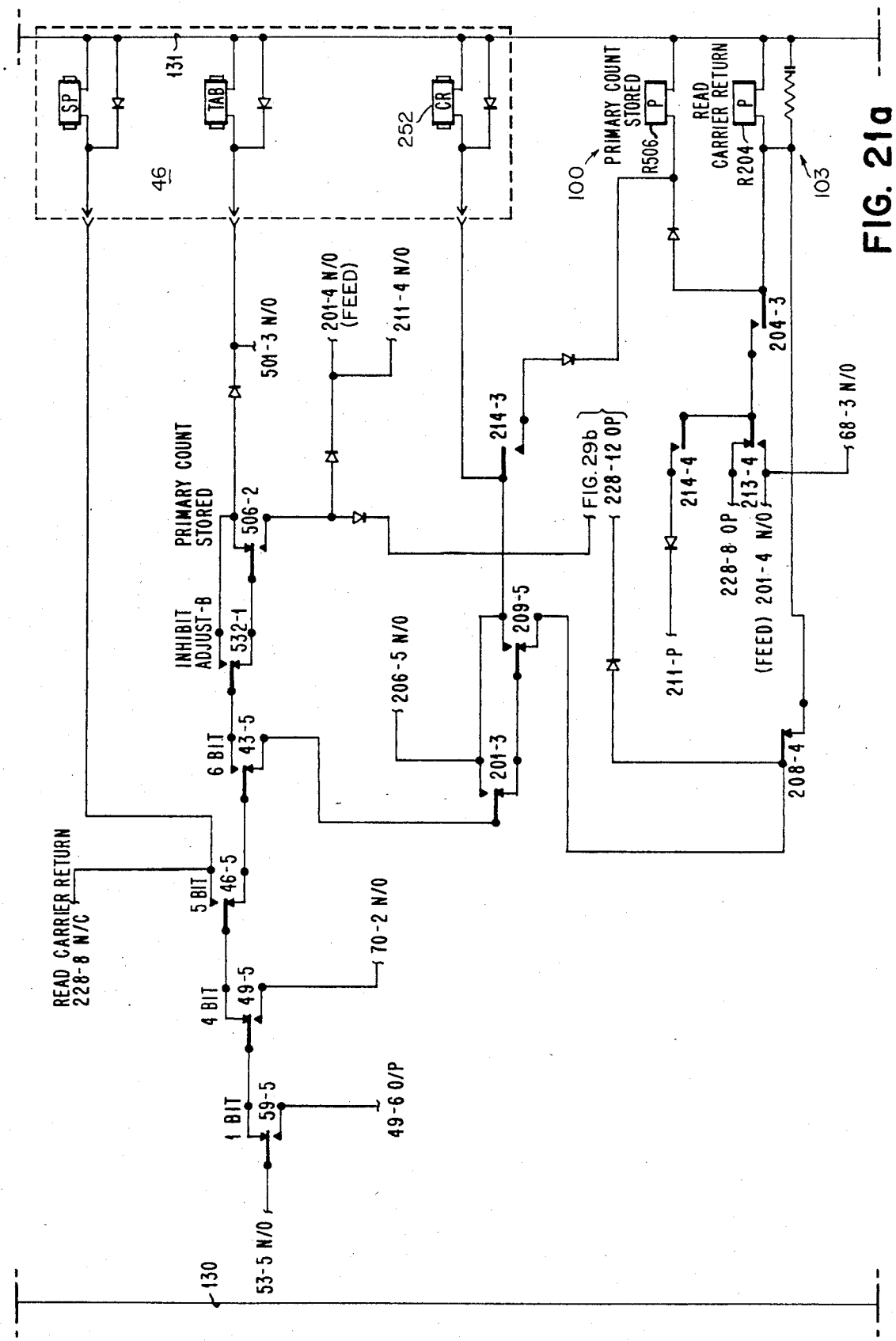
Figure 22:
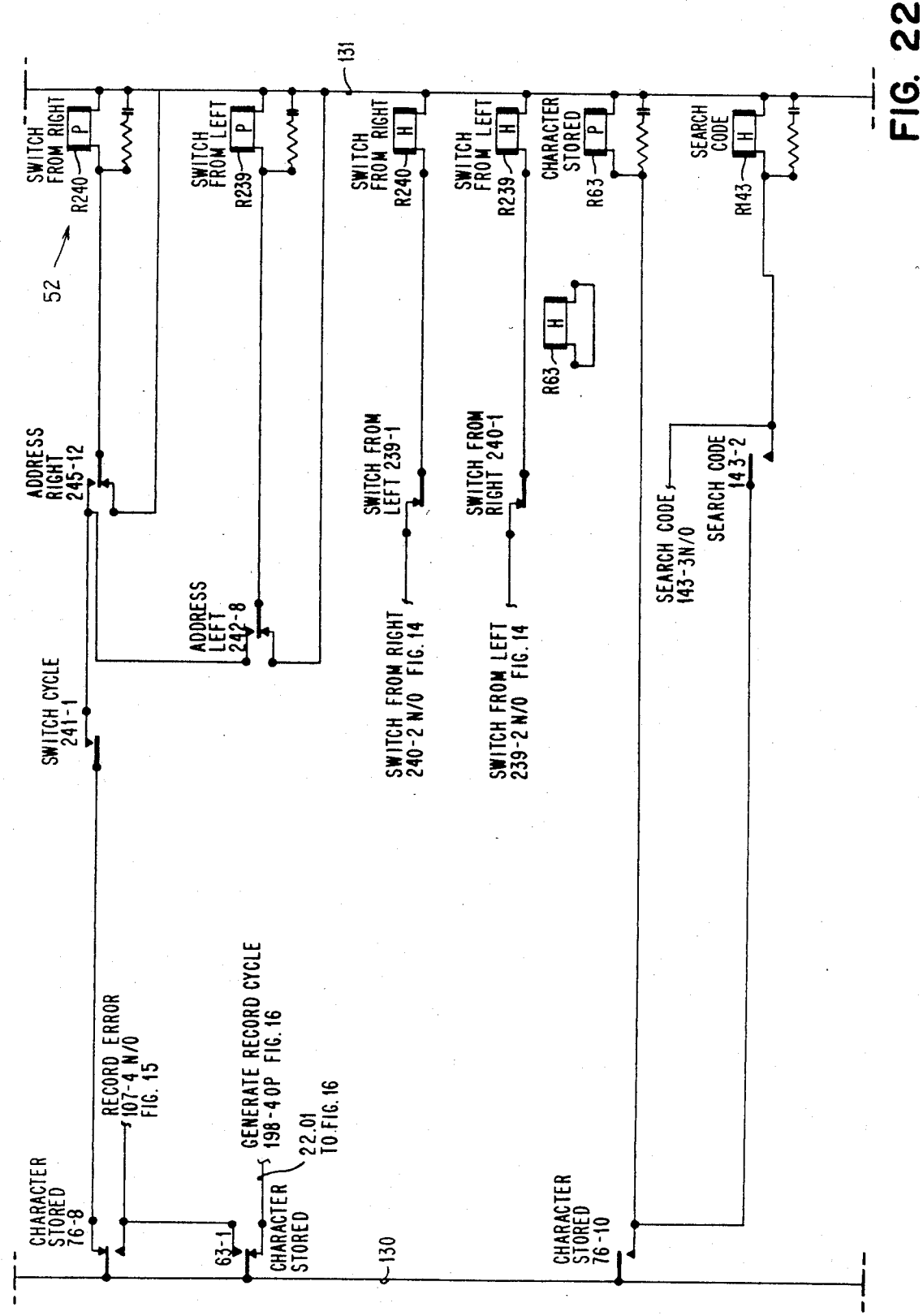

In FIG. 5, the foregoing action is effective to pick the Space magnet in the printer 1, FIG. 21a, to initiate a Space operation of the printer 1. This causes transmittal of the code configuration for a Space and the recording of the Space code on the tape at the left station 14. The closure of various interlock contacts including C2 and C5, FIG. 19, and dropping of Character Stored relay R63, FIG. 22, through the logic shown in FIG. 6 picks the End Record Cycle relay R194, FIG. 29b. Relay R194 is held temporarily in FIG. 29a.

Figure 7:
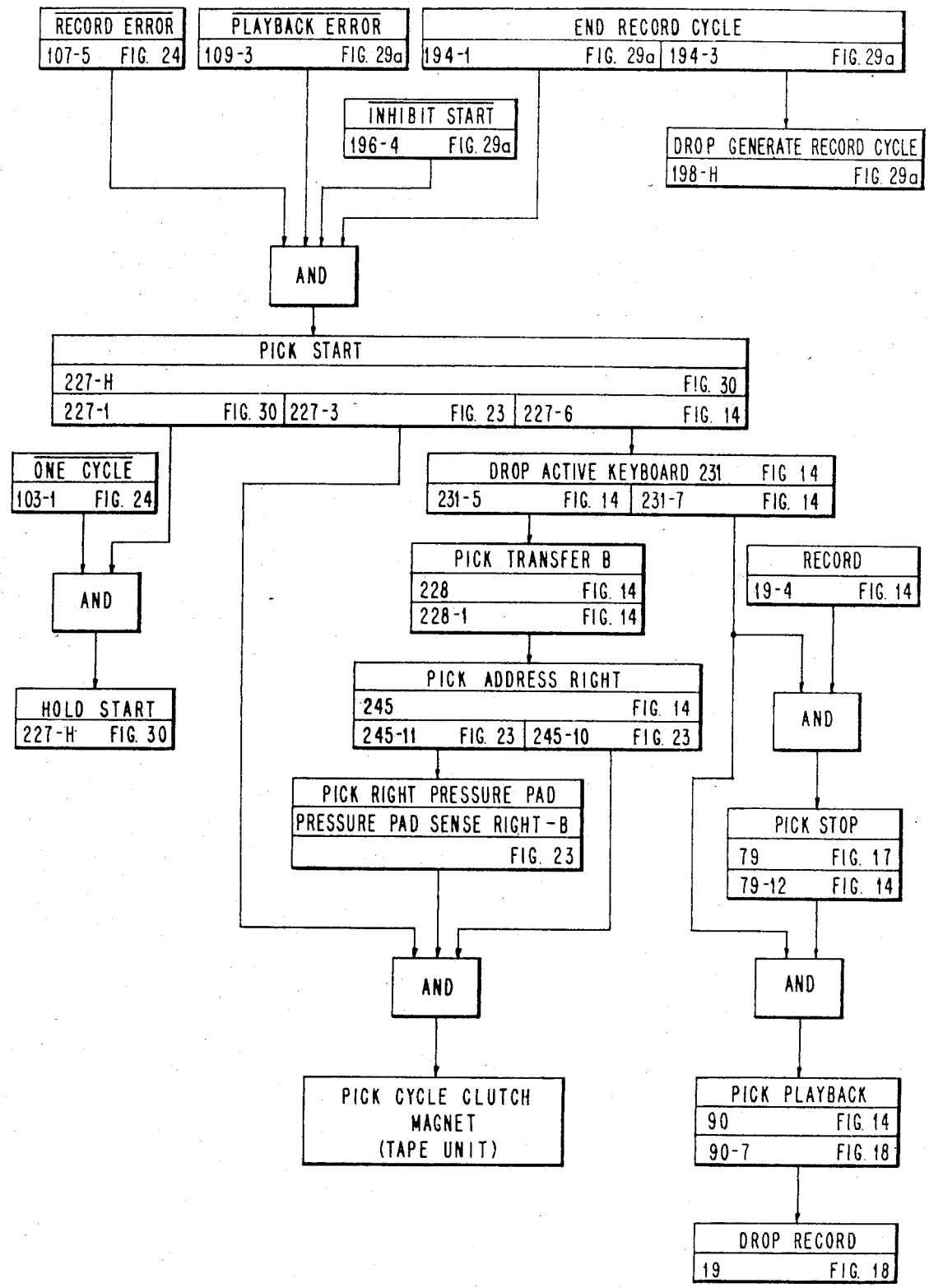
Figure 16:
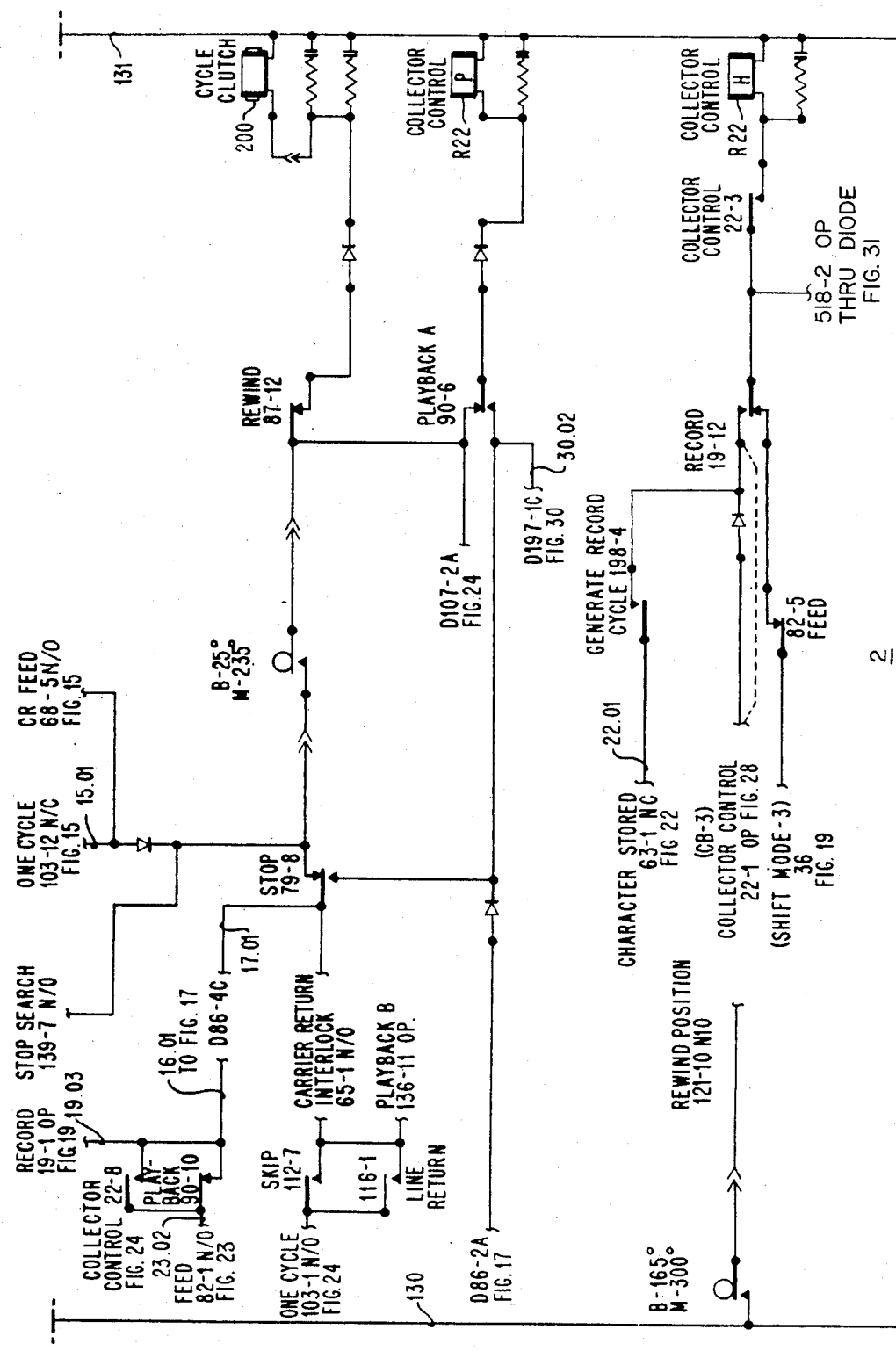
Figure 18:
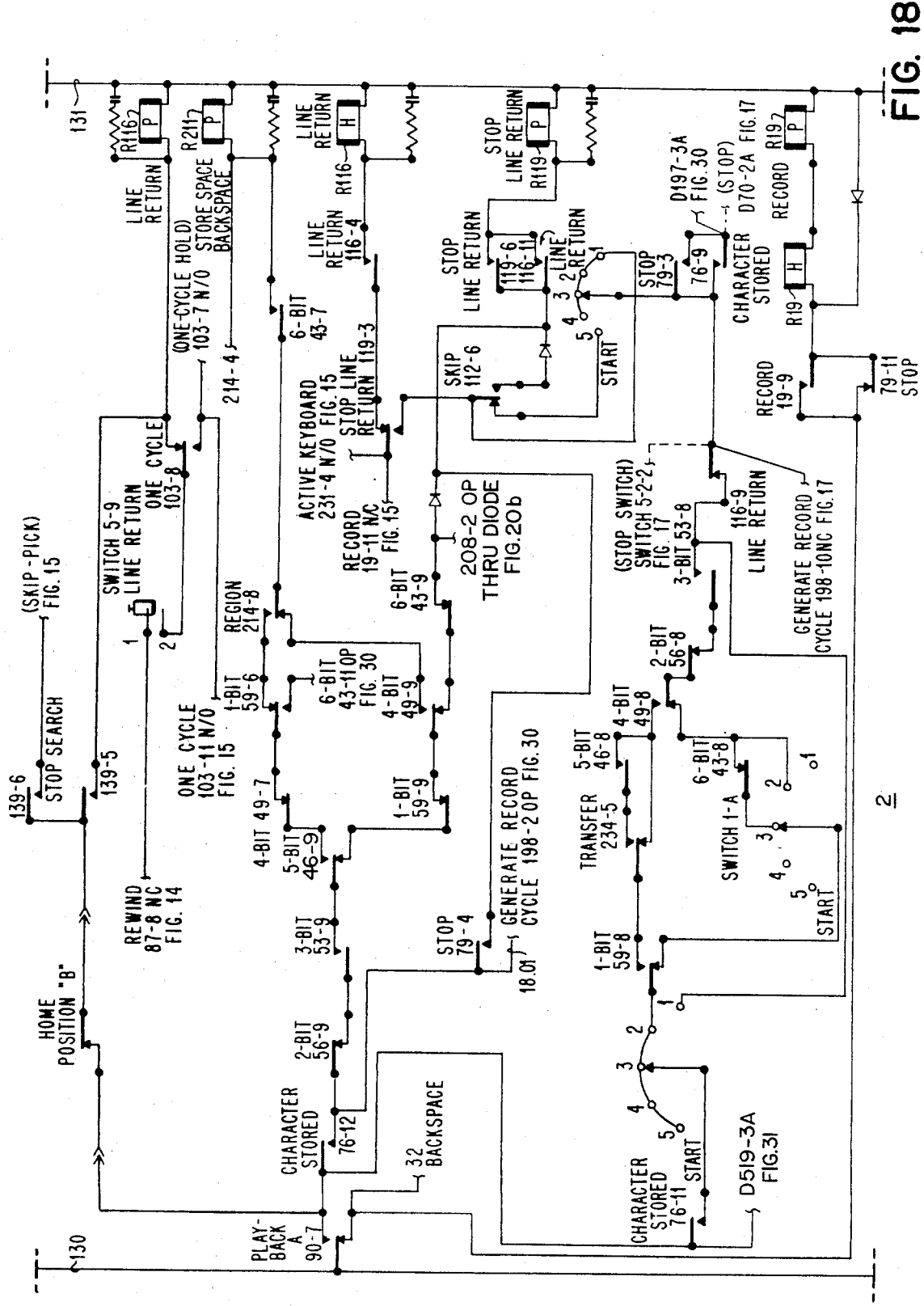
Figure 23:
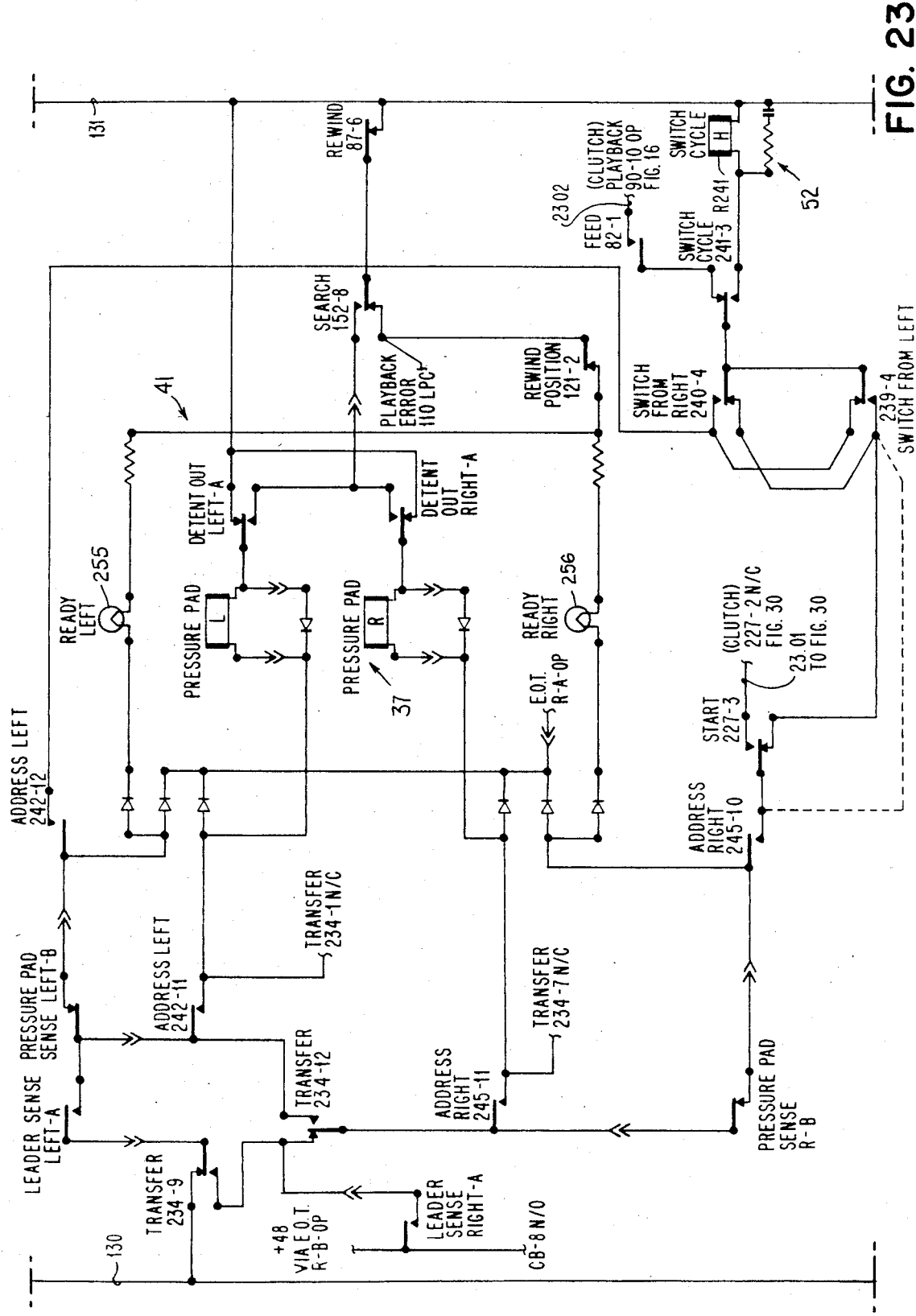
Figure 24:
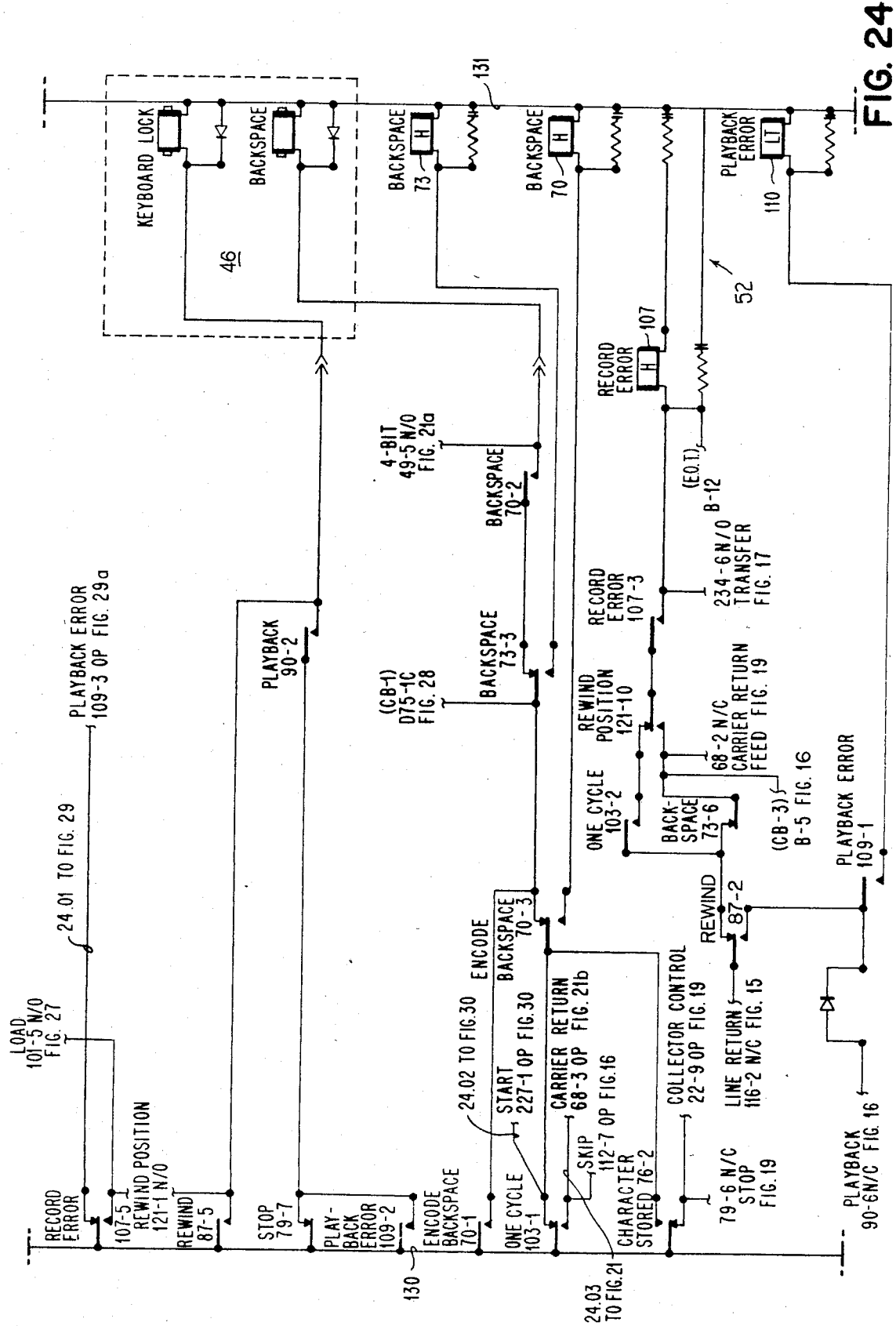

In FIG. 7, a Transfer Adjust operation is again initiated when the Start relay R227, FIG. 30, is energized through Not Record Error contacts 107-5, FIG. 24, and Not Playback Error contacts 109-3, FIG. 29a, along with operation of the right pressure pad, FIG. 23, and the cycle clutch 200, FIG. 16, in the tape unit 2. The Playback relay R90, FIG. 14, is energized and the Record relay R19, FIG. 18, is dropped.

Sequence B-1, Handling of Double or Multiple Carrier Return Code Sequences

When the first Carrier Return code in a multiple Carrier Return Code sequence is recognized, it is converted to a Space code as just described in connection with sequence B-6. However, two Carrier Return codes in sequence are recognized as the end of a paragraph and therefore, it is necessary to record two Carrier Return codes on the left tape and delete the Space code that was just recorded. The procedure involves FIGS. 3, 4, 10, 11, 12, 6, and 7 plus the stepping control in FIG. 9.

Figure 8:
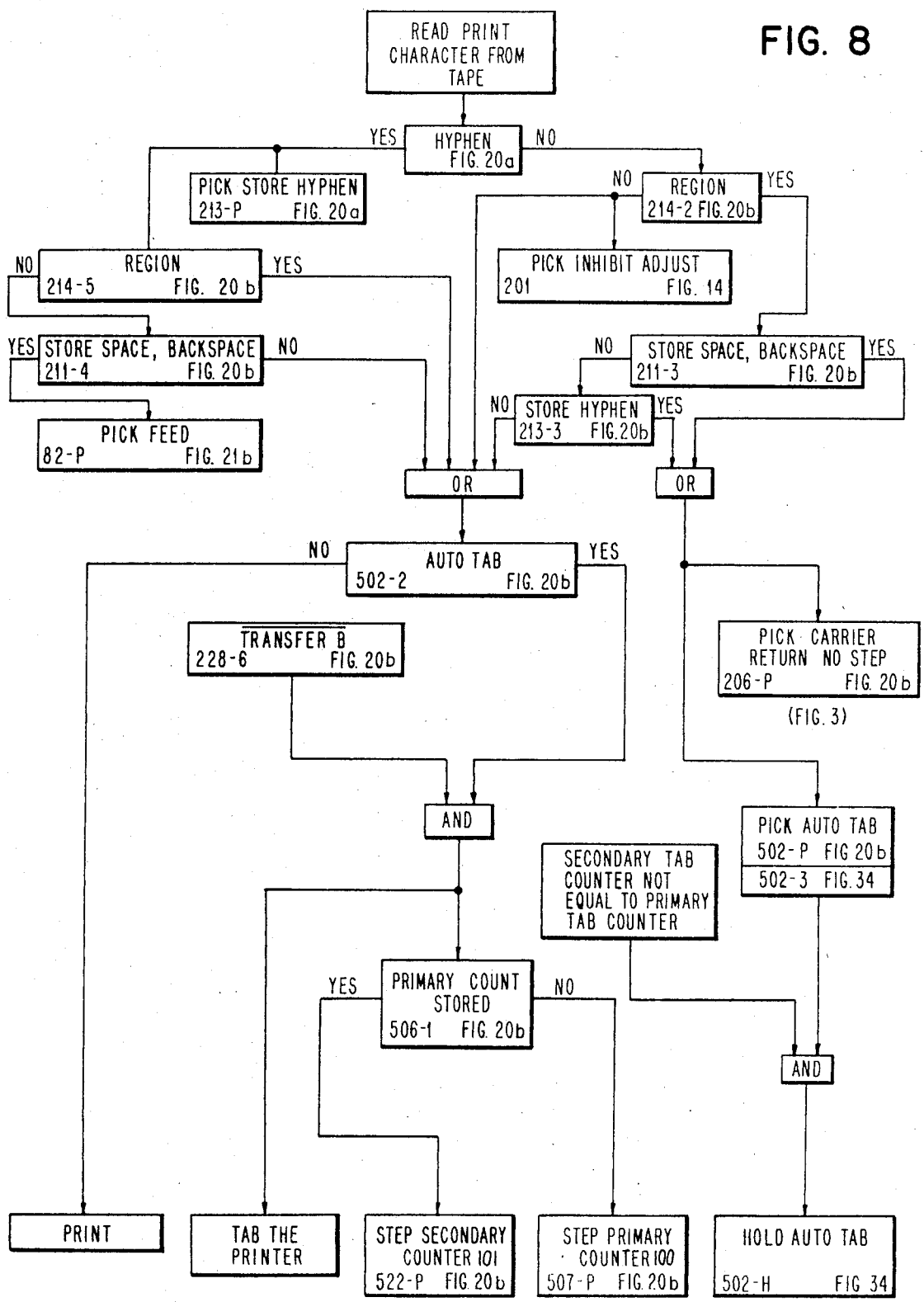
Figure 9:
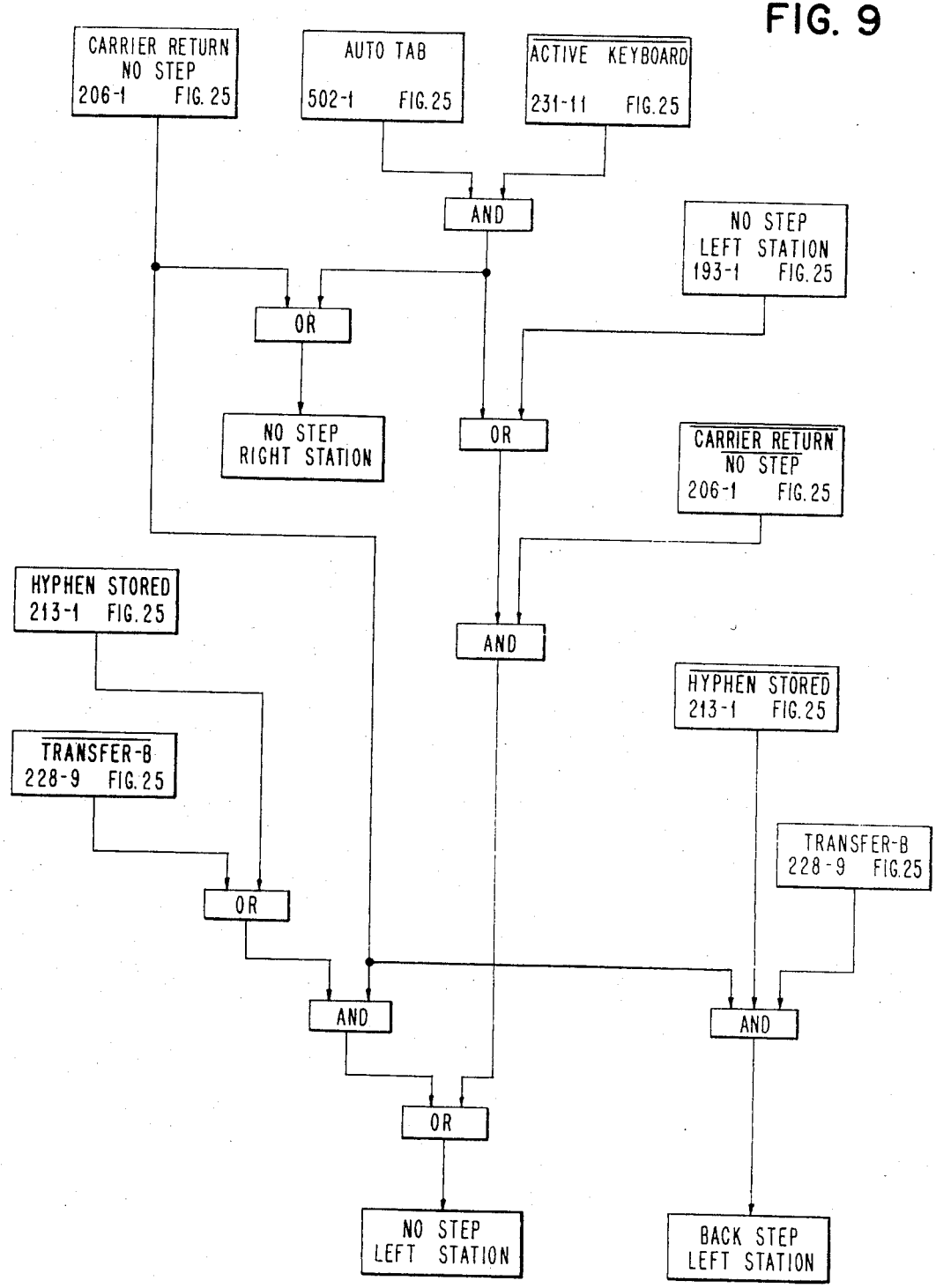
Figure 26:
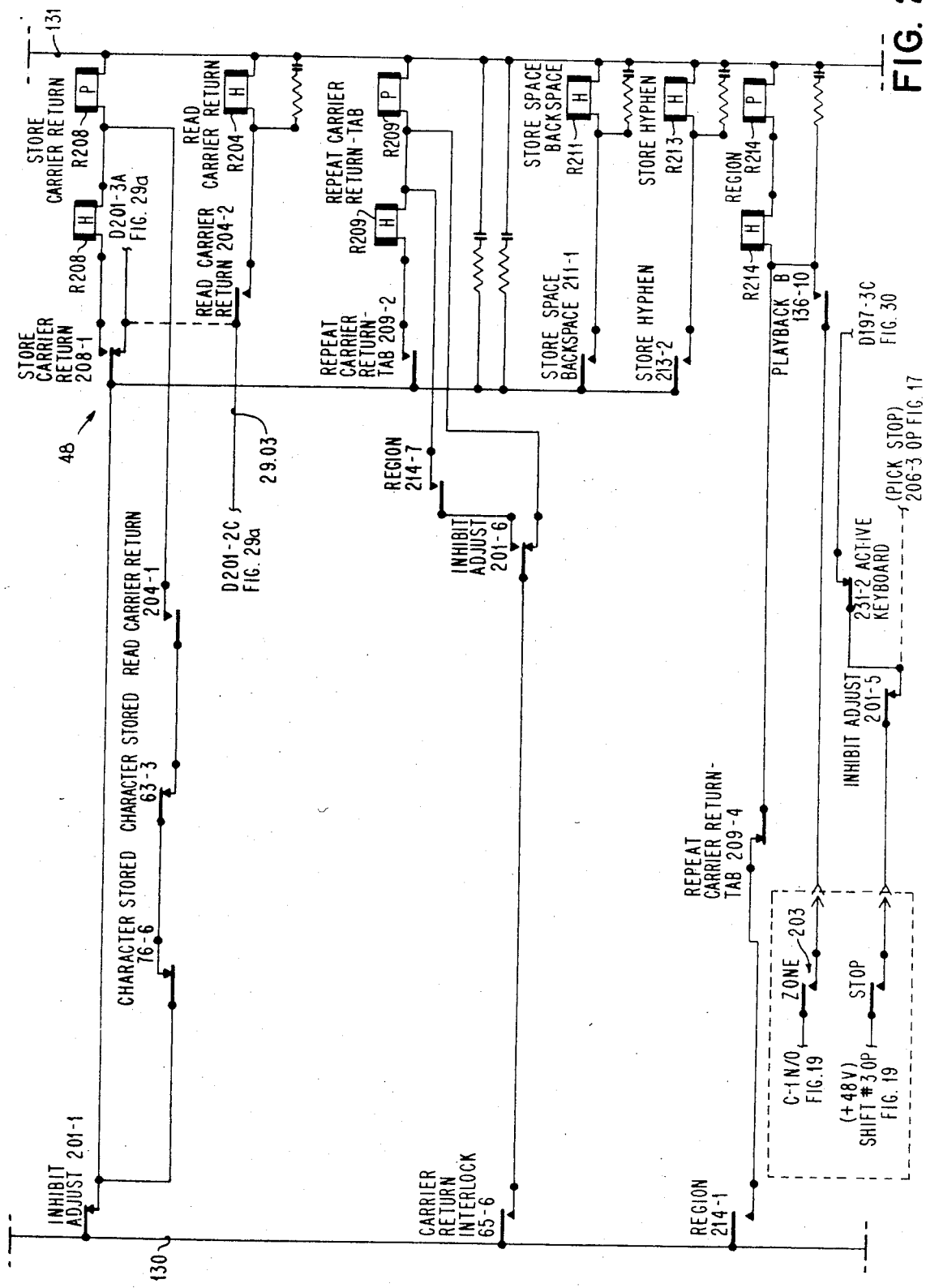

In FIG. 3, the recognition of the first Carrier Return code picks the Carrier Return Stored relay R208, FIG. 26. The recognition of the second Carrier Return code then picks the Carrier Return No-Step relay R206 (FIG. 8), FIG. 20b, which, as shown in FIG. 9, effects a no-step of the tape at the right station 12 and a back step of the tape at the left station 14.

Figure 4:
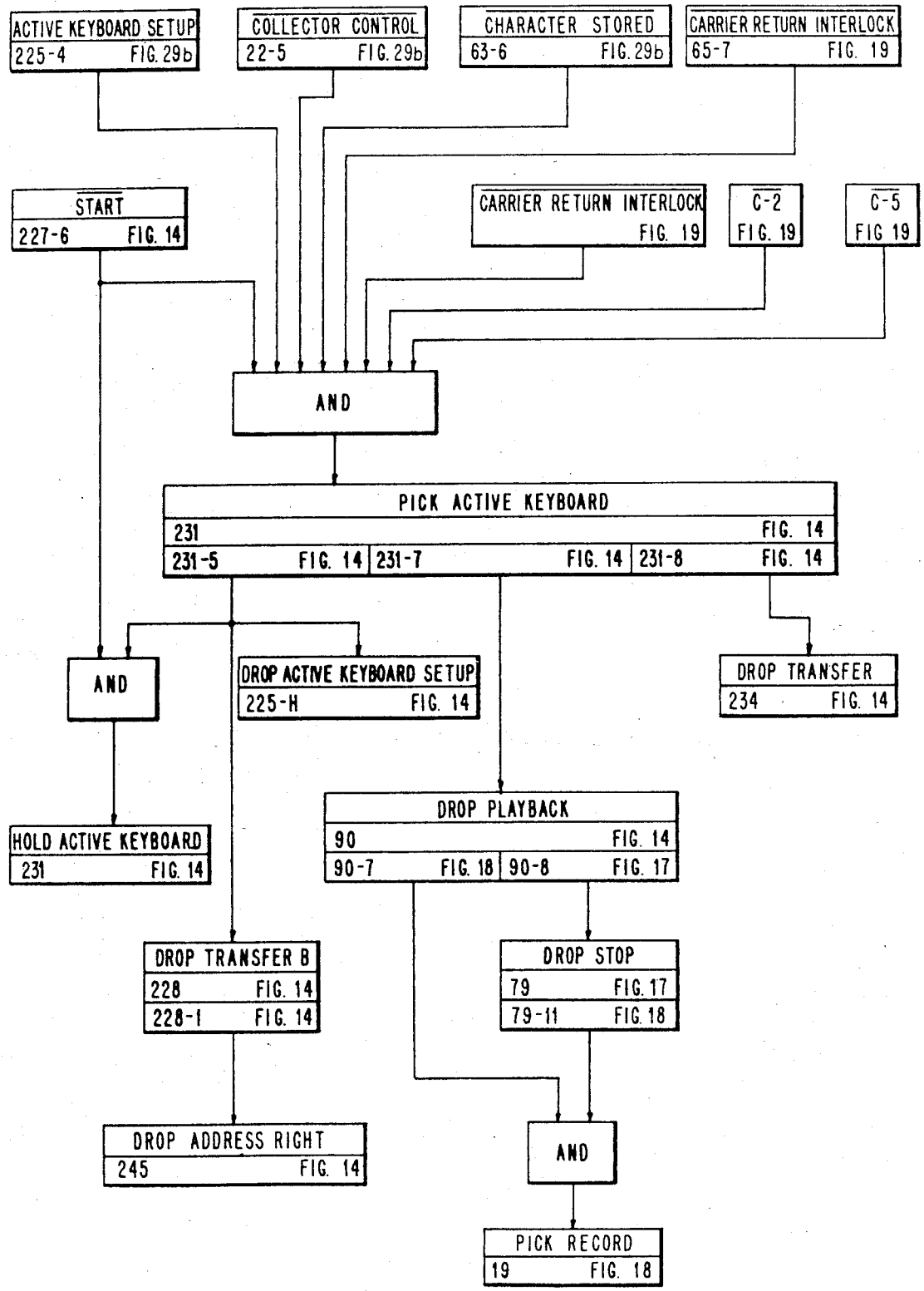

Returning to FIG. 3, the 206-2 contacts, FIG. 29b, now pick the Generate Record Cycle relay R198, FIG. 29b. The Active Keyboard relay R231, FIG. 14, operates to pick the Record relay R19, FIG. 18, as shown in FIG. 4.

Figure 10:
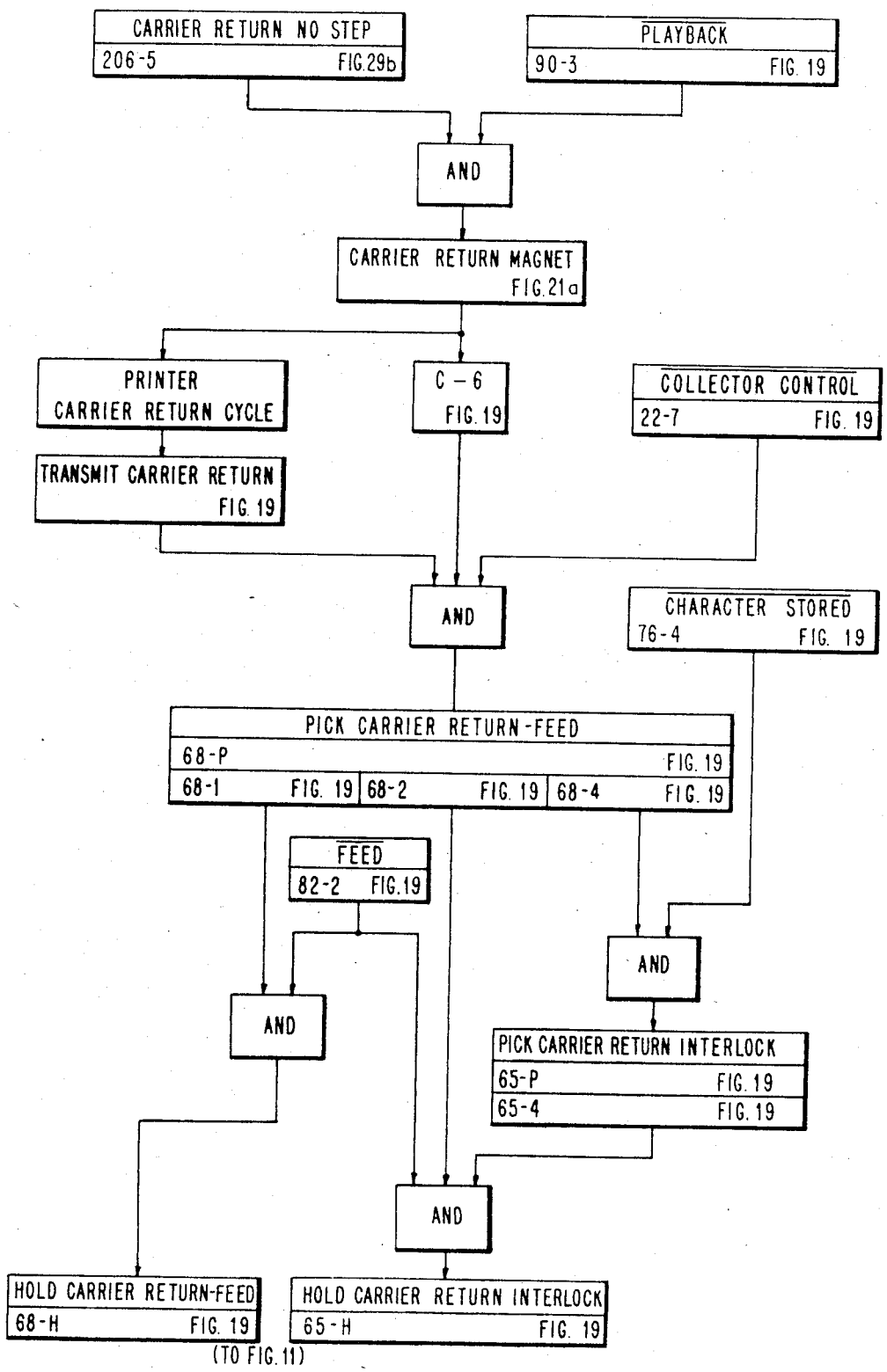
Figure 11:
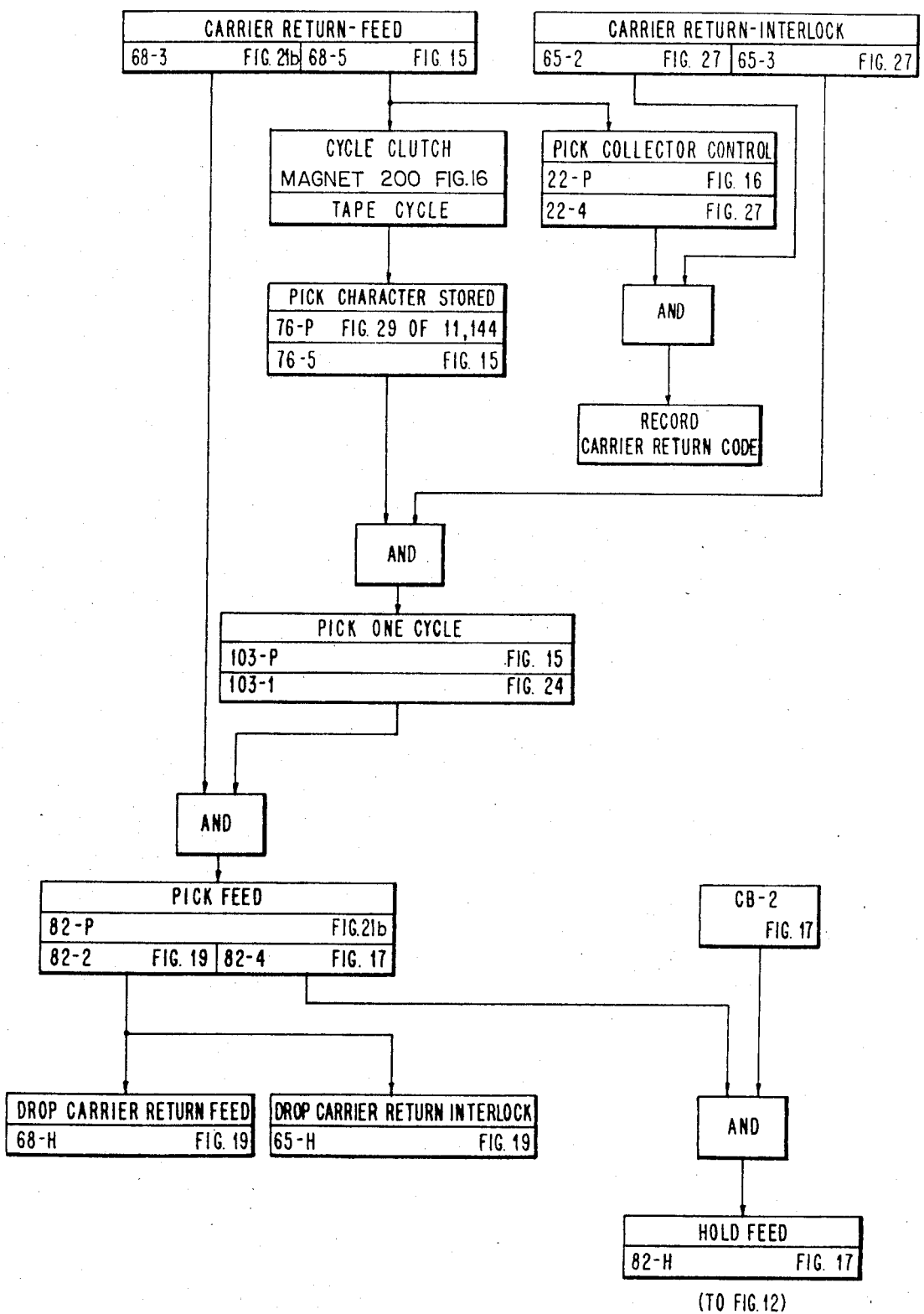
Figure 12:
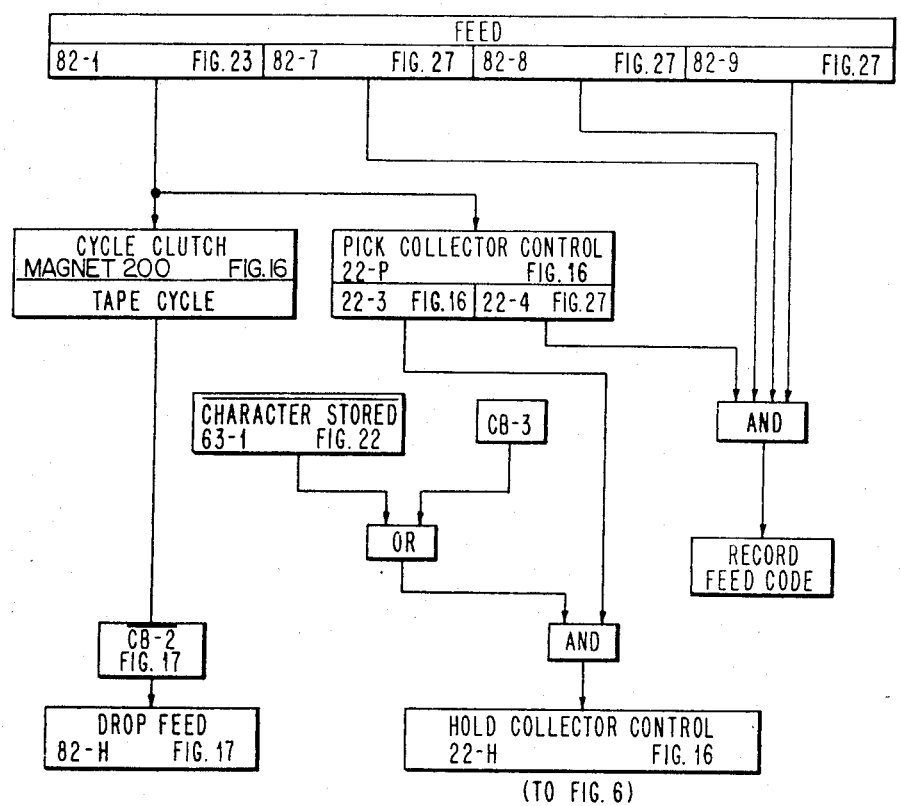
Figure 15:
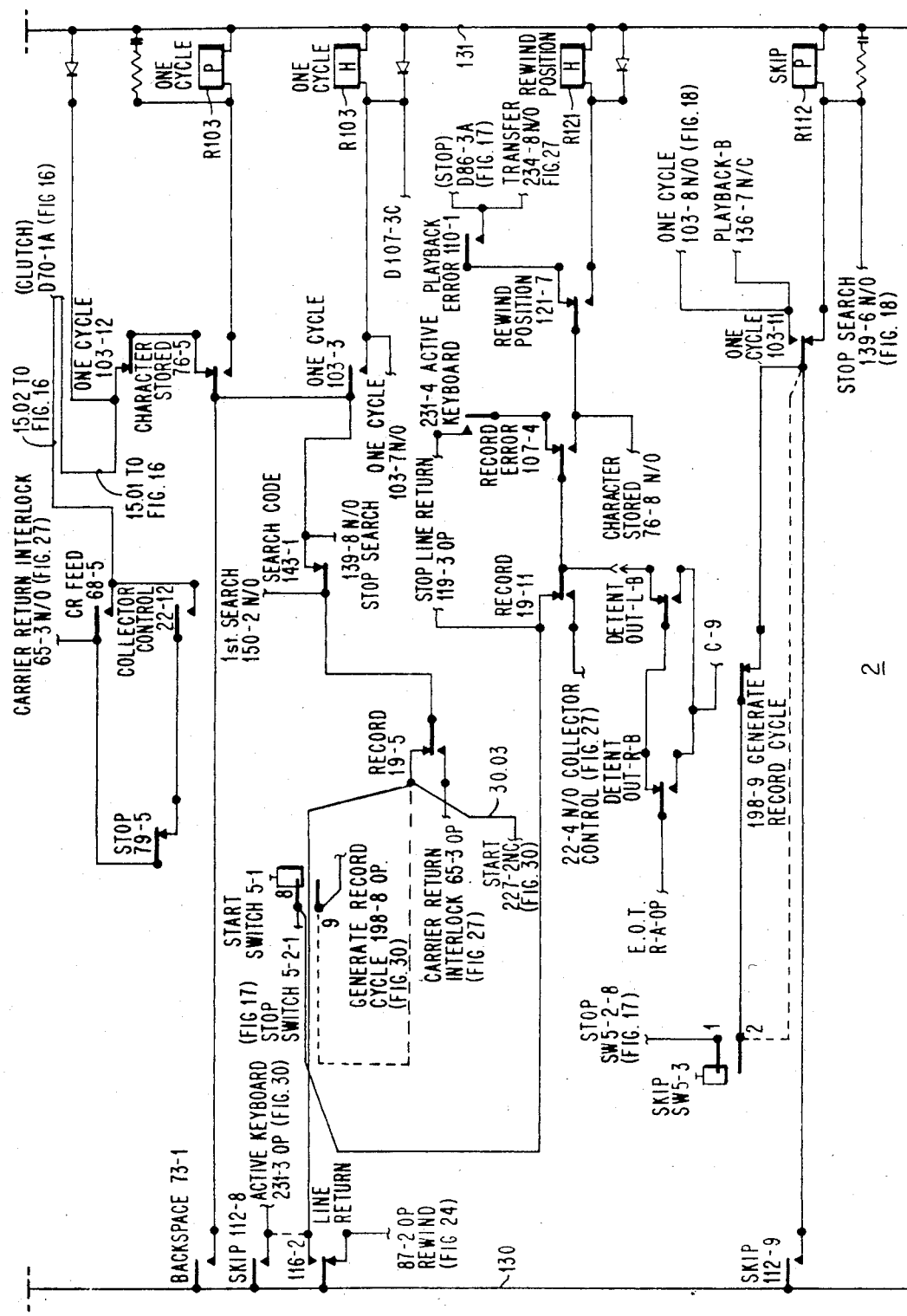
Figure 21B:
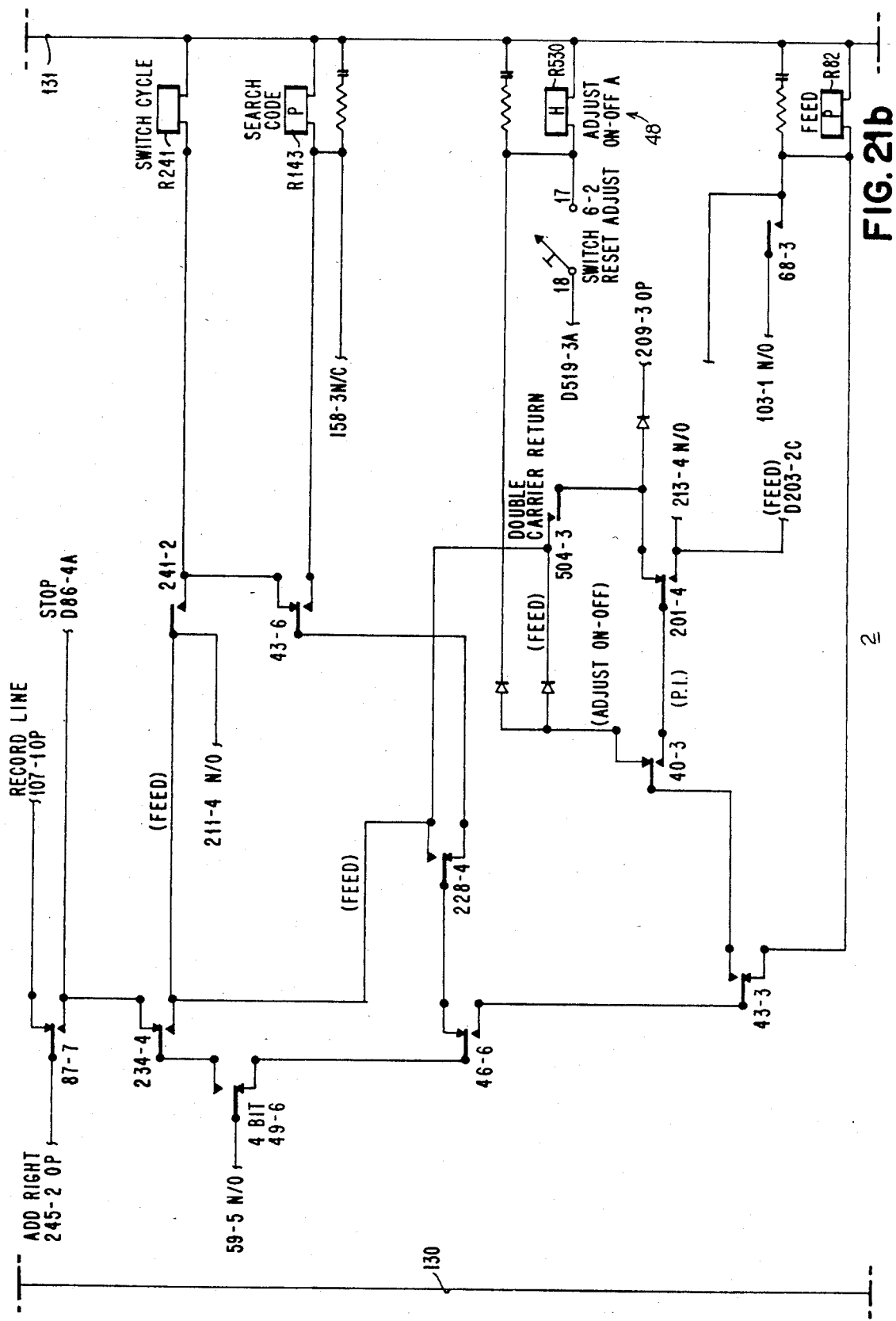

The sequence now continues to FIG. 10 where the Carrier Return No-Step relay contacts 206-5 effect the energization of the Carrier Return magnet 252 in the printer 1, FIG. 21a. This transfers the C-6 contacts, FIG. 19, energizes the Carrier Return Feed relay R68, FIG. 19 as shown in FIG. 10. In FIG. 11, the cycle clutch magnet 200 is now energized, FIG. 16, and the Carrier Return code transmitted from the printer 1 is recorded on the left tape. Concurrently, the One Cycle relay R103, FIG. 15, is picked, and the Feed relay R82, FIG. 21b, is energized. In FIG. 12, the Feed relay R82 effects the recording of a Feed code at the left station 14, FIG. 1. It also energizes the Cycle Clutch Magnet 200, FIG. 16 to initiate a tape cycle. A parallel path picks and holds Collector Control relay R22, FIG. 16.

Figure 25:
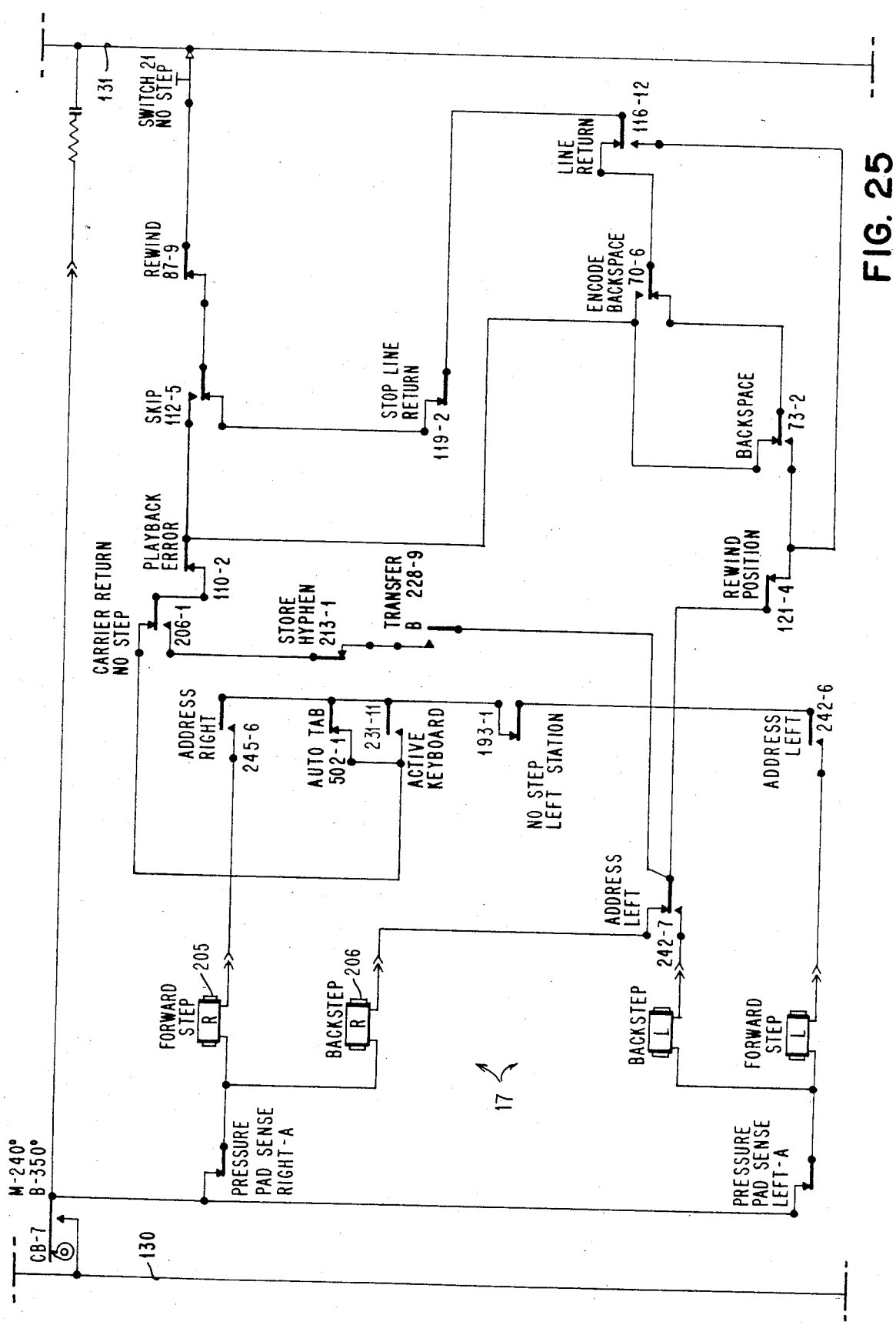

The tape at the right station 12, FIG. 1, has not stepped because during the Active Keyboard mode, the right station 12, FIG. 1, is not being addressed. In FIG. 25, the contacts Pressure Pad Sense Right-A and contacts 245-6 are open, and contact 242-7 is transferred. The apparatus returns to a Transfer Adjust mode, and the second Carrier Return is read from the right tape. As shown in FIG. 2, reading of the Carrier Return code effects operation of the Carrier Return magnet 252, FIG. 21a, through contacts 201-3, normally closed, and contacts 209-5 and contacts 208-4, FIG. 21a.

Sequence B-5, Conversion of Space Code in Region (Right Tape) To a Carrier Return Operation of the Printer and a Carrier Return Code (Left Tape)

Sequence B-5 involves FIGS. 8, 3, 4, 10, 11, 12, 6, and 7, with stepping control in FIG. 9.

The recognition of a Space code in the Region area picks relay R211 (FIG. 3), FIG. 18. As shown in FIG. 8, the Region indication is supplied by relay R214, FIG. 26, and more particularly the 214-2 contacts, FIG. 20b. Also, as shown in FIG. 8, the Carrier Return No-Step relay R206 is picked, FIG. 20b. The sequence then follows through FIGS. 3, 4, 10, 11, 12, 6, and 7 as previously described to change the mode of the apparatus from a Transfer Adjust mode to an Active Keyboard and Record Left mode in order to record a Carrier Return and a Feed code on the left tape and then to return again to the Transfer Adjust mode.

Summary of Sequences B-6, B-1, and B-5

The foregoing summarizes sequences B-6, B-1, and B-5 showing the code conversion as it is handled in the Ross apparatus. It should be kept in mind that the sequences are altered in some respects in the present apparatus, as is described fully hereinafter in the section entitled "Automatic Format Control" in order to achieve the format, indentation, and Adjust On-Off controls proposed by the present invention.

Prior Handling of Format and Indentation Levels

Figure 40:
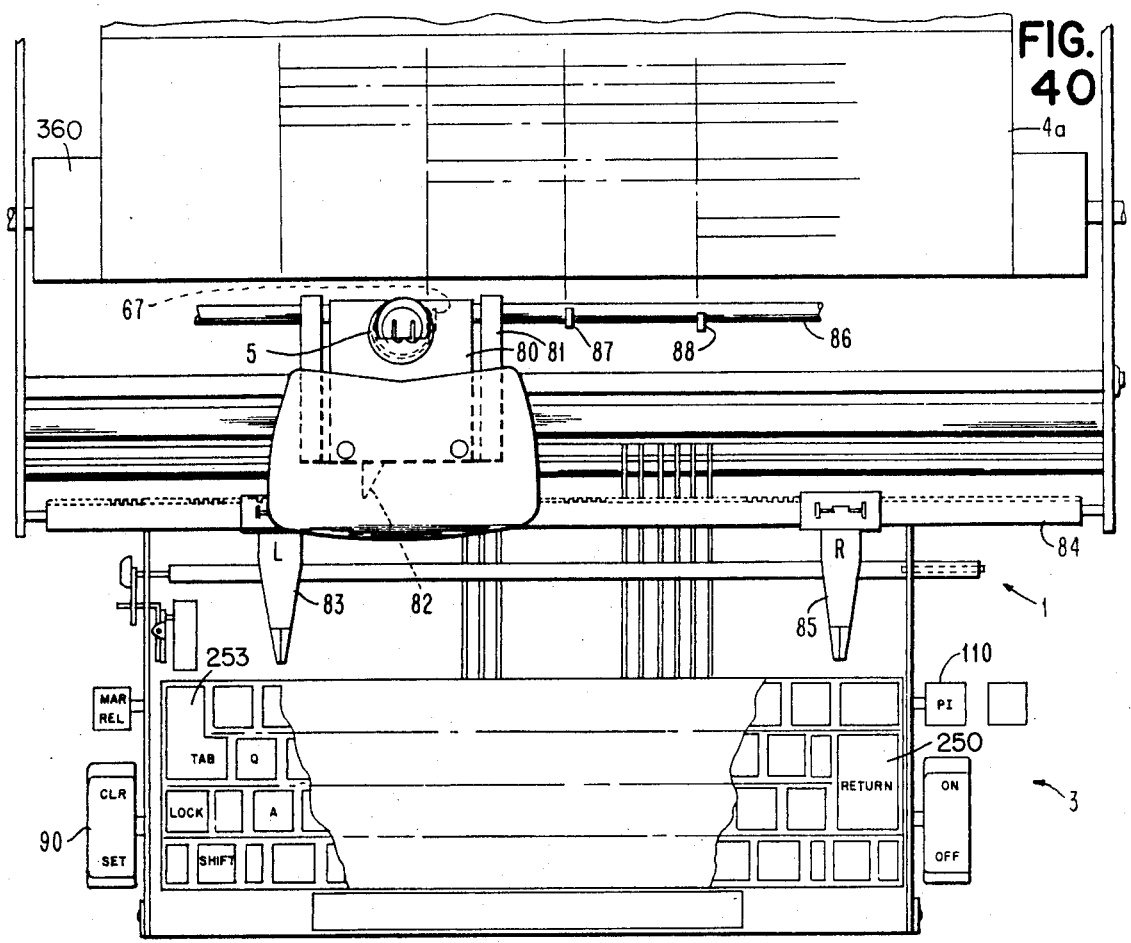
FIG. 40 is a top elevation of a "Selectric" Printer with a document in place and having tab mechanisms that are set and cleared by the mechanism of FIG. 41, which represents a tabulation setting and clearing mechanism.

During the preparation of an original document 4 and the recording of code signals on a magnetic tape in the MT/ST, a number of controls have been provided for controlling the margin settings on the document 4 and the indentation levels desired for individual paragraphs. These arrangements have involved manually manipulated margin members 83 and 85 and representative tab stops 67, 87, and 88 as shown in more detail in FIG. 40, showing printer 1 in more detail. Printer 1 includes various elements such as the aforesaid margin members and tab stops that are known in the art, but is modified for use in the present inventive arrangements, such as by inclusion of the Paragraph Identification (PI) key button 110, to be discussed.

FIG. 40 is a top elevation of printer 1 with keyboard 3 and print head 5. A document 4a with a random variety of indented paragraphs is shown. Print head 5 is mounted on a rocker 80 that is supported in a carrier 81 for movement left to right adjacent the document 4a. A margin stop latch 82 is arranged to contact a left margin stop 83 that is movable on a margin rack 84 to a desired left margin location. A right margin limit 85 determines the right-hand typing limit for document 4a. Printer 1 also has a tab rack 86 with representative tab stops 67, 87, and 88. Tab stop 87 is shown in a reset condition and tab stops 67 and 88 in a set condition.

Figure 41:
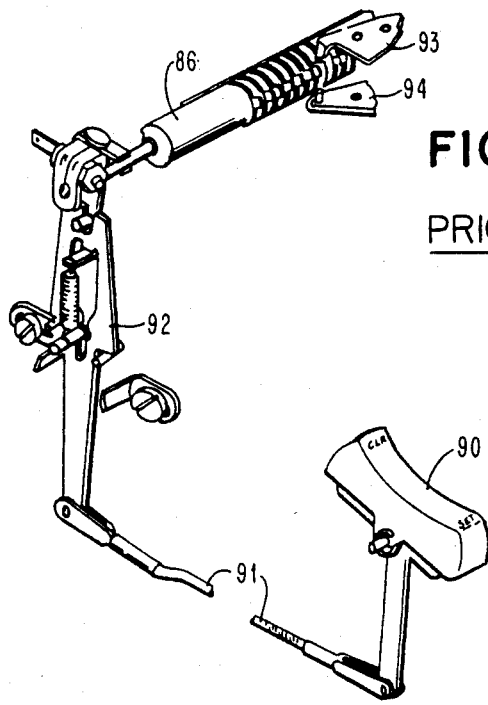

Keyboard 3 has a Set-Clear keybutton 90 arranged to set and clear stops in the rack 86 as shown in FIG. 41. An individual tab stop is set by moving print head 5 to the desired tab location and depressing keybutton 90 at the Set End. This operates a link 91 and a Set and Clear arm 92 and rotates rack 86 in a counterclockwise direction. As rack 86 rotates, the tab stop corresponding to the desired location strikes the escapement bracket projection 93 which rotates the stop in a clockwise direction in relation to the other tab stops on rack 86. Thereafter, the Set stop is effective to encounter a finger on carrier 81 as print head 5 moves to the right in FIG. 40 and thereby stop print head 5 in the desired location so long as the tab stop remains set. The finger on carrier 81 is not shown herein but is fully described in the aforementioned Customer Engineering Manuals.

To clear a previously set stop, print head 5 is again moved to the tab location to be cleared and the Clear portion of keybutton 90 is depressed. This operates the Set and Clear arm 92 to rotate rack 86 clockwise. A tab stop that has been set encounters the escapement bracket projection 94, and is effectively moved counterclockwise to it normal home position which it assumes when keybutton 90 is released. Thereafter, the stop is out of the way of the finger on Carrier 81 and is ineffective.

Format and Indentation Diagrams

A number of format diagrams designated formats A–G are presented below to illustrate some of the difficulties encountered in the handling of specialized formats and to show the effectiveness of the automatic format indentation control, and code conversion arrangements of the present invention.

Format A represents a typical document format and paragraph indentation arrangement that is difficult to handle in prior art apparatus.

The document in Format A has four paragraphs designated 1.0, 1.1, 1.2 and 2.0. All of the paragraphs are indented from the left margin but the paragraph designations are positioned one tab stop to the left of the body of the related paragraph. The lines represent printed lines of information. Each line is ended with a single Carrier Return code with the exception of the last line of each paragraph which is ended with two Carrier Return codes in sequence.

As described in the various "Selectric" manuals and the patents previously noted, a single Carrier Return code effects a return of the print head 5 to the left margin and concurrently operates indexing mechanism, not shown herein, to space the printer 1 one line space. Two Carrier Return codes in sequence are effective to return print head 5 to the left margin and establish an extra line space, that is, a total of two line spaces between paragraphs.

During the printing of a document 4 with the arrangement shown as Format A, no particular difficulties are encountered. The typist sets the left margin stop 83, FIG. 40, to the desired left margin location and thereafter sets the tab stops number 1 and number 2 shown in the diagram to control subsequent paragraph indentation.

| | | FORMAT A | |
|---|---|---|---|
| Left Margin | Tab Stop #1 | Tab Stop #2 | |
| 1.0(Tab) | | | _____(CR) |
| | | | _____(CR) |
| | | | _____(CR) |
| | | | _____. (CR) (CR) |
| (Tab) | 1.1(Tab) | | _____(CR) |
| | | | _____(CR) |
| | | | _____. (CR) (CR) |
| (Tab) | 1.2(Tab) | | _____(CR) |
| | | | _____(CR) |
| | | | _____. (CR) (CR) |
| 2.0(Tab) | | | _____(CR) |
| | | | _____(CR) |
| | | | _____(CR) |
| | | | _____. (CR) (CR) |

With the left margin established and the required tab stops set, the typist thereafter simply operates the Carrier Return keybutton 250 on printer 1 to move to the left margin and controls the beginning of the individual paragraphs by tabbing in the required number of times to reach the desired tap stop. With the apparatus of FIG. 1 in a Record Right or Record Left mode, the characters printed and the functions performed are recorded on the selected magnetic tape as they occur, including the Carrier Return code and Tab codes.

During a conventional Playback operation wherein a previously recorded tape is read and the signals supplied to the printer 1, FIG. 1, no particular difficulties are encountered either, if the left margin member 83 and tab stops 67, 87, and 88 are set to the locations that correspond with those that were used when the information was recorded on the tape.

Format B illustrates some of the difficulties encountered when an Adjust or Transfer Adjust mode of operation is established in the apparatus.

| | | FORMAT B | |
|---|---|---|---|
| Left Margin #1 | Tab Stop #1 | Tab Stop #2 | |
| 1.0(Tab) | | | _____(CR) |
| | | | _____(CR) |
| | | | _____(CR) |
| | | | _____(CR) |
| | | | _____(CR) |
| | | | _____(CR) |
| | | | _____. (CR) (CR) |
| (Tab) | 1.1(Tab) | | _____(CR) |
| | | | _____(CR) |
| | | | _____(CR) |
| | | | _____(CR) |
| | | | _____(CR) |
| | | | _____. (CR) (CR) |
| (Tab) | 1.2(Tab) | | _____(CR) |
| | | | _____(CR) |
| | | | _____(CR) |
| | | | _____(CR) |
| | | | _____(CR) |
| | | | _____. (CR) (CR) |
| 2.0(Tab) | | | _____(CR) |
| | | | _____(CR) |
| | | | _____(CR) |
| | | | _____(CR) |
| | | | _____(CR) |
| | | | _____. (CR) (CR) |

During an Adjust or Transfer Adjust mode of operation, the settings of the left and right margins invariably differ from the settings that were used when the document 4 was originally prepared. As illustrated in the diagram for Format B, individual lines in each paragraph are shorter than they were originally in Format A. The setting of the right margin limit establishes a Region area as described in the Sims U.S. Pat. No. 3,297,124 which through the Adjust Logic 48, FIG. 1, determines line endings during playback of the information, rather than the codes originally recorded on the tape. As described in detail in the Sims patent and as shown in Table A above, the Carrier Return codes, Space codes, and Tab codes are responded to in a different manner during Adjust operations than they are during normal playback operations. As an example, a Carrier Return code encountered between the left margin and the beginning of the Region area is ignored and the printer 1 spaces. On the other hand, a Space code encountered in the Region area notifies the apparatus that this is a convenient place for the end of the line and effects a Carrier Return operation of the printer 1.

Due to the change in the recognition of codes originally recorded as set forth in Table A, and further as set forth in Table B in connection with code conversion, it has not been possible to achieve a format like that shown in Format B with shorter lines from the originally recorded longer line Format A information in an Adjust or Transfer Adjust mode. A Carrier Return code followed by a Tab code is honored as the end of a paragraph and with the change in location of the Carrier Return codes and Tab codes, the resulting printed document is more likely to look like the document shown as Format C. As illustrated there, the document has intermixed indentation levels. End portions of each line are printed in a disconnected fashion at the left margin under the heading "Left Margin."

FORMAT C

| Left Margin | Tab Stop #1 | Tab Stop #2 | |
|---|---|---|---|
| 1.0 | | | _____ |
| ___ | | | _____ |
| ___ | | | _____ |
| ___ | 1.1 | | _____ |
| ___ | | | _____ |
| ___ | 1.2 | | _____ |
| ___ | | | _____ |
| 2.0 | | | _____ |
| ___ | | | _____ |
| ___ | | | _____ |
| ___ | | | _____ |

Several procedures have been used heretofore to achieve the arrangement shown in Format B from the originally recorded Format A. In one such procedure, Start Condition Control knob 21 is set to the "Line" Position which stops the reading and printing action at the end of each line, that is, when the print head 5 has returned to the left margin. Thereafter, the typist manually operates the Tab button such as Tab button 253, FIG. 40, to the desired indentation level and restarts the apparatus to read and print the succeeding line of information.

In another procedure, the operator manually repositions the left margin stop 83 to the required indentation level such as shown in Format D.

This requires that the operator manually reset the left margin 83 to the positions 1, 2, or 3 to control indentation levels as shown in Format D.

It is apparent that any procedure like those just discussed is time consuming and may lead to errors in the finished document.

FORMAT D

| Left Margin #1 | Left Margin #2 | Left Margin #3 | |
|---|---|---|---|
| 1.0 | | | _____ |
| | | | _____ |
| | | | _____ |
| | 1.1 | | _____ |
| | | | _____ |
| | 1.2 | | _____ |
| | | | _____ |
| 2.0 | | | _____ |
| | | | _____ |
| | | | _____ |

-continued

FORMAT D

| Left Margin #1 | Left Margin #2 | Left Margin #3 |
|---|---|---|
| _____ | | |
| _____ | | |
| _____ | | |
| _____ | | |

AUTOMATIC FORMAT CONTROL

Introduction

The difficulties described in connection with Formats A–D, just discussed, are obviated by the present inventive arrangements. The document Format B is easily derived from an originally recorded Format A in a simple and automatic manner necessitating a minimum of attention on the part of the operator.

The preferred embodiment described herein is primarily electronically oriented, and uses the printer 1, FIG. 40. The tab Set and Clear mechanism of FIG. 41 is used unmodified from a mechanical standpoint.

Referring to FIG. 1, the tape in cartridge 13 at the right tape station 12 is assumed to contain the coded information corresponding to that shown in document 60. An example of an adjusted format to be prepared on printer 1 is shown on document 4 with the individual lines in the paragraphs shortened in comparison with the lines on document 60. In a sense, document 60 can be related to Format A and document 4 to Format B, the latter format having shorter lines than the former.

In a Transfer Adjust mode, the normal Adjust operations prevail together with the code conversion procedures taught in the Ross patent. The Carrier Return operation for print head 5 to move it to the left margin on document 4 occurs in response either to a Carrier Return code or a Space code encountered in the Region area. Two Carrier Return codes in sequence are used to identify the end of a paragraph and the beginning of a new paragraph. Considering the circuit blocks in FIG. 1 more closely, the recognition of the first line of a paragraph controls a primary counter 100 to count the tabs that occur prior to the recognition of a Carrier Return code read from the tape or a physical Carrier Return operation occurring in the Region area on document 4. Subsequently, as to each paragraph, the printer tabulating mechanism partially illustrated in FIG. 40, for example, as including elements 67 and 86-88 but more fully described in the aforementioned Customer Engineering Manuals is rendered effective to perform tab operations that equal in number the stored count in primary counter 100, FIG. 1. This is done by stepping a secondary counter 101, FIG. 1, each time a tab operation is performed and comparing the counter 100 and 101 states by compare block 102, FIG. 1.

The occurrence of two Carrier Return codes in sequence resets primary counter 100 and prepares it to count the tab operations in the first line of a succeeding paragraph. The controls required for indentation are represented by the paragraph indent logic block 103, FIG. 1.

The object of the paragraph indent logic in block 103, FIG. 1, is to count the Tab codes used in printing the first line of a paragraph and indent all subsequent lines of that paragraph to the same tab level.

Figure 33:
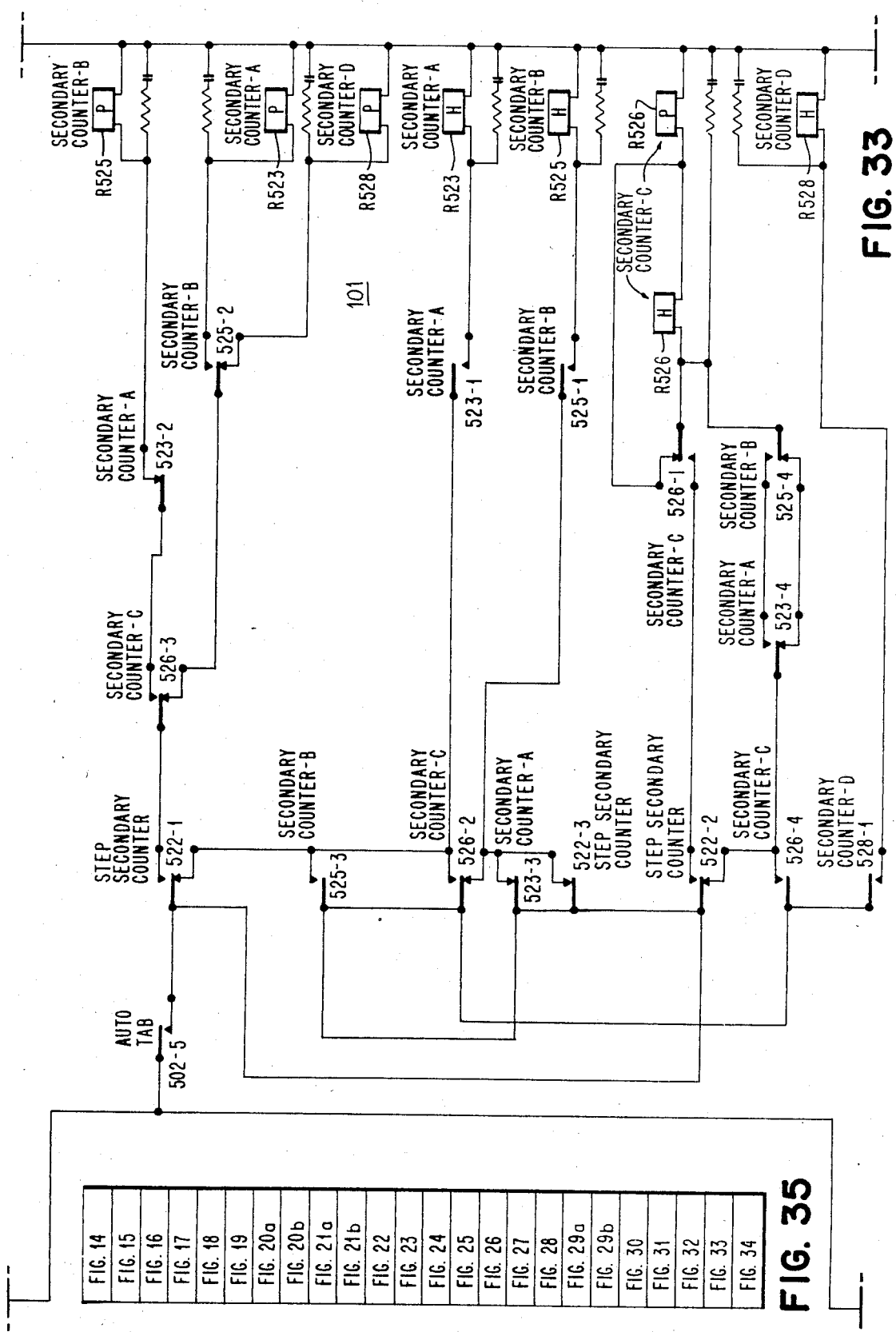
Figure 34:
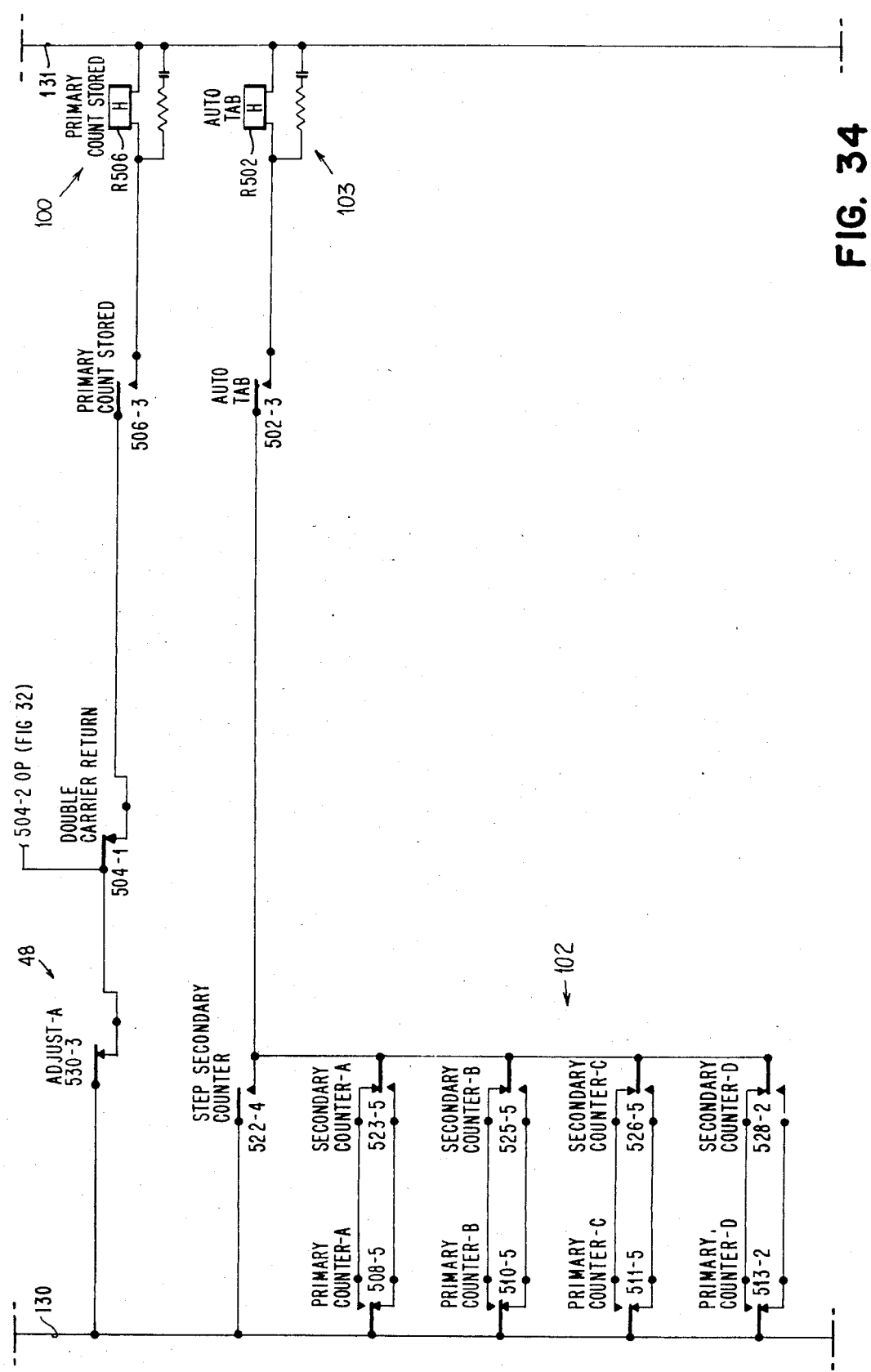
Figure 36:
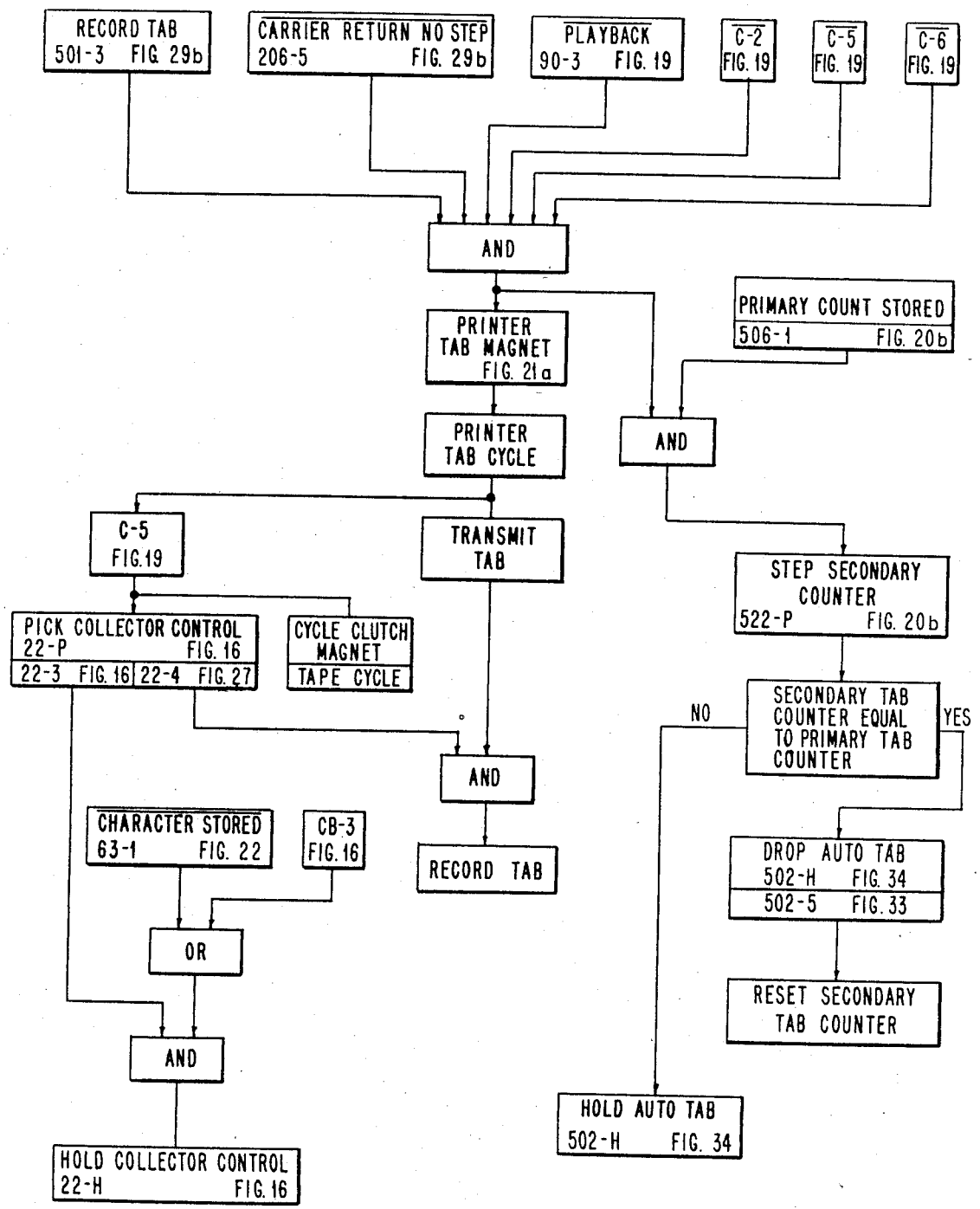
FIGS. 36-39 are additional flow charts related to the flow charts of FIGS. 2-13.

The "First Line" and "Primary Count Stored" conditions are opposites and are shown in FIGS. 2, 12, 21a, and 34. When relay R506 is down, the system is working the first line of a paragraph and each Tab code will step the primary counter 100 FIG. 20b (See also FIGS. 8, 32, 37). After the first line when a line ending is generated, the system adds in tab operations and counts each one by stepping the secondary counter 101, FIG. 20b (see also FIGS. 8, 33, 36) and compares the secondary count to the primary count until an equal condition exists (FIGS. 8, 34, 36). When the equal condition is present, relay R502 (FIG. 34) will be dropped and reading and printing on that line begins.

Figure 42:
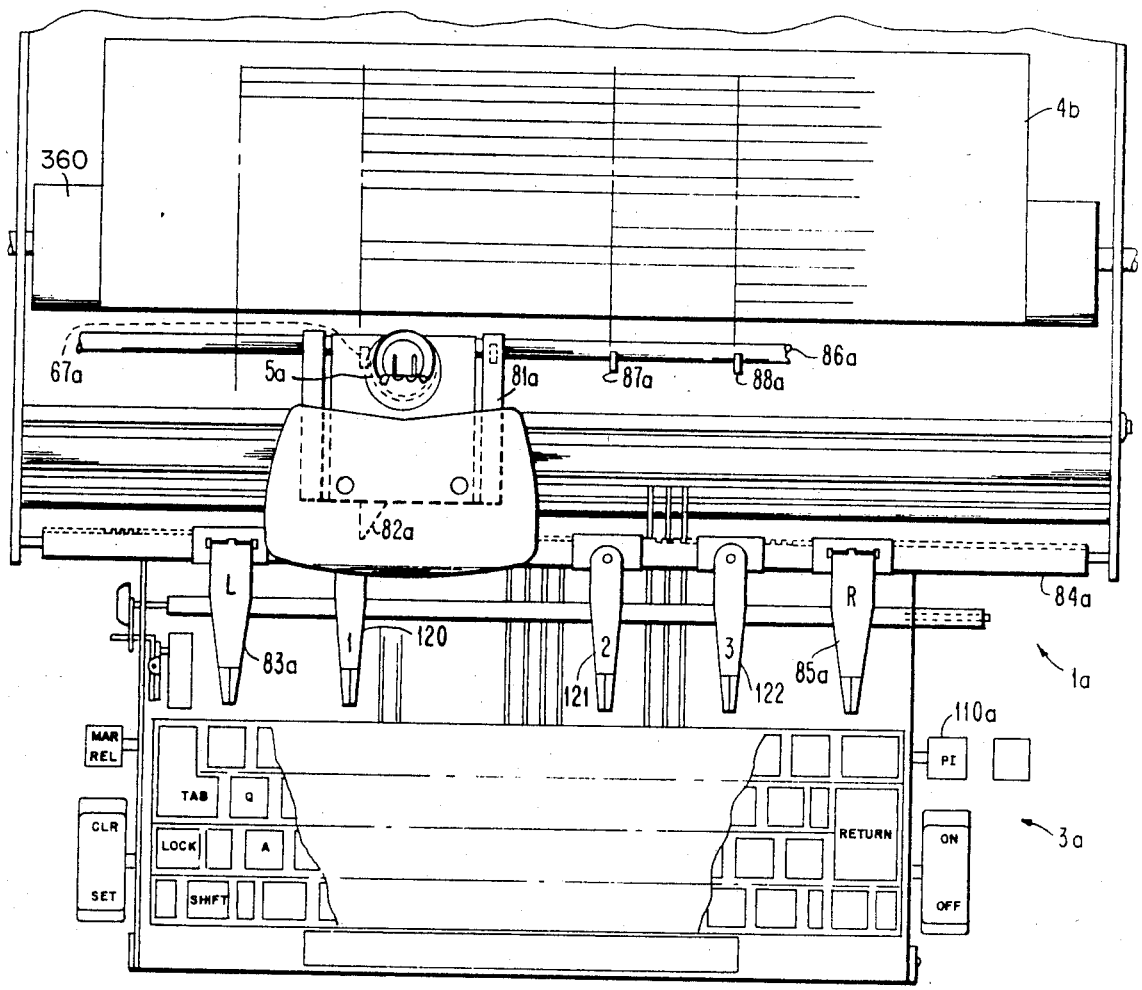
FIGS. 42-44, together with FIGS. 49 and 50, illustrate a "Selectric" Printer that is provided with variable length left margins selectively actuated under counter control.
Figure 44:
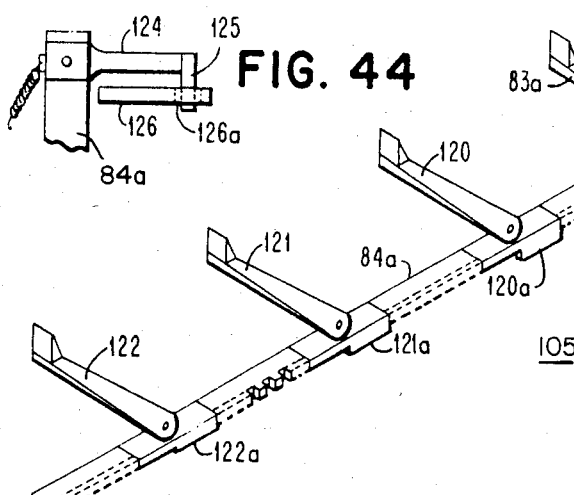
Figure 43:
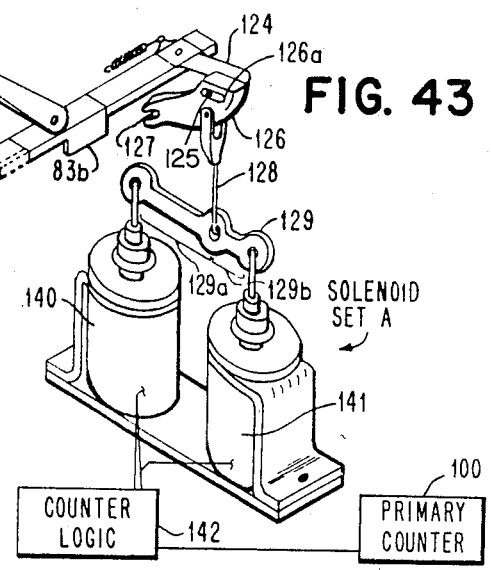
Figure 49:
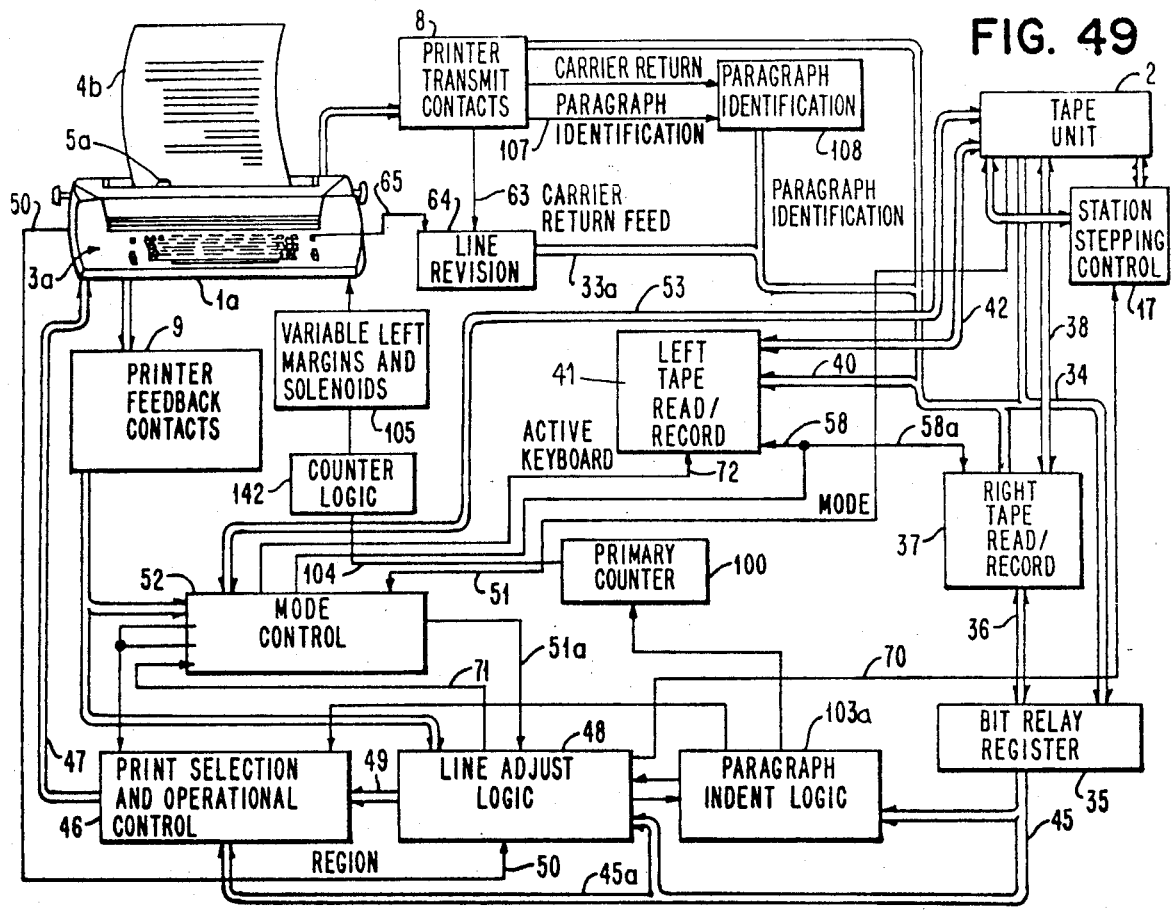

The alternative variable left margin method disclosed in FIGS. 42-44 is controlled by line 104 from the primary counter 100 which selects a particular left margin through the circuits in block 105, FIG. 49.

Figure 45:
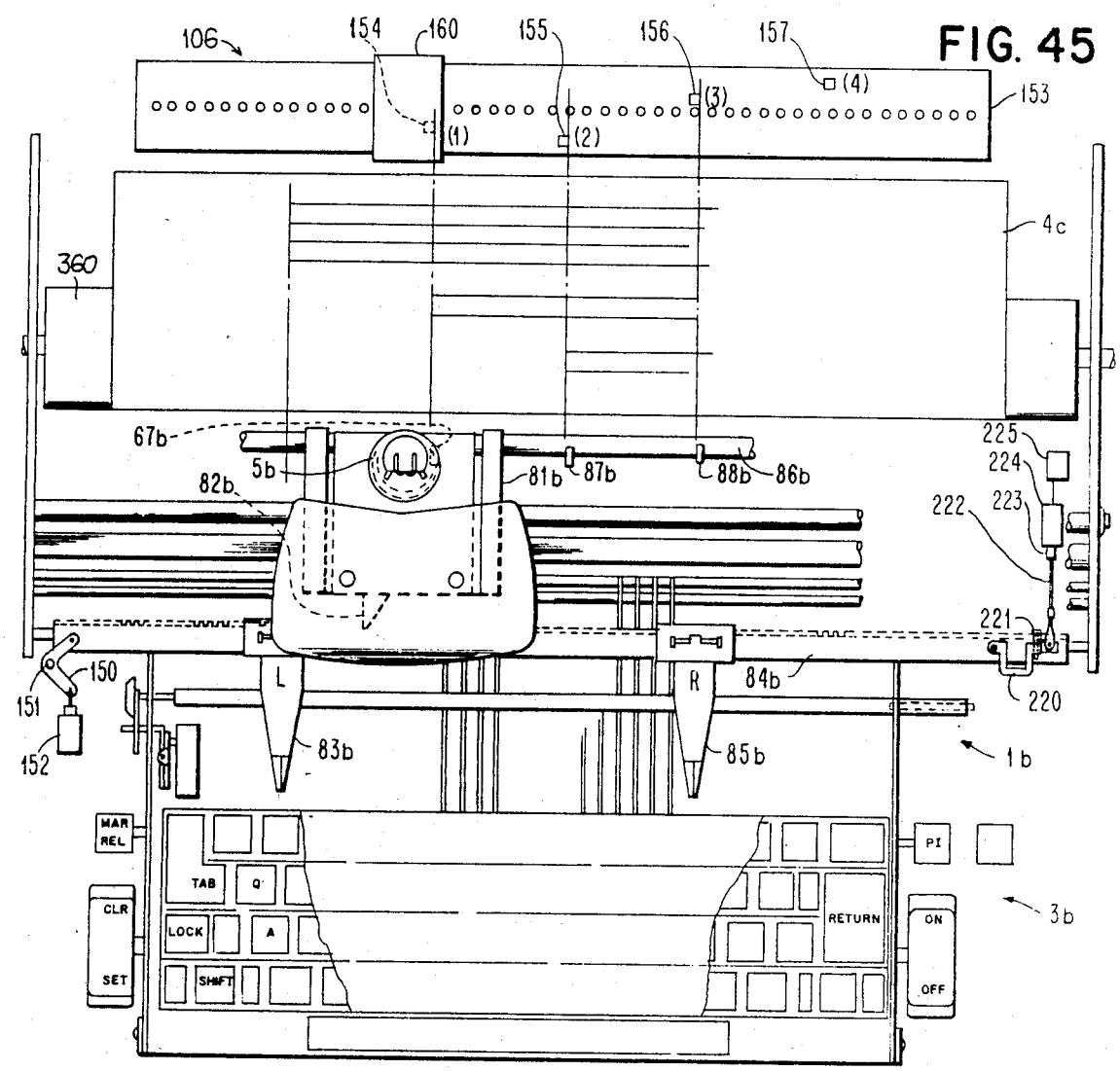
FIGS. 45 and 46, together with FIG. 51, illustrate a "Selectric" Printer with an associated program tape and circuitry responsive to count conditions for establishing indentation levels.
Figure 46:
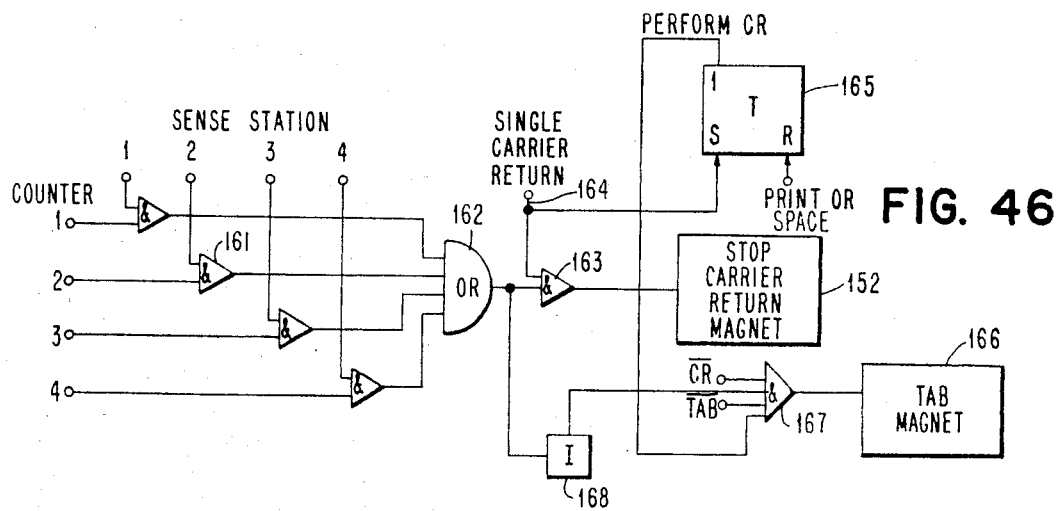
Figure 51:
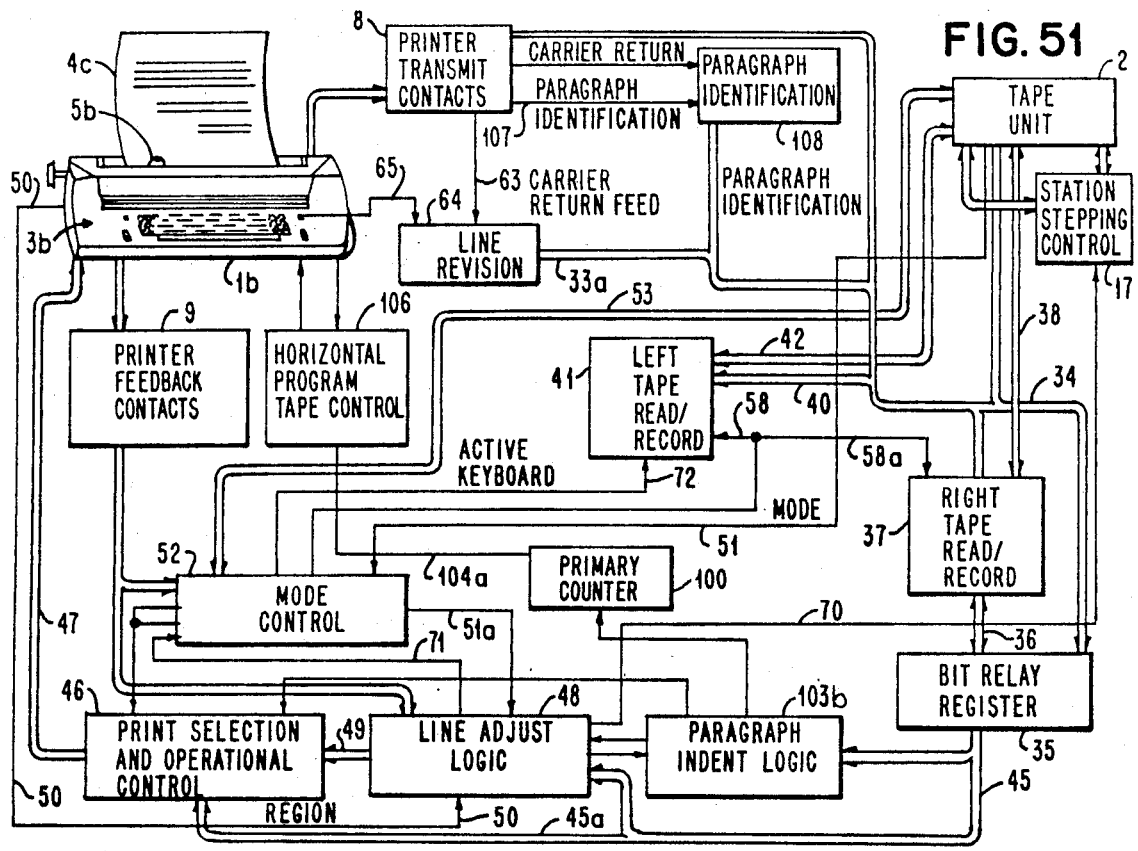

The horizontal program tape version of FIGS. 45 and 46 is represented by block 106, FIG. 51, that is shown as an alternative technique controlled by primary counter 100 for establishing a particular indentation level automatically in the apparatus.

Figure 47:
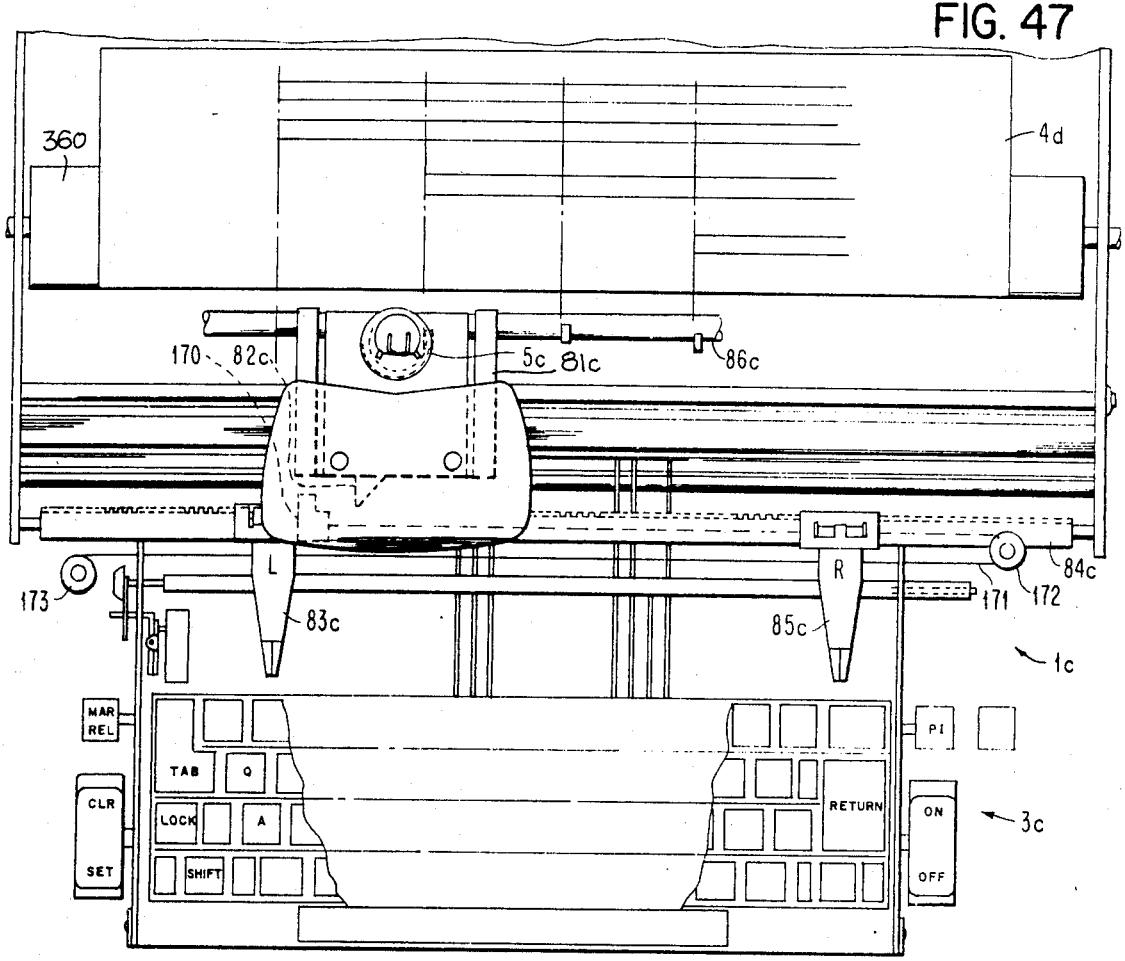
FIGS. 47 and 48, together with FIG. 52, illustrate a variable left margin mechanism in a "Selectric" Printer involving a follower stop that is operated to establish different indentation levels.
Figure 48:
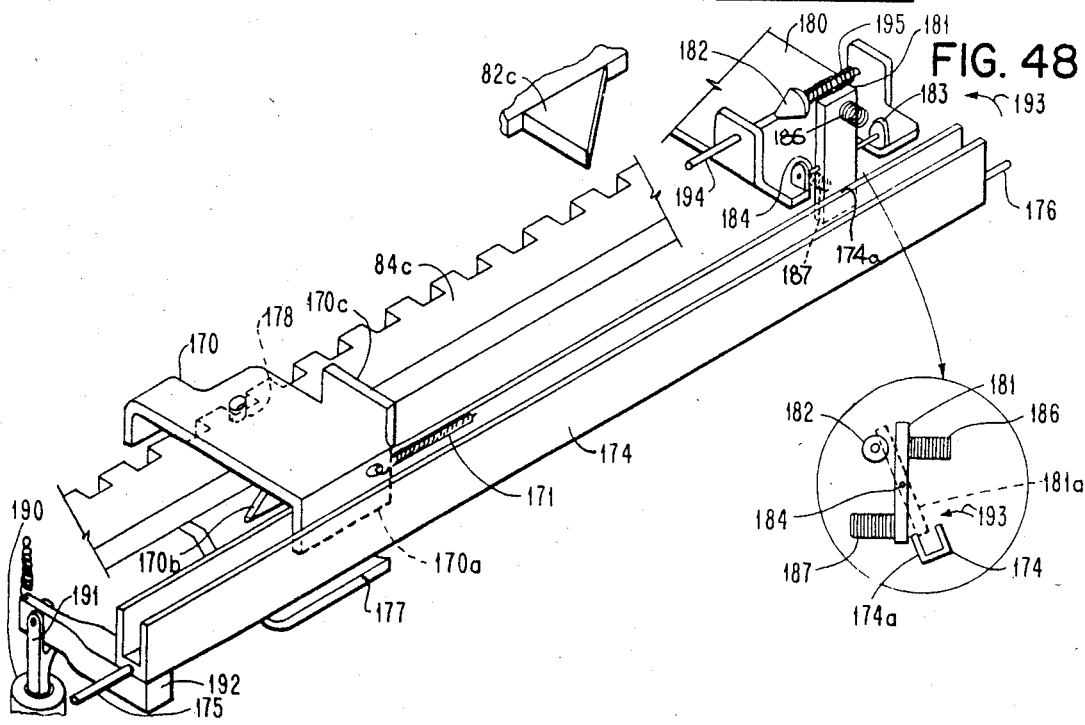
Figure 52:
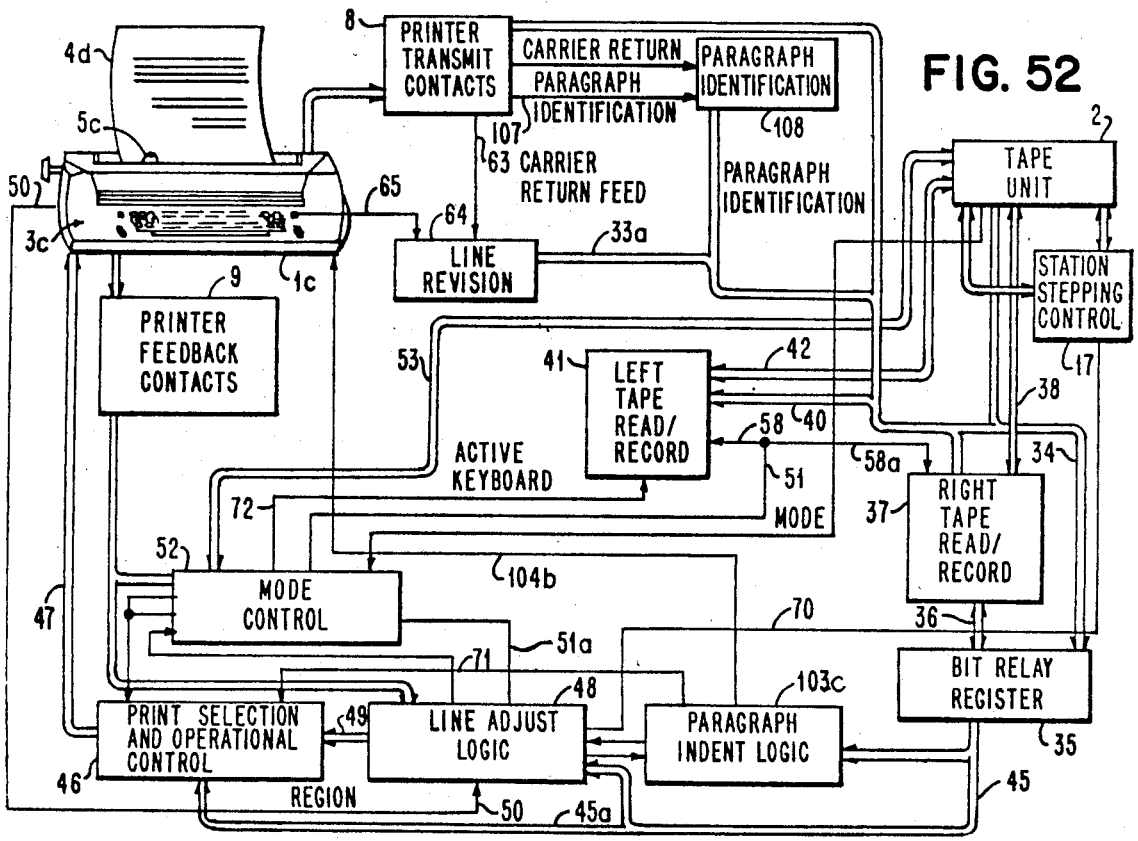

The embodiment of FIGS. 47 and 48 involves mechanical modifications inside of printer 1c controlled as shown in detail in FIG. 52 by line 104b.

A special paragraph identification (PI) code by line 107 to the paragraph identification block 108, FIG. 1, may be used as an alternative paragraph recognition procedure rather than the two successive Carrier Return codes shown in Format A. This will be described subsequently in connection with Format E.

Functional Specifications for Automatic Format Control

The following will serve to indicate the objectives attained in the present apparatus and will also illustrate some of the paragraph indentation requirements such as those in Format B encountered in some routines. The printing of such paragraphs is described in the later section, "Reading Format A (Right Tape) and Printing Format B Concurrently with Recording Format B (Left Tape)."

Figure 32:
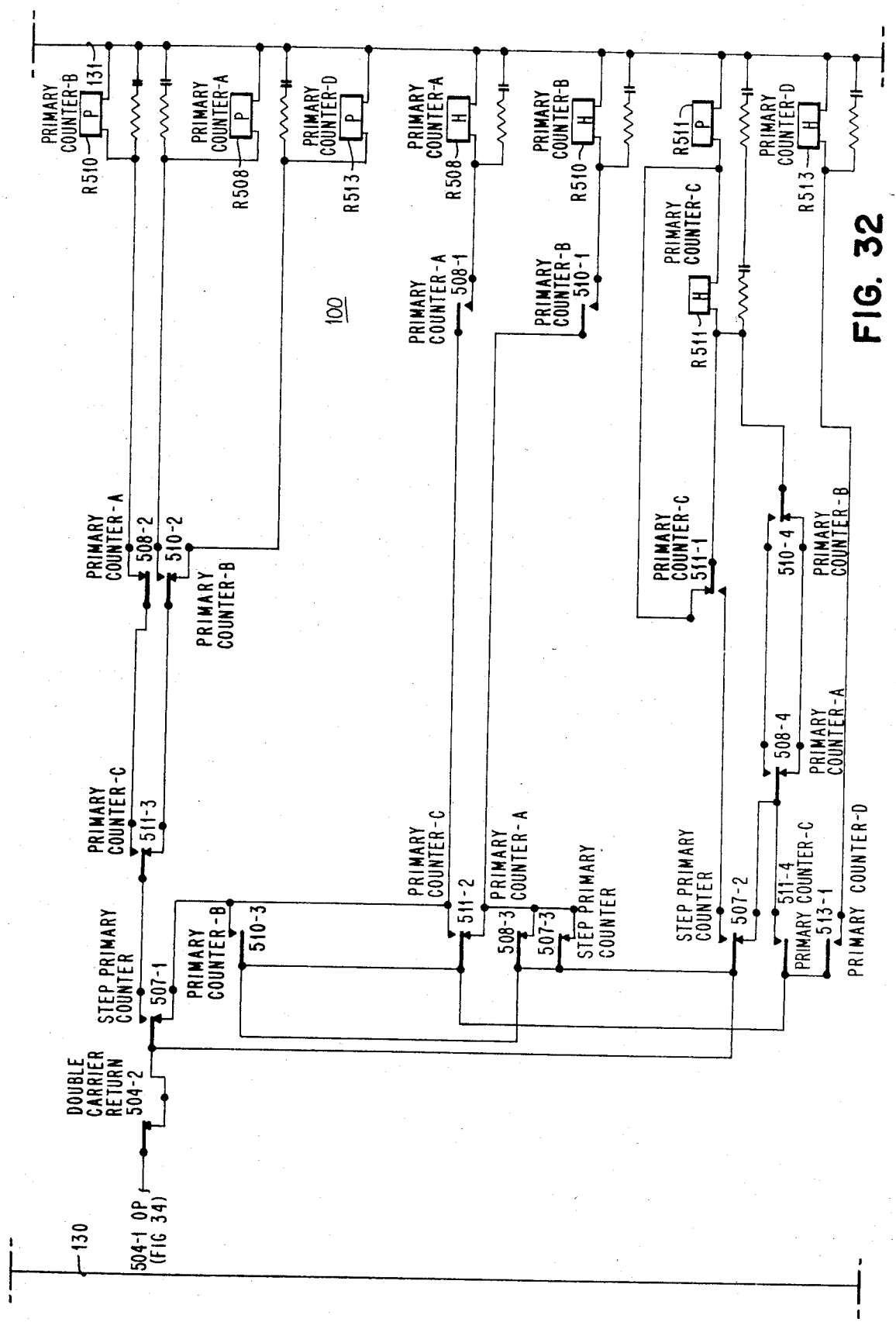

FUNCTIONAL SPECIFICATIONS 1.0. GENERAL DESCRIPTION
 1.1. Feature Definition
  The Indented Format feature for the MT/ST provides for "Adjusting" revised indented material or outline formats. The MT/ST is basically a block format machine. That is, the left-hand margin serves as the starting point for each line of the material as it is played back in "Adjust." These Functional Specifications are a good example of an application that cannot be easily "adjusted." In the basic MT/ST the operator has to stop the machine and reset the left-hand margin each time the indentation level changes.
 1.2. Additional Information
  "Code Conversion in Transfer Adjust" is provided on all machines with the "Indented Format" feature.
 1.3. Capacity
  This feature is designed to provide seven (7) levels of indentation as standard. Additional indentation levels can also be provided.
2.0. PHYSICAL
 2.1. Changes
  Three changes are made to the outward appearance of the MT/ST with this feature.
  2.1.1. Two additional lights, not shown, may be added to the console 2. When provided they indicate if the machine is in or out of the Adjust mode.
  2.1.2. The Stop code button is replaced with a keybutton labeled "Adjust On/Off" (AO). See switch 6-2 in FIG. 27.
  2.1.3. The Revise Carrier Return keybutton is replaced with a keybutton labeled P.I. (Paragraph Identification).
3.0. CODES
 3.1.
  Two additional codes are added to the MT/ST code set. These two codes are recognized as Feed codes if read by a machine without this feature. They are also recognized as Feed codes if they are read by an "Indented Format" machine when the mode dial 20 is in "Play" or "Transfer Play".
4.0. OPERATIONAL CHARACTERISTICS
 4.1. Record
  Recording techniques are the same as on a basic MT/ST with the following exceptions.
  4.1.1. A Carrier Return code followed by a Tab Code is not recognized as a paragraph identification.
  4.1.2. It is not possible to record a "Stop code."
  4.1.3. The Revise Carrier Return operation records a Carrier Return and a P.I. (Paragraph Identification) code.
 4.2. Paragraph Identification
  Paragraph Identification is accomplished by recording two successive Carrier Return codes or Carrier Return and Paragraph Identification codes.
 4.3. Paragraph Indentation Levels
  Indentation levels are maintained by the primary counter 100, FIG. 1. When setting up an indentation level, the apparatus counts and remembers the number of tabs in the first line. Additional lines that are to be typed from that indentation level may be recorded from the left-hand margin.
 4.4. Resetting
  The primary counter 100, comprising relays R508(A), R510(B), R511(C), and R513(D) in FIG. 32, is reset in the following manner.
  4.4.1. Reading two successive Carrier Return codes.
  4.4.2. Reading Carrier Return and Paragraph Identification codes in sequence.
  4.4.3. Reading "Adjust On-Off" (AO) Code.
  4.4.4. Depressing the "Adjust On-Off" button in Playback.
 4.5. Playback Adjust
  When playing back in "Adjust", the feature has the following characteristics.
  4.5.1. Once an indentation level has been established, the apparatus automatically tabs to that indentation level with each succeeding line even though tabs are not recorded in the original tape record media.
  4.5.2. Tab codes that are recorded but not used to establish the indentation level are skipped.
  4.5.3. If the machine is in "Playback Adjust" and an "Adjust On-Off" code is read, the mode is changed to Playback, the Tab count is reset, and the appropriate Adjust lamp when provided in lamp group 27 or 28, FIG. 1, on the console 2 turns off.

4.5.4. If the knob 20, FIG. 1 is in "Playback Adjust" but the machine is in a "Playback" mode and an "Adjust On-Off" code is read, the mode changes to "Playback Adjust" and the Adjust light turns on. The primary counter, 100, FIG. 1, is at zero but ready to establish a new indentation level.

4.5.5. If the machine is in "Playback Adjust" and the "Adjust On-Off" button is depressed, closing switch 6-2, FIG. 27 the mode will change to "Playback", the primary counter 100, FIG. 1 resets, and the Adjust light on the console 2 turns off.

4.5.6. If the machine is in "Playback Adjust" but in the "Playback" mode and the "Adjust On-Off" button is depressed, the mode changes to "Playback Adjust" and the Adjust light on the console 2 turns on. The primary counter 100, FIG. 1, is at zero but ready to establish a new indentation level.

4.6. Transfer Adjust (Code Conversion in transfer is normally provided on all machines equipped with the Indented Format feature.) When playing back in "Transfer Adjust," the feature has the following characteristics.

4.6.1. Once the indentation level has been established by the right tape, the apparatus automatically Tabs to the established indentation level with each succeeding line even though Tab codes are not recorded on the right tape. Since the machine is also equipped with Code Conversion, the left tape matches the hard copy on the printer 1, FIG. 1, and all machine Tabs will be recorded on the left tape even though they were not originally recorded on the right tape.

4.6.2. Tab codes that are recorded on the right tape but not used to establish an indentation level are automatically skipped and not transferred to the left tape unless they coincide with machine tab operations.

4.6.3. If the machine is in "Transfer Adjust" mode and an "Adjust On-Off" code is read, the mode is changed to "Transfer Playback", the primary counter 100, FIG. 1, is reset and the Adjust light on the console 2 turns off. When the mode is "Transfer Playback", Code Conversion does not apply and the machine reacts to and transfers codes exactly as they are recorded on the right tape.

4.6.4. If the knob 20, FIG. 1 is in "Transfer Adjust" mode but the machine in in "Transfer Playback", mode and an "Adjust On-Off" code is read, the mode is changed to "Transfer Adjust" and the Adjust light will turn on. The primary counter 100, FIG. 1 is at zero but ready to establish a new indentation level.

4.6.5. If the machine is playing in "Transfer Adjust" and the "Adjust On-Off" button is depressed, the same action transpires as in paragraph 4.6.3 above.

4.6.6. If the knob 20, FIG. 1, is in "Transfer Adjust" but machine in the "Transfer Playback" mode and the "Adjust On-Off" button is depressed, the same action transpires as in paragraph 4.6.4.

Table C shows the changes made in the handling of data according to the automatic format, mode control, and code conversion arrangement disclosed herein. Table C, in effect replaces Tables A and B. The sequences are numbered C-1 to C-12. The sequences do not necessarily relate to sequences with corresponding numbers in Tables A and B.

TABLE C

| Right Tape Code Sequence | No Line Ending Condition (Not Region) | | Line Ending Condition (Region) | | Tab Counter Action |
|---|---|---|---|---|---|
| | Typewriter Action | Left Tape Code Sequence (Transfer Mode Only) | Typewriter Action | Left Tape Code Sequence (Transfer Mode Only) | |
| C-1 Successive Carrier Returns | Space, Successive Carrier Returns | (1)Normal | Space Successive Carrier Return | (1)Normal | Counter resets on second carrier return code. |
| C-2 CH,CR(s), Tab(s), CH | CH,SP, CR(s), Tab(s), CH | (1)Normal | CH,SP, CR(s), Tab(s),CH | (1)Normal | Counter resets, counts and stores the number of tabs in the right tape tab sequence. |
| C-3 CH,CR(s), Tab(s), CH | CH,Space CH | (2)CH,Space CH | (3)CH,SP CR,Tab(s), CH | (1)(3) Normal | Note (3) |
| C-4 CH,SP(s), SP,CH | Normal | Normal | (3)CH, SP(s),SP CR,Tab(s), CH | (1)(3) CH,SP(s), CR,Tab(s), CH | Note (3) |
| C-5 CH,SP(s) CR,Tab(s) CH | CH,SP(s), SP,CH | (2)CH,SP(s), SP,CH | (3)CH, SP(s),SP, CR,Tab(s), CH | (1)(3) Normal | Note (3) |
| C-6 | | | | | |

TABLE C-continued

| Right Tape Code Sequence | No Line Ending Condition (Not Region) | | Line Ending Condition (Region) | | Tab Counter Action |
|---|---|---|---|---|---|
| | Typewriter Action | Left Tape Code Sequence (Transfer Mode Only) | Typewriter Action | Left Tape Code Sequence (Transfer Mode Only) | |
| CH,SP, HYP(s), SP,CR | Normal | Normal | (3)CH,SP HYP(s),SP, CR,Tab(s), CH | (1)(3) CH,SP, HYP(s) CR,Tabs, CH | Note (3) |
| C-7 | | | | | |
| CH,SP, HYP(s), SP,CR, Tabs,CH | CH,SP, HYP(s), SP,CH | (2)CH,SP, HYP(s),SP, CH | (3)CH,SP, HYP(s),SP, SP,CR, Tabs,CH | (1)(3) Normal | Note (3) |
| C-8 | | | | | |
| CH,HYP(s), CH | Normal | Normal | (3)CH, HYP(s),CR, Tab(s),CH | (1)(3) CH,HYP(s), CR,Tab(s), CH | Note (3) |
| C-9 | | | | | |
| CH,HYP(s), CR, Tab(s), CH | CH,HYP(s), CH | (2)CH,HYP(s), CH | (3)Normal | (1)(3) Normal | Note (3) |
| C-10 | | | | | |
| CH,SP, BSP,HYP, CH | CH,SP, BSP,CH | Normal | (3)CH,SP, BSP,HYP CR,Tab(s), CH | (1)(3) CH,SP, BSP,HYP, CR,Tab(s), CH | Note (3) |
| C-11 | | | | | |
| CH,SP, BSP,HYP, CR,Tabs, CH | CH,SP, BSP,CH | (2)CH,SP, BSP,HYP,CH | (3)Normal | (1)(3) Normal | Note (3) |
| C-12 | | | | | |
| CH,Tab(s), CH | Ch,CH | CH,CH | CH,CH | CH,CH | None |

Notes
(1)The first carrier return in these sequences will be generated and will be followed by a feed code.
(2)Feed Codes in the sequences will be omitted.
(3)Tabs added in will be equal to the number stored in the tab counter and not necessarily equal to those in the right tape sequence.
CH - Designates any print character except hyphen; HYP - Hyphen; SP - Space; CR - Carrier Return; BSP - Backspace.

Circuit Reference Table

The following tabulation will serve as a cross reference between the block diagram of FIGS. 1, 43, 49, 50, 51 and 52 and the detailed circuits of FIGS. 14–34, with the block number being listed and the corresponding detailed circuit figure being shown in each case in parentheses underneath. The items are listed or commented upon only where they appear to be useful cross references.

Figure 19:
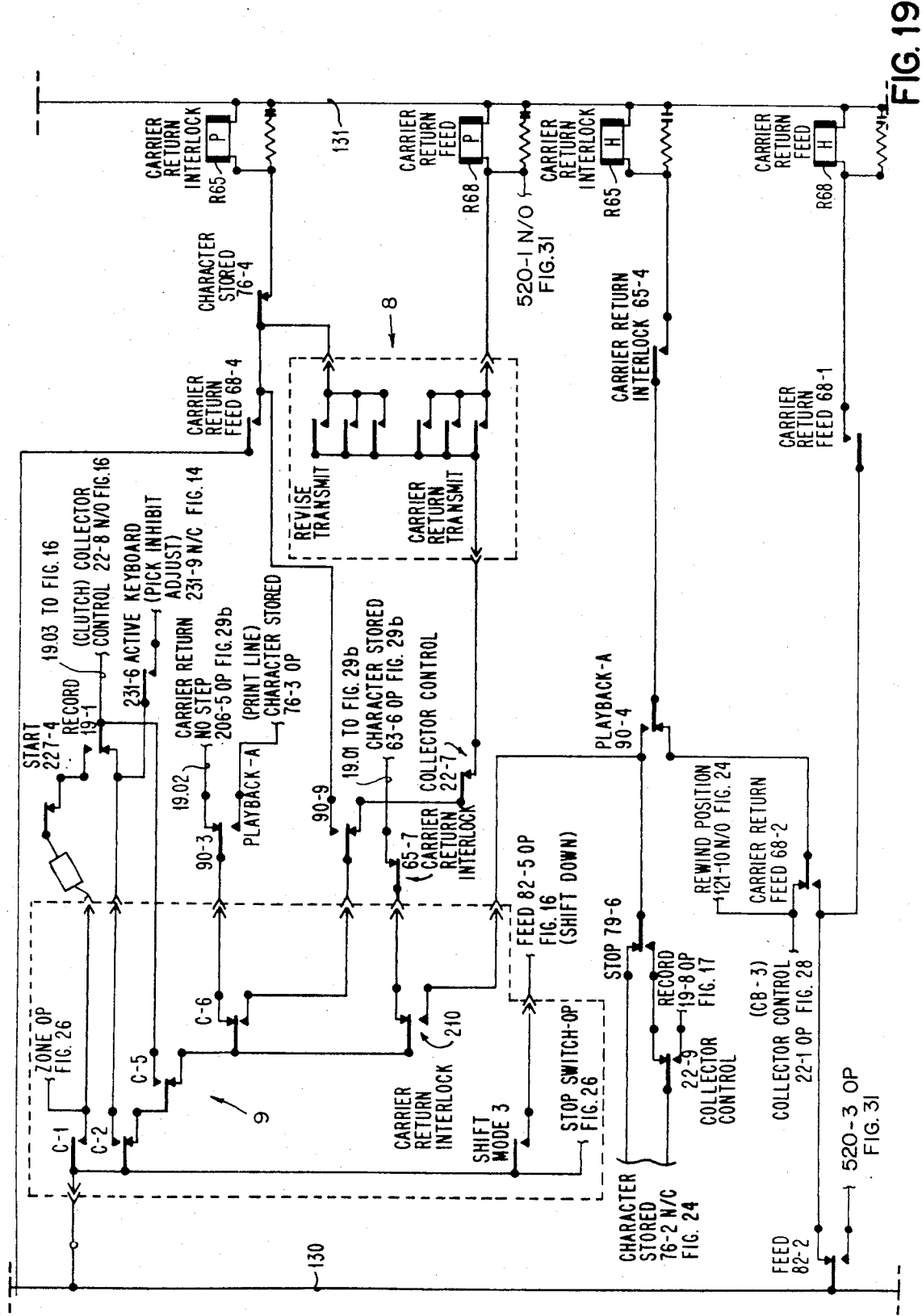
Figure 20A:
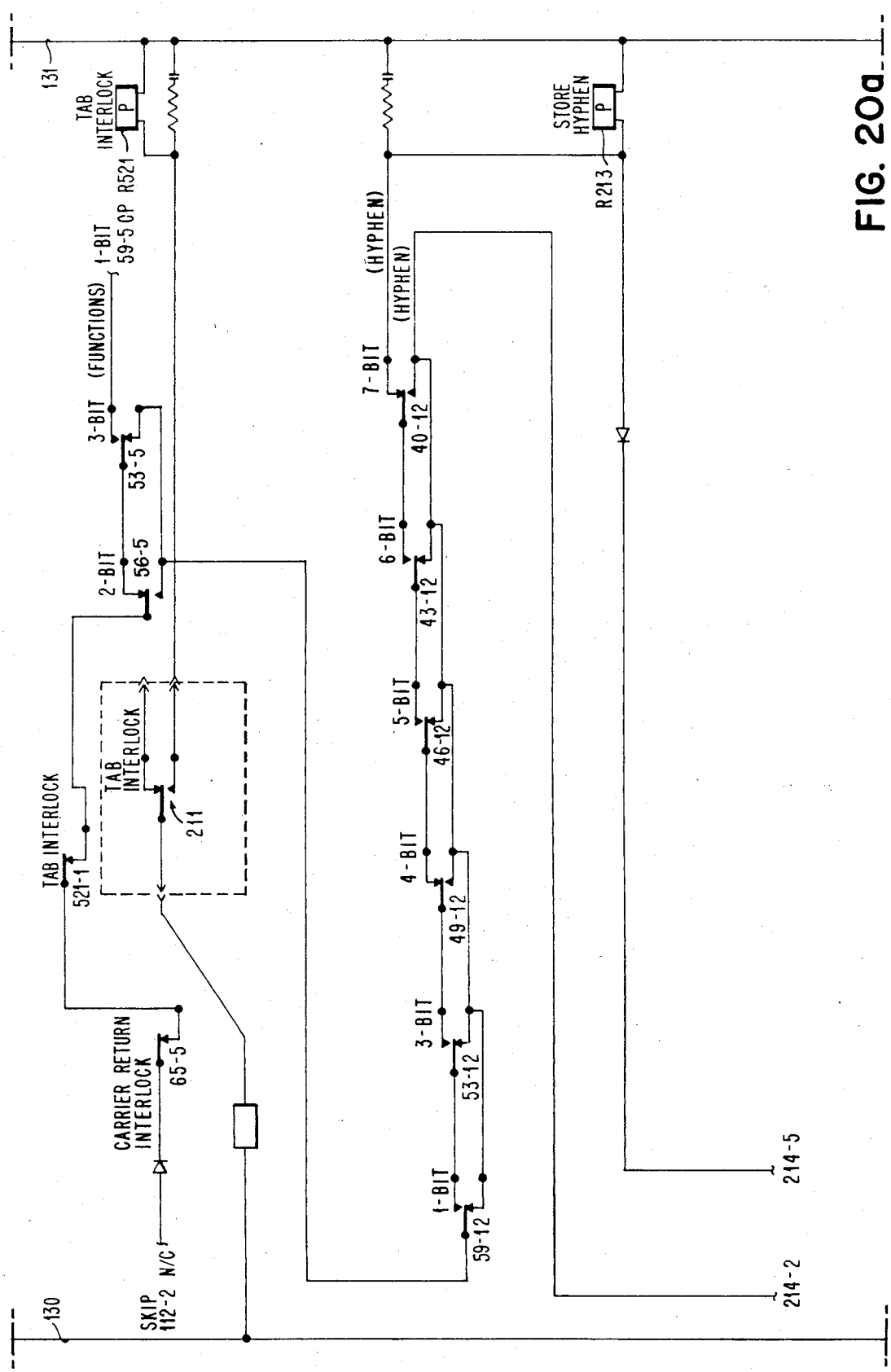
Figure 50:
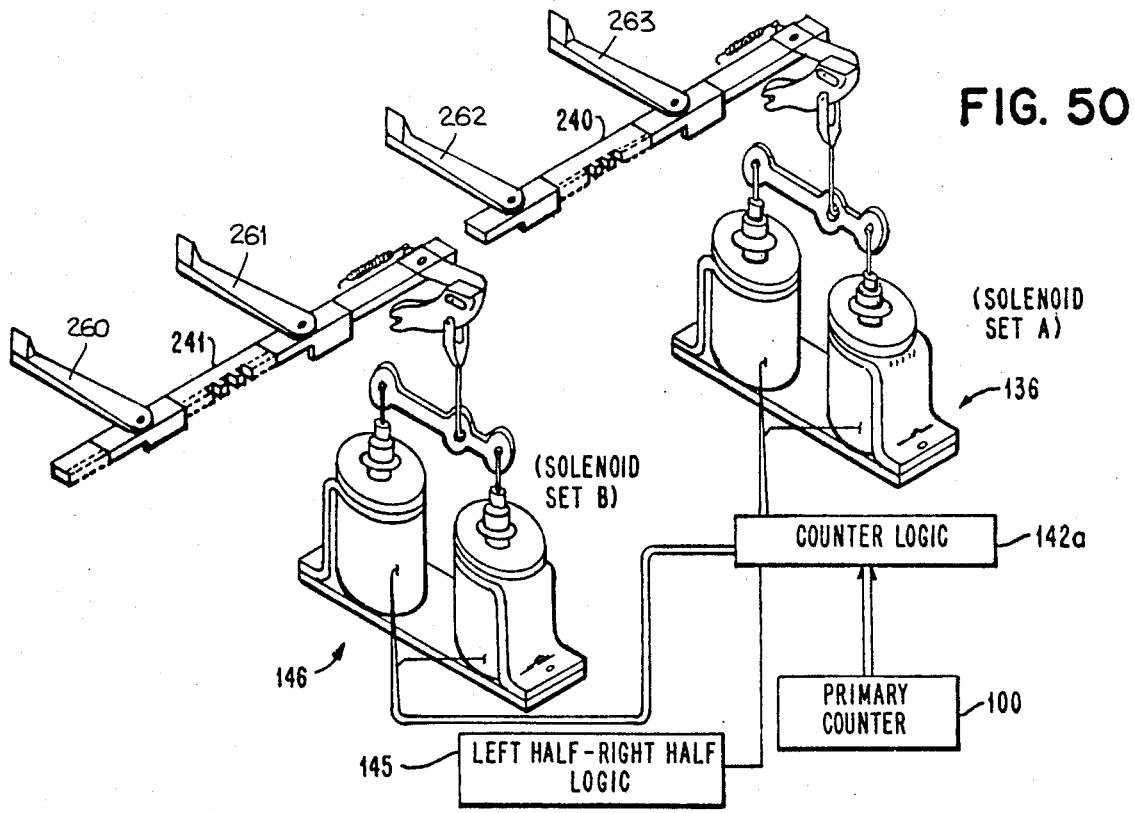

| FIG. 1 (System) | FIG. 43 | FIG. 49 (System) | FIG. 50 | FIG. 51 (System) | FIG. 52 (System) |
|---|---|---|---|---|---|
| Printer 1 | Printer 1a (FIG. 42) | Printer 1a | Printer 1a | Printer 1b | Printer |
| Printer Transmit Contacts 8 (FIG. 19 Example: Revise Transmit) | | Same as FIG. 1 | | Same as FIG. 1 | Same as FIG. 1 |
| Printer Feedback Contacts 9 (FIG. 19, Example: C-1, C-2, etc.) | | Same as FIG. 1 | | Same as FIG. 1 | Same as FIG. 1 |
| Block 46 Printer Operational Magnets (FIG. 18,19,20a,20b FIG. 21a FIG. 24 Example: Lower case (LC) in FIG. 20b) Printer Selection Magnets | | Same as FIG. 1 | | Same as FIG. 1 | Same as FIG. 1 |

| FIG. 1 (System) | FIG. 43 | FIG. 49 (System) | FIG. 50 | FIG. 51 (System) | FIG. 52 (System) |
|---|---|---|---|---|---|
| Connections (FIG. 28, also see FIG. 30 U.S. Pat. No. 3,297,124) | | | | | |
| Tape Unit 2 (FIGS. 15, 16,17,18, 21b,27,30) | | Same as FIG. 1 | | Same as FIG. 1 | Same as FIG. 1 |
| Tape Unit Right Tape Read/Record 37 (FIG. 23) | | Same as FIG. 1 | | Same as FIG. 1 | Same as FIG. 1 |
| Tape Unit Left Tape Read/Record 41 (FIG. 23) | | Same as FIG. 1 | | Same as FIG. 1 | Same as FIG. 1 |
| Bit Relay Register 35 FIG. 23, FIG. 28 | | Same as FIG. 1 | | Same as FIG. 1 | Same as FIG. 1 |
| Station Stepping Control 17 (FIG. 25, FIG. 29a, FIG. 29b, FIG. 30) | | Same as FIG. 1 | | Same as FIG. 1 | Same as FIG. 1 |
| Paragraph Identification 108 (FIG. 31) | | Same as FIG. 1 | | Same as FIG. 1 | Same as FIG. 1 |
| Line Revision 64 (See Locklar Patent 3,260,340) | | Same as FIG. 1 | | Same as FIG. 1 | Same as FIG. 1 |
| Mode Control 52 (FIG. 14,22,23 24,29a,29b,31) | | Same as FIG. 1 | | Same as FIG. 1 | Same as FIG. 1 |
| Line Adjust Logic 48 (FIG. 21b, FIG. 26, FIG. 34) | | Same as FIG. 1 | | Same as FIG. 1 | Same as FIG. 1 |
| Primary Counter 100 (FIG. 20b FIG. 21a FIG. 32 FIG. 34) | | Same as FIG. 1 | | Same as FIG. 1 | Same as FIG. 1 |
| Compare 102 (FIG. 34) | | | | | |
| Secondary Counter 101 (FIG. 20b,33) | | | | | |
| Paragraph Indent Logic 103 (FIGS. 34,21a,20b) | | Same as FIG. 1 | | Same as FIG. 1 | Same as FIG. 1 |

Reading Format A (Right Tape) and Printing Format B Concurrently with Recording Format B (Left Tape)

Reference is again made to Formats A and B, previously discussed. It is assumed that the apparatus is in a Transfer Adjust mode, that the right tape stores a document according to Format A and that an adjustment of the document is required as shown in Format B. The required adjustment together with code conversion to print the document according to Format B and to record the Format B arrangement with the appropriate Carrier Return and Tab code locations will now be described.

Preparation of Original Document According to Format A and Recording

Prior to the printing of the document according to Format A and the recording of the same on a magnetic tape, the left margin member 83 is set to the position shown in FIG. 40 and the tab stops 1 and 2 are set by the mechanism of FIG. 41. The operator proceeds to type the document in a normal manner ending each line within a paragraph with a single Carrier Return code, operating the Tab button 253 on keyboard 3 to indent the paragraphs the desired amount and ending individual paragraphs with two Carrier Return codes in sequence. The Carrier Return keybutton 250, FIG. 40, thereby serves as a key for initiating a single Return code or two Carrier Return codes in succession, as determined by the operator. In other words, the same key is used for initiating a single return operation or two return operations in succession as desired by the operator. The character and functional codes are recorded on the magnetic tape as they occur and the tape stores the document information exactly as shown for Format A.

To achieve the layout according to Format B, the left margin and tab stops 1 and 2 may be retained in the same locations as shown in Format A. The right margin limit 85, FIG. 40, is moved closer to the left margin to establish a shorter line length and an area of about 10 characters in width termed the Region area to control the Adjust operation.

It is assumed that the first code configuration encountered during reading of the tape after "FUNCTIONAL SPECIFICATIONS" is the paragraph number "1.0" which is printed at the left margin. Following the paragraph designation, the tape contains a Tab code. It is assumed that the apparatus has just been turned on for the present operation and that all of the circuits including the primary counter 100 and secondary counter 101, FIG. 1, are in the reset condition.

Figure 37:
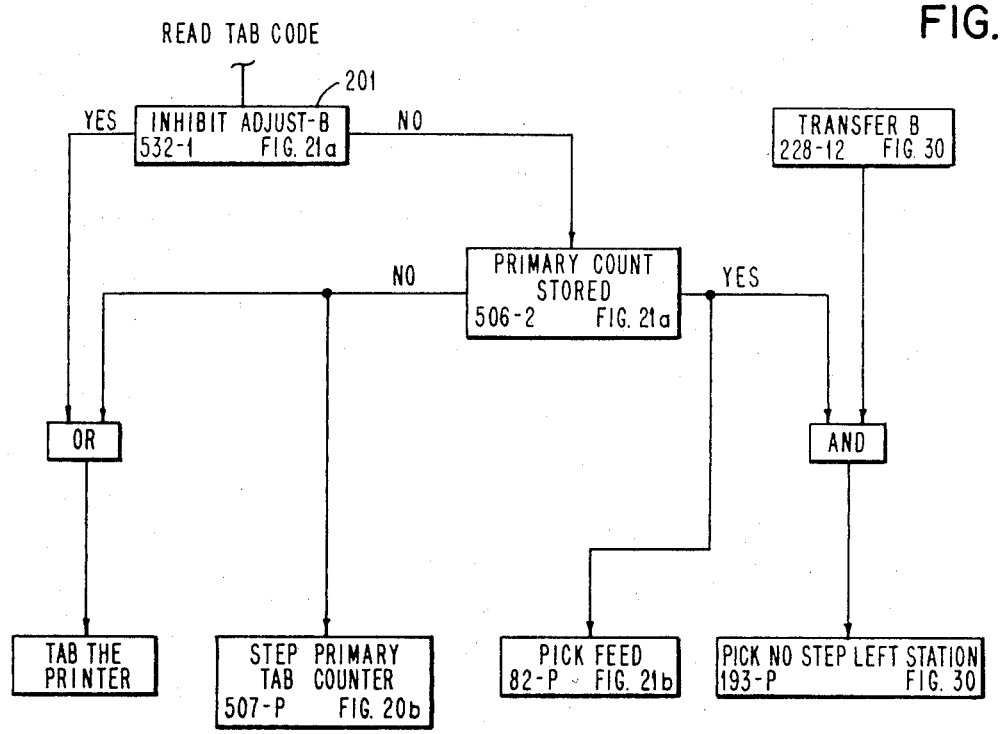

Referring to FIG. 37, the action attended by recognition of the Tab code is shown. Inhibit Adjust relay Point R-532-1, FIG. 21a, is down (as shown) so that the line "No" from block 201 is effective in FIG. 37. The status of the Primary Count Stored relay R506, FIG. 21a, is then determined. Since this is the first line of the first paragraph, the primary counter 100, FIG. 1, is in a reset state and the Primary Count Stored relay R506 is down. An output is then provided as shown in FIG. 37 to cause a tab operation in the printer 1 and to step the primary counter 100, FIG. 1, by energizing relay R507, FIG. 20b. Relay R507 serves as a gate means for primary counter 100. The primary counter 100, FIG. 1, comprises a number of relays shown in detail in FIG. 32. The secondary counter 101, FIG. 1, comprises a number of relays in FIG. 33. The counting action for both the primary counter 100 and secondary counter 101, both in FIG. 1, involves relays designated A, B, C, and D. The relay contacts of the relays serve as a plurality of gate circuits for receiving selected combinations of output configurations of the primary counter 100 (such as Primary Counter B contact 510-2, FIG. 32) and of the secondary counter 101 (such as Secondary Counter B contact 525-2, FIG. 33). As an example, see Primary Counter-A (Relay R508) in FIG. 32. Also note Secondary Counter-A (Relay R523) in FIG. 33. The other relays in the primary counter 100 are Primary-B (Relay R510), Primary-C (Relay R511) and Primary-D (Relay R513), FIG. 32. The secondary relays are Secondary-B (Relay R525), Secondary-C (Relay R526) and Secondary-D (Relay R528), FIG. 33. Counting occurs according to the following table:

| PRIMARY AND SECONDARY COUNTER SEQUENCE | | | | |
|---|---|---|---|---|
| Relay: A | B | C | D | |
| 0 | 0 | 1 | 0 | 0 or Reset Condition |
| 0 | 1 | 1 | 0 | STEP |
| 0 | 1 | 0 | 0 | 1 |
| 1 | 1 | 0 | 0 | STEP |
| 1 | 1 | 1 | 0 | 2 |
| 1 | 0 | 1 | 0 | STEP |
| 1 | 0 | 0 | 0 | 3 |
| 0 | 0 | 0 | 1 | STEP |
| 0 | 0 | 1 | 1 | 4 |
| 0 | 1 | 1 | 1 | STEP |
| 0 | 1 | 0 | 1 | 5 |
| 1 | 1 | 0 | 1 | STEP |
| 1 | 1 | 1 | 1 | 6 |
| 1 | 0 | 1 | 1 | STEP |
| 1 | 0 | 0 | 1 | 7 |

Figure 20B:
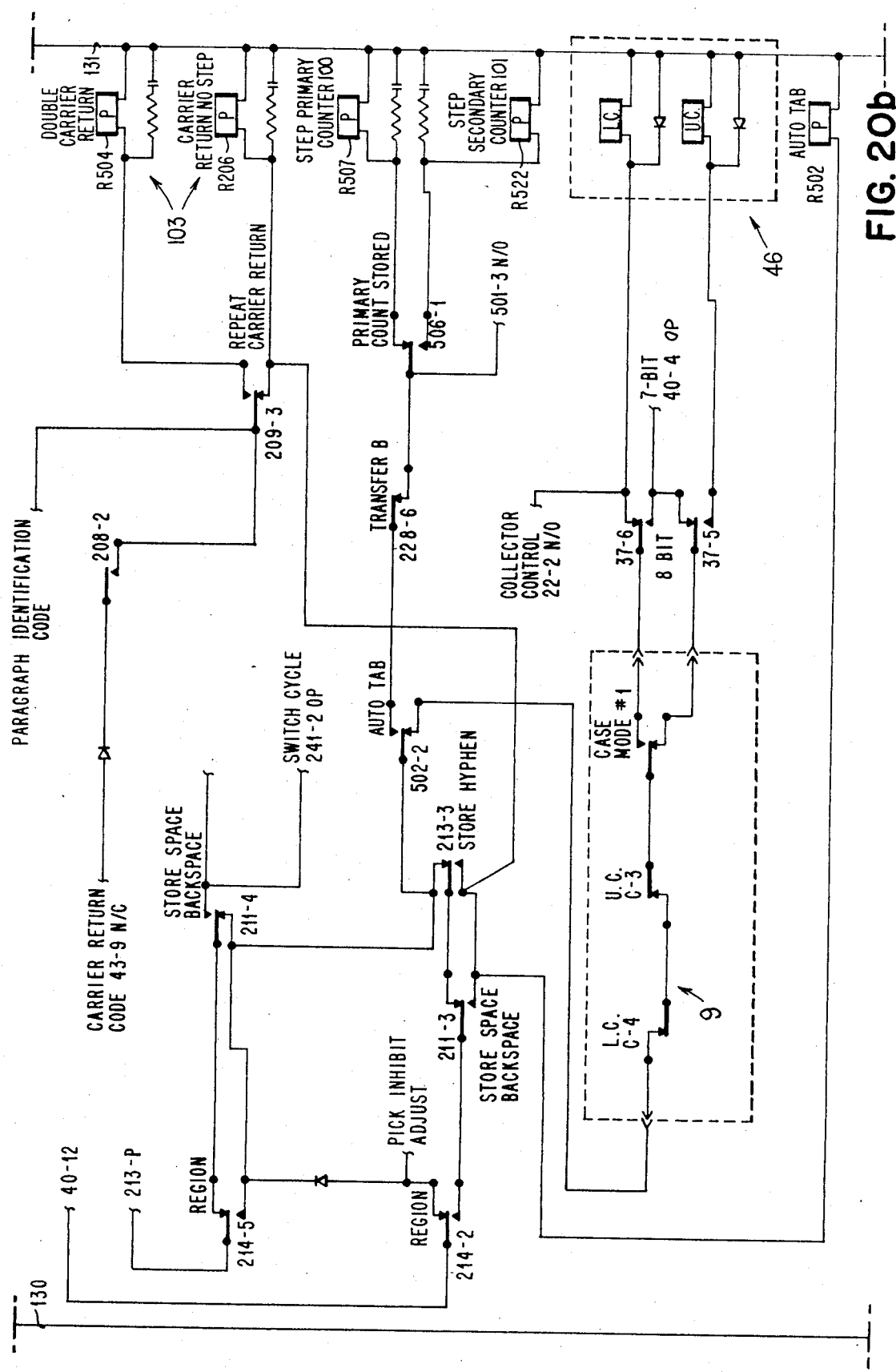

Referring again to the Primary Counter Circuit, FIG. 32, relay R511 ("C" relay) is energized. A "0" is stored in the primary counter 100. The energization of relay R507, FIG. 20b, transfers the 507-1 points, FIG. 32, to energize relay R510 ("B" relay). When relay R507, FIG. 20b, is deenergized after the Tab pulse is removed, Relay R511, FIG. 32, is de-energized by transfer of the 507-2 contacts and relay R510 holds through the 511-2 and 510-1 contacts. This leaves relay R510 energized, thereby storing the first count. Since only one tab operation occurs for the first line of paragraph 1.0 in Format B, the primary counter 100 will remain with a status of "1" at the end of the line. Since the first line in Format B is considerably shorter than the original first line for the same paragraph in Format A, a Carrier Return operation will likely occur due to the recognition of a Space code in the Region area. As described in the Sims U.S. Pat. No. 3,297,124, closure of zone switch 203, FIG. 26, at the beginning of the Region effects energization of the Region relay R214, FIG. 26. When a Space character is read, the Store Space, Backspace, relay R211, FIG. 18, is energized. Reference is made to the logic in FIG. 8 where it is shown that relays R214 and R211 combine to produce a Carrier Return operation and control tabbing for the next line. The logic is dependent on whether the Hyphen relay R213, FIG. 20a, has been energized due to reading a Hyphen code.

The operation from this point on resembles the operation that occurs during sequence B-5, previously discussed, wherein a Space code in the Region area is converted to a Carrier Return operation of the printer 1 and to a Carrier Return code on the left tape. The reader is referred to the previous discussion for sequence B-5 which involves FIGS. 8, 3, 4, 10, 11, 12, 6, and 7, as well as the stepping control in FIG. 9.

In addition to the sequence of events for converting a Space code to a Carrier Return code both on the printer 1 and the left tape, the count control situation must be considered. When the Carrier Return No Step relay R206, FIG. 20b, is energized the 206-5 contacts close and provide a circuit in FIG. 21a through the 214-3 points, now closed (because of the apparatus being in the Region area) to energize the Primary Count Stored relay R506. Relay R506 serves as a bistable storage means, the bistable storage means having a set state corresponding to the de-energized state of relay R506 and a reset state corresponding to the energized state of relay R506. The logic for picking relay R506 is shown in FIG. 2. The picking of relay R506 renders the primary counter 100, FIG. 32, inactive until the end of a paragraph is recognized as will be discussed shortly. The primary counter 100 is stepped under control of relay R507, FIG. 20b, through the 506-1 contacts, normally closed. The normal circuit for stepping the primary counter 100 when a Tab code is recognized at the beginning of the first line occurs as voltage is applied to the tab magnet, FIG. 21a. A lead just to the left of the Tab magnet, FIG. 21a, is directed to the 501-3 contacts, normally opened, FIG. 29b, and returns in FIG. 20b through the Primary Count Stored contacts 506-1 to energize the Step Primary Counter relay R507.

With the Primary Count Stored relay R506 energized, the 506-1 contacts transfer, FIG. 20b, and prepare a circuit to the step Secondary Counter relay R522, rather than to the Step Primary Counter relay R507.

Referring again to FIG. 8, another logic path exists to pick the Auto Tab relay R502, FIG. 20b, concurrently with the picking of the Carrier Return No Step relay R206, FIG. 20b.

The various relays constituting the secondary counter 101 are shown in FIG. 33. The operation of the secondary counter 101 is similar to the operation of the primary counter 100.

In FIG. 34, various contacts of the primary counter relays and the secondary counter relays are arranged in a ladder comparing network to control the holding of the Auto Tab relay R502. If the count conditions of the primary and secondary counters 100 and 101 differ, then at least one of the combinations of relay contacts will be set to complete the hold circuit. Thus, as one example, contacts 508-5 transferred and contacts 523-5 normally closed, or as another example, contacts 510-5 normally closed and contacts 525-5 transferred will complete the circuit. As soon as the primary and secondary counters 100 and 101 have the same count, the hold circuit for relay R502 is opened, as is actually shown in FIG. 34. Thus, when print head 5 returns to the left margin for the second line in paragraph 1.0, Format B, it is recognized that the secondary counter 101, which was in reset condition, is not equal to the setting of "1" in the primary counter 100. A circuit then exists through the comparing network, FIG. 34, and particularly contacts 510-5 transferred and contacts 525-5, normally closed, to continue to hold relay R502 to initiate a Tab operation for the second line of paragraph 1.0. Original energization of relay R502 transfers the 502-5 contacts, FIG. 33, and energizes relay R526. This establishes a reset condition in the secondary counter 101.

Figure 6:
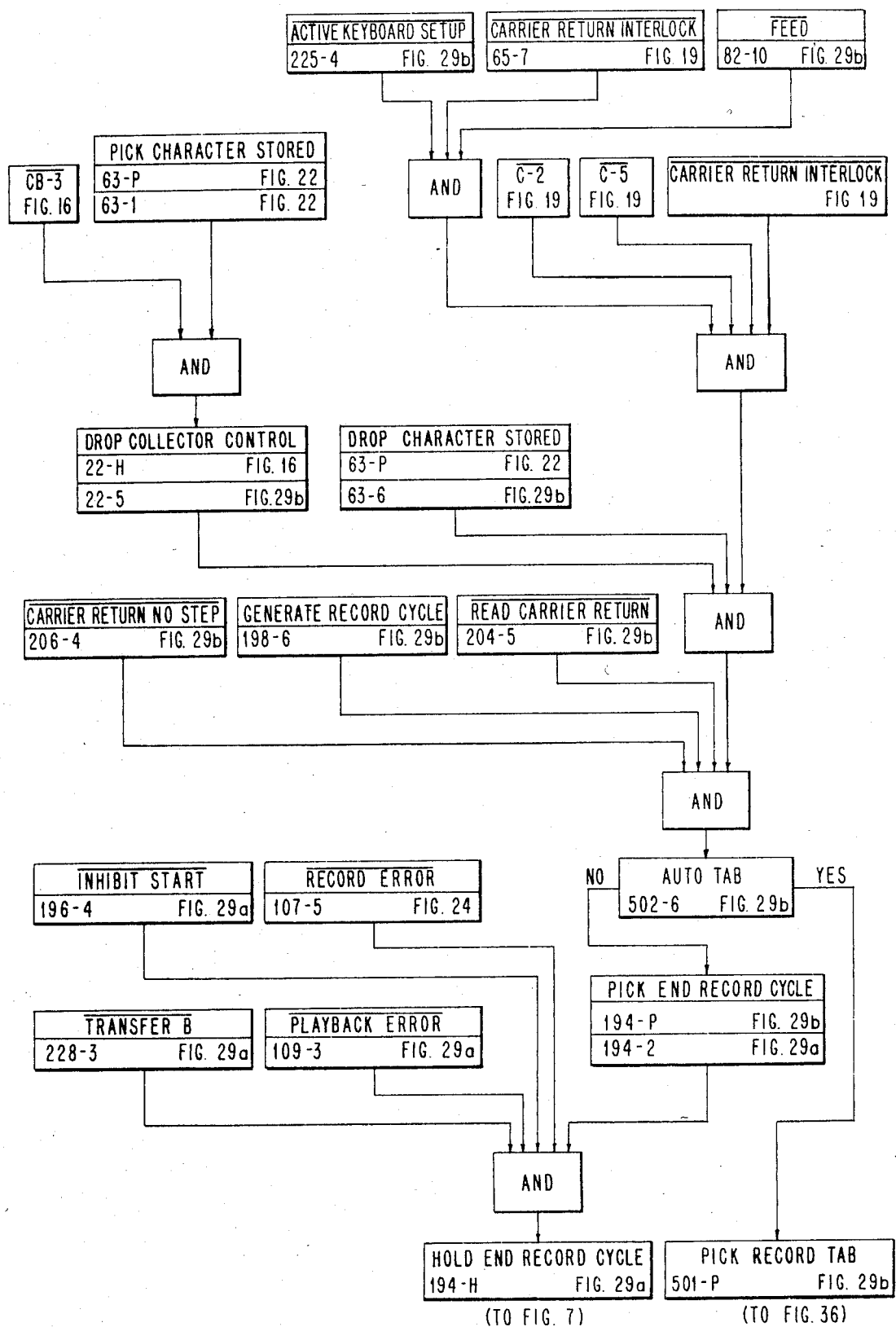

The logic involved is shown particularly in FIG. 6 where a Yes output from the Auto Tab block causes picking of the Record Tab relay R501, FIG. 29b. The logic is continued in FIG. 36 where the various conditions indicating that the print head 5 has reached the left margin are now satisfied. As shown in FIG. 36, the printer Tab magnet, FIG. 21a, is energized and a printer tab cycle ensues. This effects transmission of a Tab code which is then recorded on the left tape concurrently with the tab operation. Also, FIG. 36 shows that the Primary Count Stored contacts 506-1, FIG. 20b, combine with the Record Tab indication to step the secondary counter relay R522, FIG. 20b. The energization of relay R522 transfers the 522-1 points, FIG. 33, to energize Relay R525 as a first step. The secondary counter 101 will now have a count of "1" in it and the primary count and secondary count levels being equal, the compare network in FIG. 34 is opened. This drops the Auto Tab relay R502 and further, the dropping of the Auto Tab relay R502 transfers the 502-5 points, FIG. 33, to their normally opened state thereby dropping all relays of the secondary counter 101. This action serves to skip further tabulation operations after the outputs of the first and secondary counters 100, 101 reach coincidence.

The adjustment of paragraph 1.0 according to Format B together with recognition of line endings according to the adjust criteria, as well as the preparation of a new tape at the left station 14 that reflects the actual printing arrangement of Format B continues until the end of the paragraph is reached. The end of paragraph 1.0 is indicated by two Carrier Return codes in sequence. These codes are rendered effective to end the paragraph, returning the print head 5 to the left margin, to index the document twice, and to reset the primary counter 100 in readiness to accumulate the tab count for the first line of the succeeding paragraph, that is, paragraph 1.1.

Figure 13:
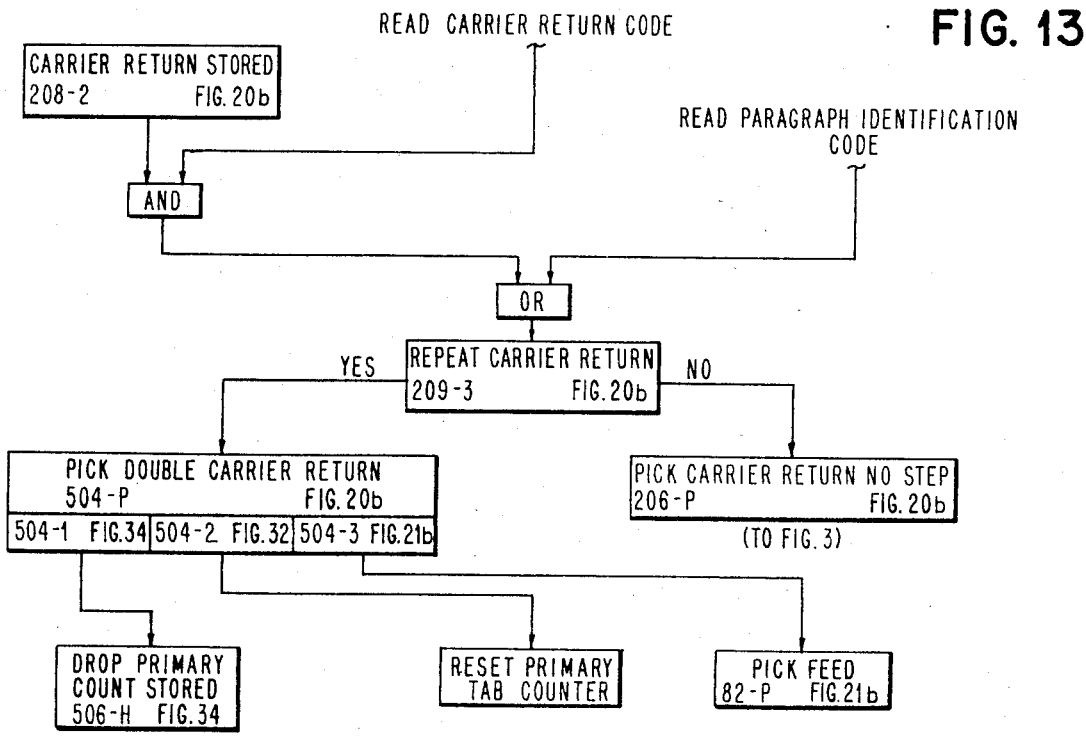

Reference is again made to the previous discussion concerning sequence B-1 in the Ross apparatus for the handling of a double Carrier Return code sequence in the right tape. The sequence involves FIGS. 3, 4, 10, 11, 12, 6, and 7 plus the stepping control in FIG. 9 as previously discussed. The occurrence of the first Carrier Return code energizes Relay R208, FIG. 26. The 208-2 contact, FIG. 20b Anded with the second Carrier Return code in, FIG. 13, together with the Repeat Carrier Return contact 209-3 effects energization of Double Carrier Return relay R504, FIG. 20b, as shown in FIG. 13. The 504-1 contacts transferring drop the Primary Count Stored relay R506, FIG. 34. The 504-2 contacts opening in FIG. 32 removes the potential from the primary counter 100 relays thereby resetting the primary counter 100. In addition, the 504-3 contacts energize the Feed relay R82, FIG. 21b. The primary counter 100 is now in a reset condition and ready to be set to a count status representing the tab indentation level for paragraph 1.1, Format B.

It is intended that the left tape accurately reflect the characters printed and the function actions performed by the printer 1 during the Transfer Adjust operation. In the illustrated case concerning Format B none of the lines in any of the paragraphs start at the left margin with the exception of the paragraph designation "1.0". In the event of recognition of a Space code in the Region and its conversion to a Carrier Return code according to sequence B-5, it is only necessary to insure that the Carrier Return code is recorded on the left tape instead of the Space code if all lines originate at the left margin. In the case of Format B, however, it is also required that following the recording of the Carrier Return code in the left tape, a Tab code also be recorded in the case of paragraphs 1.0 and 2.0 and two Tab codes be recorded in the case of paragraphs 1.1 and 1.2.

During the normal conversion sequence, the apparatus is changed from a Transfer Adjust mode to a Record Left mode in order to record the Carrier Return code when a Space code is being converted in the Region. This procedure also applies when all of the lines for the paragraphs originate at the left margin. In FIG. 6, the logic is routed through an Auto Tab contact 502-6, FIG. 29b, to pick and hold the End Record Cycle relay R194 as soon as the Carrier Return code is recorded.

When Tab codes are required, however, as in the case of Format B, the logic is routed through the Auto Tab contact 502-6, FIG. 29b, to pick the Record Tab relay R501. The logic then proceeds to FIG. 36 where a Tab operation is initiated, code signals transmitted from the printer 1 to the magnetic tape unit and the Tab code recorded on the magnetic tape.

As noted previously, concurrently with the tab operation in the printer 1 and the recording of a Tab code at the left station 14, a comparison is made between the primary counter 100 and the secondary counter 101 to insure the proper number of tab operations and recorded Tab codes.

Automatic Change in Format Control to Handle Second Paragraph 1.1 in Format B Upon recognition of the end of paragraph 1.0, the primary counter 100 has been reset in readiness to count the tab operations for the first line of the second paragraph 1.1 in Format B. The secondary counter 101 is always dropped following the tab operations for each individual line and is presently in an unused state.

The first Tab code recognized following the two successive Carrier Return codes sets the primary counter 100 to a state of "1". It also operates the printer tab mechanism to effect a movement of the print head 5 to a tab stop 1, Format B. At this point, the paragraph designation "1.1" is printed. Following this, another Tab code is recognized in the right tape.

As soon as the second Tab code is recognized in the sequence on the right tape, the primary counter 100 is again stepped according to the sequence shown in the primary and secondary sequence chart, previously given.

This effects a tab operation in the printer 1 and printing commences in the first line of paragraph 1.1. Printing proceeds to the end of the line which in all likelihood will occur in the Region area as a result of recognition of a Space followed by a character. Upon termination of the line, a Carrier Return operation is performed, the primary count setting is maintained at a count of "2" and compared with the secondary counter 101 in order to achieve auto tabbing to start the second line in paragraph 1.1. Concurrently with the automatic tab operation which involves two tab actions, a corresponding number of Tab codes is also recorded in the left tape.

Following the foregoing procedure, the left tape will store character and functional codes that accurately reflect the printing and functions of the printer 1 according to Format B.

SPECIAL PARAGRAPH IDENTIFICATION CODE

As indicated in the Functional Specifications for Automatic Format Control, provision is made for a special Paragraph Identification code that is recognized in a manner similar to two Carrier Return codes in succession, but which offers a number of advantages during operation.

To illustrate the use of the Paragraph Identification code, the document according to Format E is presented.

| | | | FORMAT E | |
|---|---|---|---|---|
| Left Margin | Tab Stop #1 | Tab Stop #2 | | |
| 1.0 | | | _____ | (CR) |
| | | | _____ | (CR) |
| | | | _____ . (CR) (PI) | |
| | 1.1 | | _____ | (CR) |
| | | | _____ | (CR) |
| | | | _____ . (CR) (CR) | |
| 2.0 | | | _____ | (CR) |
| | | | _____ | (CR) |
| | | | _____ | (CR) |
| | | | _____ . (CR) (PI) | |

The individual line endings in the Format E document are terminated by single Carrier Return codes as for the previous format arrangements, the carrier return button 250 thereby serving as a key for establishing a single return code. However, paragraph 1.0 and 2.0 are terminated with a Carrier Return code and a Paragraph Identification code in sequence. Paragraph 1.1 is terminated in a more conventional fashion with two Carrier Return codes in succession. The format is arranged as shown to illustrate that either one or the other of the code sequences is recognized in the apparatus and performs the automatic format control equally well, including the resetting of the counters 100 and 101, and the stepping of the primary counter 100 in the first line of each individual paragraph. The two Carrier Return codes, when used, are recorded in the same manner as illustrated in connection with the Format A document by depressing the carrier return button 250 twice.

Recording of Special Paragraph Identification Codes

As shown in the Locklar, et al patent, the keybutton 110, FIG. 40, is normally provided for the "Revise Carrier Return" operation which enables the recording of a Carrier Return code without a Feed code during the revision of a tape record media. For the present purpose, the keybutton 110 is designated Paragraph Identification (PI) FIG. 40, and depression of the keybutton 110 effects a Carrier Return operation of the print head 5 to the left margin and concurrently records in succession a Carrier Return code followed by the special Paragraph Identification code through block 108, FIG. 1. Preferably, the Paragraph Identification code has a code configuration somewhat like a Feed code in order that it may be sensed in the basic MT/ST not having the automatic format control and simply cause only feeding of the tape therein. Keybutton 110 thereby serves as a key for establishing a return code and a paragraph identification code.

However, since the present apparatus has all of the automatic format control features, depression of the PI keybutton 110 will be used frequently during the printing of an original document and the recording of the related information on the magnetic tape.

Figure 31:
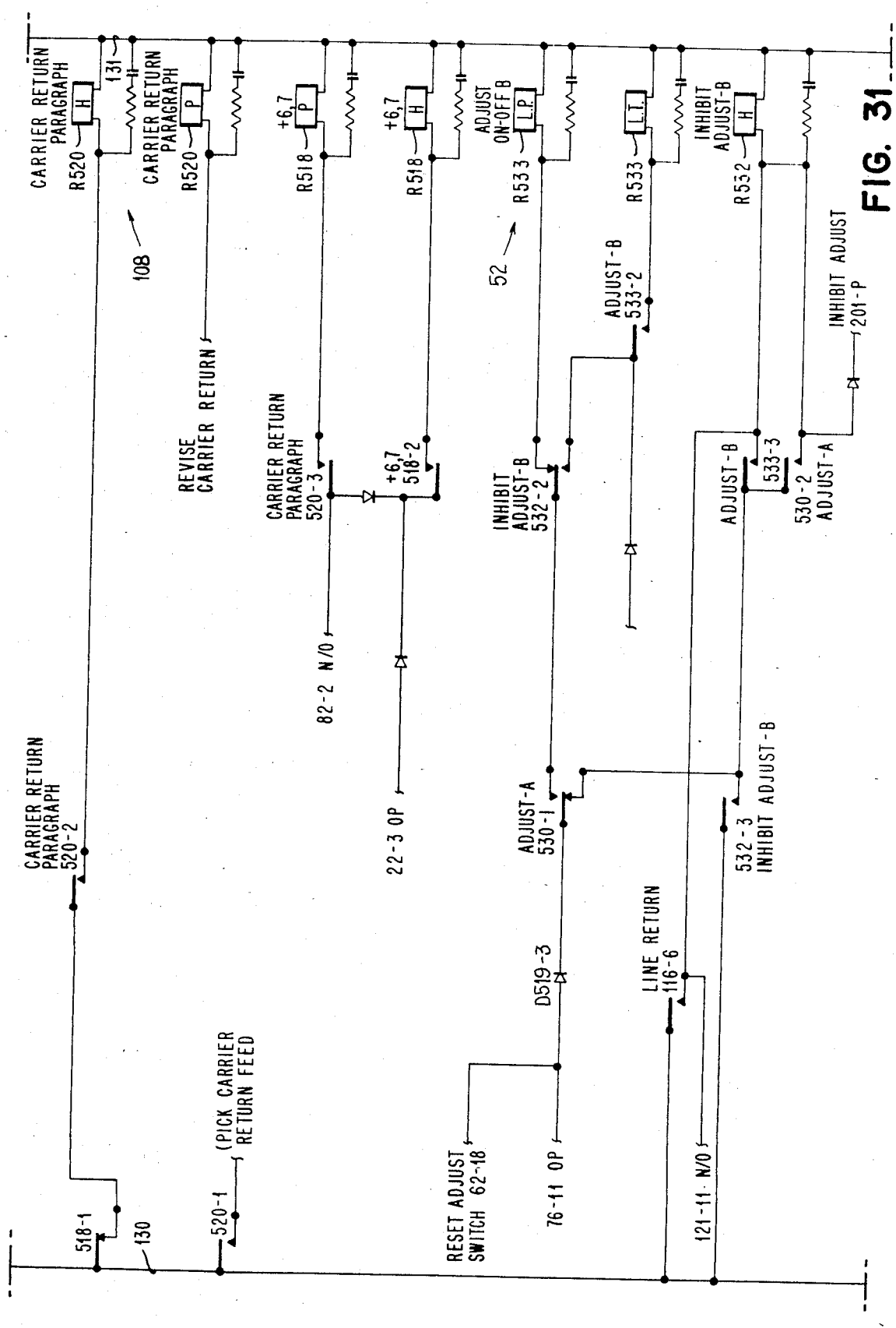

Reference is made to the Sims and Locklar, et al, patents that describe the basics of recording a Carrier Return code followed by a Feed Code. In the present system, this is done by energizing relay R520, FIG. 31, from the "Revise Transmit" contacts, FIG. 19, operated by depression of keybutton 110. In FIG. 31, the 520-3 points close to energize relay R518 which, through opening of contacts 518-1, drops relay R520. While relay R520 is energized, however, the relay points 520-1, transferred, complete a circuit to pick the Carrier Return Feed relay R68, FIG. 19. This initiates recording of the Carrier Return—Feed code sequence as described in the Sims and Locklar, et al, patents. The Feed code configuration is then designated as a Paragraph Identification code instead.

Subsequently, during the Transfer Adjust or Adjust modes of operation, the magnetic tape is sensed, the signals are supplied to the printer 1 and adjustment procedures are followed. In the case of Transfer Adjust, a new tape at the left station 14 is prepared concurrently with the printing of a new document.

The operation with the Paragraph Identification code is similar in most respects to the operation with two successive Carrier Return codes. The primary counter 100 is set to a count level of "1" to control the tab operations for paragraph 1.0, Format E. Upon recognition of the Carrier Return and Paragraph Identification codes at the end of paragraph 1.0, the logic in FIG. 13 is followed. The Carrier Return code spaces the printer 1, records a Space code if applicable, and picks relay R208, Store Carrier Return, FIG. 26. The Paragraph Identification Code is routed through the 209-3 contacts, FIG. 20b, and energizes the Carrier Return No-Step relay R206, FIG. 20b. Contacts 206-5 transferring, FIG. 29b, energize the Carrier Return magnet 252 in the printer 1, FIG. 21a, or places the machine in an Active Keyboard mode, whichever is applicable. During Transfer Adjust, the 206-5 contacts, FIG. 29b, energize the Carrier Return magnet 252, FIG. 21a, when the machine is in a "Record Left" mode. The 206-1 contacts, FIG. 25, prevent the tape from being stepped at the right station 12 and backstep the left station 14, if transferring. The Paragraph Identification code will be read again and this time the 209-3 contacts, FIG. 20b, will be transferred due to the performance of a Carrier Return operation just prior to reading the PI code and energize the Double Carrier Return relay R504, FIG. 20b. The various contacts of relay R504 in FIG. 13 drop the Primary Count Stored relay R506, FIG. 34, reset the primary counter 100, FIG. 32, and pick the Feed relay R82, FIG. 21b. The stepping control action is shown in FIG. 9. Concurrently with the backstepping of the left station 14, the right station 12 is not stepped so that the Paragraph Identification code can be read again and recorded on the left tape. The Carrier Return control of the printer 1 is shown in FIG. 2 through the 209-5 contacts to the printer Carrier Return magnet 252, FIG. 21a. With the resetting of the primary counter 100, the two Tab codes in the right tape are now read and recognized and stored in the primary counter 100 as a count of "2." Subsequently, the primary counter 100 and secondary counter 101 are used to establish an indentation level of paragraph 1.1 to tab stop 2. The two Carrier Return codes at the end of paragraph 1.1, Format E, are recognized and handled in the same manner as those shown in the Format A document. An important advantage becomes evident by comparing the line spacing between paragraph 1.0 and paragraph 1.1, on the one hand, and the line spacing between paragraphs 1.1 and 2.0, on the other hand. The special sequence of Carrier Return and Paragraph Identification establishes only a single indexing operation between successive paragraphs while the two Carrier Return codes in succession establish a double indexing operation, hence, a double line space between successive paragraphs.

Figure 27:
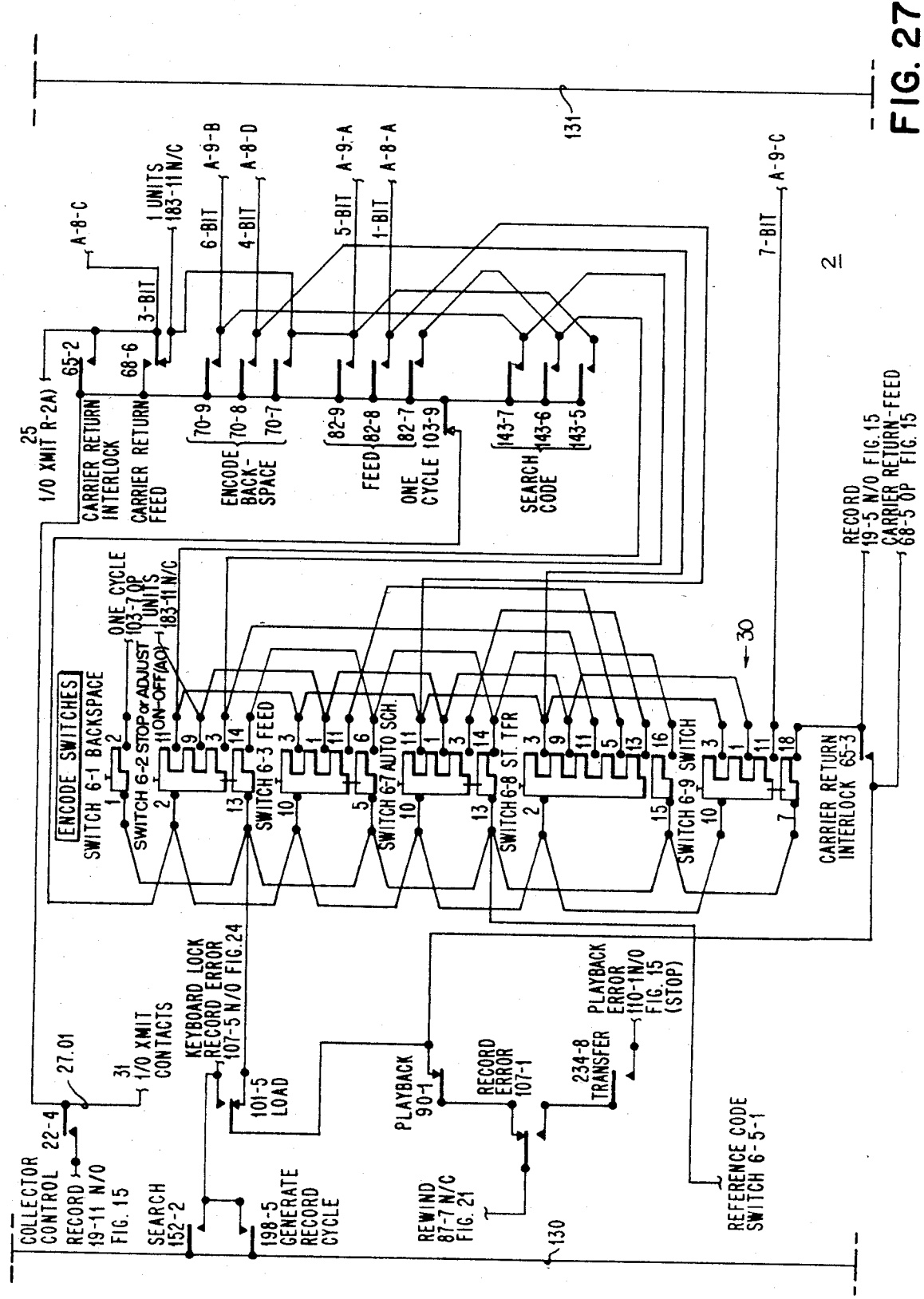

Use of Adjust On-Off Code to Control the Adjust Mode and to Establish Automatic Format Control In FIGS. 1 and 27, control panel 30 has a number of encoding and control buttons that are described in detail in the Locklar, et al, and the Sims patents. Normally, these have included a Stop code button. However, in the present instance, the Stop code button is used as an "Adjust On-Off" button, FIG. 27 (Switch 6-2), that serves to initiate the recording of an Adjust On-Off code on a tape during any recording procedure. this button (Switch 6-2) and related code are referred to as "AO." The Adjust On-Off code is advantageous in the present embodiment since it enables the controlling of the Adjust mode of the apparatus as well as controlling the automatic format control and recognition of paragraph endings and beginnings.

FORMAT F

| Left Margin | Tab Stop #1 | Tab Stop #2 | |
|---|---|---|---|
| AO | | | (CR) |
| | | | (CR) |
| | | | (CR) (AO) |
| 1.0 | | | (CR) |
| | | | (CR) |
| | | . (AO) (CR) (AO) | |
| | 1.1 | | (CR) |
| | | | (CR) |
| | | . (AO) (CR) (AO) | |
| | | | (CR) |
| | | | (CR) |
| | | | (CR) |
| | | . (AO) (CR) (AO) | |

Format F is assumed to contain three specific lines of information at the very beginning of the document that, for example, include the name, street, city, and state of an addressee. Normally, during the Adjust or Transfer Adjust operation, the Carrier Return codes at the ends of these short heading lines would be converted to Space codes and the three lines would likely be printed as a single line.

To avoid this, while printing the original document and recording the information, the operator depresses the Adjust On-Off keybutton on control unit 2, FIG. 1, that effects the recording of an Adjust On-Off code at the beginning of the first line of the heading information where shown. The individual lines of the heading are followed by Carrier Return codes placed there by depression of the Carrier Return keybutton 250 for initiating the recording of the return code with the third line having a Carrier Return code and another Adjust On-Off code placed there by depression of the Carrier Return and Adjust On-Off keybutton for initiating recording of the return code and the adjust on-off code sequence.

Also during the preparation of the document, the operator makes use of the Adjust On-Off codes in connection with Carrier Return codes to indicate paragraph terminations and beginnings. A sequence of codes includes Adjust On-Off, Carrier Return, Adjust On-Off, at the end of each of the three paragraphs in Format F.

Playback of Adjust On-Off Codes

In order to playback the information recorded on the magnetic tape, the apparatus is conditioned to an Adjust or a Transfer Adjust mode of operation depending upon whether a new tape at the left station 14 is to be prepared.

Figure 39:
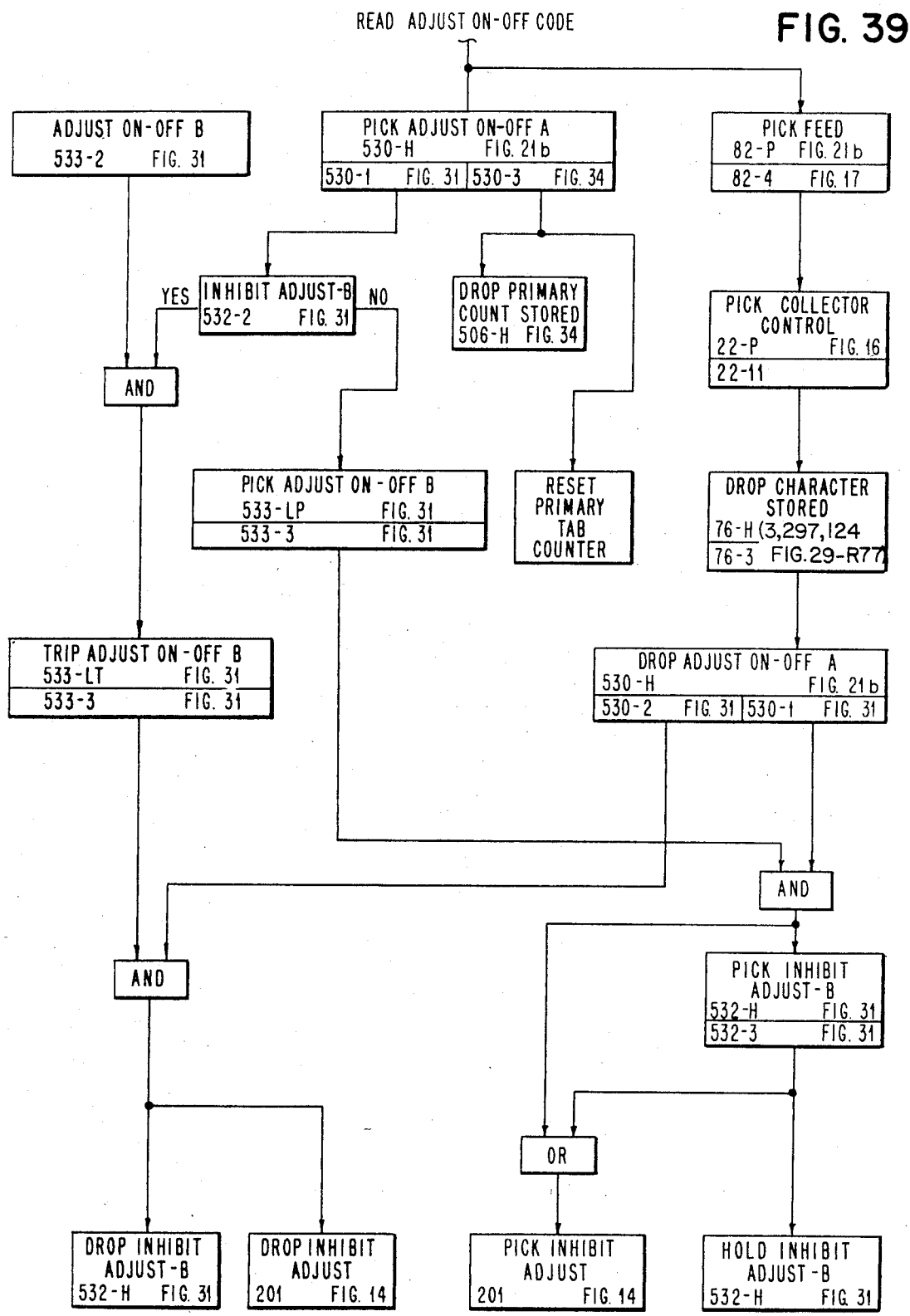

The logic for handling the Adjust On-Off code is shown in FIG. 39. Upon recognition of the first Adjust On-Off code prior to the first line of the heading information, the apparatus is changed from an Adjust mode to a conventional Playback mode. This is performed through the logic by picking relay R530, Adjust On-Off A, FIG. 21b. In FIG. 31, potential passes through the 530-1 contacts and the 532-2 contacts; and since they are in a normally closed state, the Adjust On-Off relay B, R533, which is a "latch pick" relay, is picked, FIG. 31.

The 530-3 contacts, FIG. 34, open to drop the Primary Count Stored relay R506 in the event it was previously energized and also effect resetting of the primary counter 100. The hold path for this relay R506 includes the path from the 504-2 contacts, FIG. 32, to the 530-3 contacts, FIG. 34. Normally, of course, if this is the first document of a new series, the Primary Count Stored relay R506 and the primary counter 100 are already in the reset condition. Another path for the logic in FIG. 39 picks the Feed relay R82, FIG. 21b. The 82-4 contacts, FIG. 17, pick the Collector Control relay R22, FIG. 16. This drops the Character Stored relay R76, not shown, and also drops the Adjust On-Off Relay R530 by removing potential from the R530 hold coil, FIG. 21b. (Although Character Stored relay R22 is not shown herein, as indicated in the Ross U.S. Pat. No. 3,490,004, Table C, Column 12, lines 50–75, relay R76 corresponds to Character Stored relay R77, FIG. 29, in the Sims U.S. Pat. No. 3,297,124 and the dropping of R76 occurs in a manner comparable to the dropping of relay R77 by collector control contacts 34–11 in the Sims patent.) The 530-1 contacts, FIG. 31, now transferred, in connection with the Adjust On-Off B contacts 533-3 now transferred, energize the Inhibit Adjust relay R532, thereby changing the mode of the equipment from an Adjust mode to a non-Adjust mode. The Inhibit Adjust relay R532 is held in FIG. 31. From this point on, the characters recorded on the right tape are recognized and handled in the same manner as if the equipment were in a normal Playback mode. Therefore, none of the Adjust operations in Table A or the Code Conversion operations in Table B are effective at this time.

Upon termination of the third line in the heading information, a Carrier Return code is recognized to effect a Carrier Return operation of the printer 1. Also, another Adjust On-Off code is recognized and directed through the logic in FIG. 39. This time, however, the Inhibit Adjust relay R532 is energized and the logic is routed through the 532-2 contacts in conjunction with the 533-2 contacts to energize the latch trip (L.T.) coil for the Adjust On-Off relay R533, FIG. 31. The 533-3 contacts, FIG. 31, and the 530-2 contacts, FIG. 31, drop the Inhibit Adjust relay R201, FIG. 14, and the Inhibit Adjust B relay R532, FIG. 31.

The foregoing procedures again establish an Adjust or Transfer Adjust mode of operation in the equipment and the format control again becomes effective in relation to the three numbered paragraphs shown in Format F. Each of the paragraphs is assumed to end with the code sequence Adjust On-Off, Carrier Return, and Adjust On-Off. The first Adjust On-Off code sequence operates to take the apparatus out of the Adjust mode as described in connection with the heading information. The Carrier Return code is then recognized as a normal Carrier Return and print head 5 is returned to the left margin. As shown in FIG. 39, concurrently with the recognition of the first Adjust On-Off code, the Primary Count Stored relay R506, FIG. 34, is dropped and the primary counter 100 is reset. Immediately after the recognition of the Carrier Return code, the second Adjust On-Off code is recognized and restores the equipment to an Adjust or Transfer Adjust mode. Thereafter, the primary counter 100 is stepped and accumulates the number of tab operations in the first line of paragraph 1.1, which in this case is "2". The indentation level of paragraph 1.1 is then controlled by the primary counter 100 and the secondary counter 101 in the usual manner. The Adjust On-Off, Carrier Return and Adjust On-Off sequence offers an advantage similar to that obtained with the Carrier Return, Paragraph Identification sequence, that is, only a single indexing operation takes place between paragraphs, rather than a double indexing operation as with two Carrier Return codes in sequence. Any or all of the foregoing sequences can be intermixed when recording or playing back the tape to indicate termination of paragraphs.

Also, special code sequences other than these set forth, such as, Upshift, Downshift, Carrier Return, or Upper Case Carrier Return, etc. may be used for paragraph identification.

Format Control When First Line of a Paragraph is Indented Further than Rest of Paragraph Format G illustrates a special case involving the block-type paragraphs discussed in all of the Formats A–F above. Format G is presented below for comparison with the other formats.

| Left Margin | Tab Stop #1 | Tab Stop #2 | FORMAT G |
|---|---|---|---|
| ——————————————————— | | | (CR) |
| ——————————————————— | | | (CR) |
| | ——————————————— | | . (AO) (CR) (TAB) (AO) (TAB) |
| | ————————————— | | (CR) |
| | ————————————— | | (CR) |
| | ————————————— | | (CR) |
| | ————————————— | | (CR) |
| | ———————— | | . (AO) (CR) (AO) |
| ——————————————————— | | | (CR) |
| ——————————————————— | | | (CR) |
| ——————————————————— | | | (CR) |
| | ——————————————— | | . (AO) (CR) (TAB) (AO) (TAB) |
| | ————————————— | | (CR) |
| | ————————————— | | (CR) |
| | ————————————— | | (CR) |
| | ———————— | | . (AO) (CR) (AO) |
| ——————————————————— | | | (CR) |
| ——————————————————— | | | (CR) |
| ——————————————————— | | | (CR) |
| ——————————— | | | . (AO) (CR) (AO) |

Format G assumes the setting of the left margin and tab stops 1 and 2 in the usual places.

The first, third, and fifth paragraphs in Format G are the block-type of paragraph and all lines in these paragraphs begin at the left margin. The second and fourth paragraphs, however, require an indented first line beginning at tab stop 2 and indentation for the rest of the lines in each paragraph beginning at tab stop 1.

This is accomplished in the following manner.

Recording of Original Document for Special Indentation Paragraphs

During the preparation of the original document and the recording of the information and functional codes on the magnetic tape, the first and third paragraphs are terminated with a particular code sequence that enable the proper indentation of their related second and fourth paragraphs, respectively. The code sequence is Adjust On-Off, Carrier Return, Tab, Adjust On-Off, Tab.

The first Adjust On-Off code resets the primary counter 100 and drops the Primary Count Stored relay R506 as indicated in FIG. 39. The equipment is transferred from an Adjust mode to a normal Playback mode wherein the Carrier Return code and the Tab code are recognized in a conventional fashion. The primary counter 100 is prevented from counting the Tab code since the 530-3 contact is opened, FIG. 34. The second Adjust On-Off code is recognized concurrently with the Tab operation of the printer 1 to Tab stop 1. The Adjust On-Off code is effective to drop the Inhibit Adjust relays R530, FIG. 21b, and R533, FIG. 31, to return the equipment to either the Adjust or Transfer Adjust modes as selected by the operator.

Since the primary counter 100 is in a reset state and relay R506, FIG. 34, is de-energized, the single Tab code next recognized in the sequence is counted, thereby establishing a count status of "1" in the primary counter 100. Since this is the second Tab code, it effectively moves print head 5 to Tab stop 2 in order to start printing the first line of the second paragraph in Format G.

Upon recognition of the Carrier Return code or a Carrier Return condition at the end of the first line, the primary counter 100 is maintained with a count of "1" and thereafter, controls the tabbing of the printer 1 for the balance of the lines in the paragraph. Each Carrier Return code returns print head 5 to the left margin and the single count in the primary counter 100 operates the tab mechanism to tab only once, thereby stepping print head 5 at Tab stop 1 for the rest of the lines in the paragraph.

The second and fourth paragraphs in Format G terminate with the code sequence Adjust On-Off, Carrier Return, and Adjust On-Off which is recognized and handled like the Adjust On-Off sequences discussed in the previous sections.

ADJUST AND FORMAT CONTROL PROCEDURES WITHOUT TRANSFER FROM RIGHT TAPE TO LEFT TAPE

The Adjust and the Format procedures are similar when only hard copy is under preparation in response to signals read from the right tape with no new tape under preparation at the left tape station 14. The Record Left procedures beginning in FIG. 3 are modified when no transfer is involved. In FIG. 3, the 228-7 contacts, FIG. 29b, and the 228-8 contacts, FIG. 29b, direct the associated signals to either the Carrier Return magnet 252, FIG. 21a, or the Space magnet, FIG. 21a, respectively, in the printer 1, immediately, rather than picking the Generated Record Cycle relay R198, FIG. 29b.

The accumulation of Tab counts in the primary counter 100 occurs for the first line of each individual paragraph in a manner comparable to that during a Transfer Adjust operation. Subsequently, the secondary counter 101 is stepped under control of the Auto Tab relay R502 and more specifically the 502-2 contacts, FIG. 20b, to control the indentation level of succeeding lines in each paragraph.

An interesting aspect of the present arrangement is illustrated in FIG. 8. Print characters, under some circumstances, are converted to Tab operations of the printer 1. The logic is routed through the 214-2 contacts, FIG. 20b, that indicate whether or not the printer 1 is in the Region area and through several alternative logic paths to the 502-2 contacts, FIG. 20b. If the printer 1 is not in an Auto Tab mode, then the logic directs the printer 1 to print the character read. However, if the equipment is in an Auto Tab mode, as reflected by the 502-2 contacts and the Transfer B contacts 228-6 being down, a path exists to energize the tab magnet (FIG. 21a) in the printer 1 and to step either the primary counter 100 or the secondary counter 101 depending upon the status of the Primary Count Stored contacts 506-1, FIG. 20b.

In FIG. 9, the Auto Tab contacts 502-1, FIG. 25, transferred opened together with Not Active Keyboard contacts 231-11, FIG. 25, deactivate all the circuits for energizing the stepping magnets 205 and 206 at the right tape station 12. In this fashion, the necessary cycling of the equipment to establish the proper number of tab operations is controlled automatically until the primary counter 100 has been set up or subsequently until the count in the secondary counter 101 equals that of the primary counter 100 for lines in a particular paragraph other than the first line.

ALTERNATIVE EMBODIMENT WITH VARIABLE LEFT MARGIN CONTROLLED BY PRIMARY COUNTER

FIGS. 42-44, together with FIG. 49, illustrate an alternative printer for use in the system of FIG. 1 that incorporates variable length left margins that are selectively operated to determine the indentation levels required. The version in FIGS. 42-44 is included in the variable left margin block 105, FIG. 49, that is controlled by line 104 from the primary counter 100. Other elements in FIG. 49 correspond to those in FIG. 1, function similarly, and are similarly referenced. The printer in FIGS. 42 and 49 is designated 1a and has a document 4b under preparation. The customary keyboard 3a has character and functional keys, including the Paragraph Identification (PI) key 110a. A print head 5a is movable from a left margin established by a left margin stop 83a that cooperates with latch 82a on the carrier 81a. Tab rack 86a has tab stops 67a, 87a, and 88a. These are assumed to be set in order to handle the Paragraph Indentation requirements for document 4b.

Margin rack 84a also has a right margin limit 85a that generally determines the extent of movement of print head 5a to the right during printing.

Intermediate the left margin stop 83a and the right margin limit 85a, are three intermediate margin stops 120, 121, and 122.

FIG. 43 illustrates the margin rack 84a together with the left margin stop 83a and the intermediate stops 120, 121, and 122. All of the various stops on margin rack 84a are movable in either the left or right direction into engagement with teeth shown on rack 84a to assume desired paragraph and margin positions. Ordinarily, one of the Tab stops, such as stops 67a, 87a, and 88a, on tab rack 86a are set for each intermediate margin stop location. As shown in FIG. 43, the stops 83a, 120, 121, and 122 are provided with progressively shorter extended portions designated 83b, 120a, 121a, and 122a, respectively.

As described in the various "Selectric" materials, margin rack 84a is rotatable about its axis in a longitudinal direction. Rack 84a has an extending member 124 with a projecting finger 125 that cooperates with an aperture 126a in an operating member 126. Member 126 is pivotally mounted at 127. Attached to member 126 is a link 128 extending for connection with a differential whiffle-tree link 129. Link 129 comprises two weighted portions 129a and 129b and the ends of link 129 are further connected to solenoids 140 and 141. Solenoids 140 and 141 are selectively operated by counter logic 142 which, in the assumed case, is controlled by primary counter 100, FIG. 49. In a typical case, counter logic 142 comprises logic for translating the output of counter 100 into logical signal levels to operate solenoids 140 and 141 in appropriate combinations. With the weighted leverage or differential whiffle-tree arrangement of link 129, FIG. 43, link 129 assumes four operating conditions and accordingly moves rack 84a to four tilted positions as follows:

| Solenoid 140 |                  | Solenoid 141 |
|--------------|------------------|--------------|
| 0            | Home Condition   | 0            |
| 1            | Second Condition | 0            |
| 0            | Third Condition  | 1            |
| 1            | Fourth Condition | 1            |

The operation of the variable left margin mechanism for printer 1a is somewhat similar to the operation of the printer 1 in FIG. 40 with the exception that once an indentation level is established for a particular paragraph, no necessity exists for returning print head 5a all the way to the left margin and then tabbing print head 5a the necessary number of tabs to reach the indentation level. In the alternative embodiment of FIGS. 42-44 and 49, whenever a Carrier Return operation occurs, print head 5a returns directly to a left margin that is established by one of stops 83a, 120, 121, or 122 as selected by solenoids 140 and 141 under counter control. With the mechanism of FIG. 43 accordingly, it is possible to select any one of four margin positions and these are illustrated on document 4b, FIG. 42.

Two Carrier Return codes in succession operate to reset primary counter 100, FIG. 49 as previously described in connection with FIG. 1. As another alternative, the code sequence Carrier Return and Paragraph Identification may be used and this is assumed to be the case in FIG. 42 since only a single space exists between succeeding paragraphs. Also, the Adjust On-Off code sequences previously discussed may be used.

Primary counter 100, FIG. 49, is reset upon termination of any paragraph and then is operative to accumulate the number of Tab operations or Tab codes for the first line of the paragraph. Thereafter, the outputs of the primary counter 100 to counter logic 142 are applied to solenoids 140 and 141, thereby rotating rack 84a and establishing one of the extensions 83b, 120a, 121a, and 122a into a position for engagement with the margin latch 82a on the print head carrier 81a moves from the right-hand margin toward the left margin during a Carrier Return operation.

A modification, FIG. 50, can be made to increase the number of stops 260-263 available with only two solenoid sets 136 and 146. The modification includes "left-half, right-half" logic 145 connected logic 142a and another set of solenoids 146, FIG. 50. Two complete margin racks 240 and 241, FIG. 50, and associated solenoid sets A and B are then provided. Logic 145 which may be a flip-flop or other bistable circuit, determines which solenoid set A or B should be operative and directs counter logic 142a to energize the appropriate set A or B, thereby rotating the left-half margin rack 240 or the right-half margin rack 241, as appropriate.

ALTERNATIVE EMBODIMENT WITH COUNTER AND PROGRAM TAPE CONTROL OF FORMAT

FIGS. 45 and 46 together with FIG. 51 illustrate still another embodiment. This embodiment is contemplated in horizontal program tape control block 106 controlled by line 104a from primary counter 100. Various elements in FIG. 51 function similarly to those in FIG. 1 and are similarly referenced. Printer 1b, FIG. 45, has a keyboard 3b, as usual. A document 4c is under preparation. Printer 1b also has a tab rack 86b with stops 67b, 87b and 88b. Stops 67b and 87b are set and stop 88b is clear. Printer 1b also has a left margin stop 83b and a right margin stop 85b. These ride on a margin rack 84b that is similar to the margin racks 84, 84a, etc. in the other embodiments, with the exception that a bell crank 150 has been added to the leftmost extremity. Bell crank 150 is pivoted at 151 for counterclockwise operation by a Stop Carrier Return magnet 152.

Associated with document 4c is a program tape 153 with perforations 154-157 that are related to the individual tab stop locations on document 4c. Program tape 153 has an associated sensing station 160 for sensing the perforations 154-157. Sensing station 160 is assumed to be moved mechanically along with print head 5b as it moves from left to right during tabbing or printing or from right to left during a Carrier Return operation. As an alternative, sensing station 160 may be maintained in a stationary condition and tape 153 moved past it for sensing.

SET UP OF PRIMARY COUNTER

The embodiment in FIGS. 45 and 46 is controlled by primary counter 100 that is set up to count the Tab operations occurring in the first line of each individual paragraph. The setting of the primary counter 100 and its resetting are controlled in a manner that is comparable to that previously discussed in connection with the printer embodiment of FIG. 40.

Once the primary counter 100 has been set to a particular count level representing the indentation level for a paragraph, the logic of FIG. 46 is effective to restore print head 5b to the appropriate indented level for each line of that paragraph until the usual paragraph ending codes are recognized, including two successive Carrier Return codes, a Carrier Return code followed by a Paragraph Identification code, or the sequences involving the Adjust On-Off codes.

The Carrier Return operation at the end of the first line in the first paragraph in document 4c is effective to maintain the status of the primary counter 100 at the Tab level reached during the first line. The same is true for the other individual paragraphs on document 4c. The third paragraph on document 4c has a Tab indentation level of "2" indicated by perforation 155 in program tape 153. The handling of the indentation of the third paragraph will illustrate the operation of the embodiment of FIGS. 45 and 46.

When print head 5b reaches the end of the first line in the third paragraph, a Carrier Return operation is initiated. The primary counter 100 is set to a count level of "2". As printer head 5b moves to the left during the Carrier Return operation, sensing station 160 moves along the program tape 153 and senses the various perforations, such as perforation 155. When the perforation 155 for indentation level 2 is reached, the counter inputs and sense station inputs condition And circuit 161 to provide an output through Or circuit 162 to And circuit 163. A single Carrier Return operation is signaled on line 164 and conditions the input of And circuit 163 as well as setting a "Perform Carrier Return" trigger 165. Print head 5b and its associated carrier 81b reach a fairly high speed during the Carrier Return operation and it is assumed that by the time sense station 160 reads perforation 155, print head 5b is actually slightly to the left of the desired indentation level for the third paragraph. Print head 5b is stopped slightly to the left of tab stop 87b when the Stop Carrier Return magnet 152 is energized with the output from the And circuit 163. Magnet 152 pushes bell crank 150 and moves margin rack 84b slightly to the left. This margin rack action is conventionally available in the "Selectric" printers described in the various references previously noted. See page 52-55, and particularly page 54 and FIG. 129 of the January, 1966 Manual, Form No. 241-5032-2. Magnet 152 and bell crank 150 have been added. Movement of margin rack 84b to the left effects stopping of print head 5b. As described in the "Selectric" manuals, margin rack 84b carries a member 220 positioned for engagement with a bell crank 221. As rack 84b moves to the left, member 220 rotates bellcrank 221 clockwise, FIG. 45. Movement of member 220 clockwise move attached link 222 toward the front of printer 1b. Link 222 moves keeper 223 which releases latch 224 to disengage Carrier Return clutch 225 stopping further movement of carrier 81b and print head 5b.

It is now necessary to return print head 5b to the exact beginning of the third paragraph as determined by the tab stop 87b and this is done by operating the Tab magnet 166 through the And circuit 167. The output from sense station 160 as it senses perforation 155 moving to the right again conditions Or circuit 162, and Inverter 168, the output of which is directed to And circuit 167. Other inputs to And circuit 167 are a Not Carrier Return, Not Tab, and Perform Carrier Return from trigger 165.

When Tab magnet 166 operates, print head 5b moves into contact with tab stop 87b, sensing station 160 moves past perforation 155 and the various circuits are degated since no output is available from And circuit 161. Trigger 165 is reset upon the occurrence of the first print or space character following the Tab operation.

In the event that tab stops are positioned closely on tab rack 86b, it is possible that more than one operation of Tab magnet 166 will be necessary to return print head 5b to the proper indentation location.

The recognition of the paragraph termination codes returns print head 5b all the way to the left margin determined by engagement of latch 82b with left margin stop 83b, and counting and control of the paragraph format continues for succeeding paragraphs in a comparable manner. Setting of stop 85b determines the right margin.

ALTERNATIVE EMBODIMENT WITH MOVABLE FOLLOWER STOP FOR AUTOMATIC FORMAT CONTROL

FIGS. 47 and 48 together with FIG. 52 illustrate another embodiment that involves a movable follower stop 170 that is selectively moved to assume different indentation levels in relation to document 4d as required for the printing of the different paragraphs on the document 4d. As with the other embodiments, various elements in FIG. 52 function similarly to corresponding elements in FIG. 1 and are similarly referenced. Printer 1c has a keyboard 3c and also has the tab rack 85c that is similar to the tab racks 86, 86a, etc. in the other versions previously described. A margin rack 84c has a left margin stop 83c and a right margin limit 85c. Mounted for movement on rack 84c is follower 170 that is connected with an elongated spring member 171 that is routed on pulleys 172 and 173 to exert a continuing pulling force on follower 170 from left to right in the direction of tabulating. Print head 5c and its associated carrier 81c have the usual margin latch 82c. Moveable stop 170 has an extension 170a that is mounted for sliding movement in a rotating bail member 174 that is formed like a U-shaped channel. Bail member 174 is mounted for rotation at 175 and 176. A resilient member 177 cooperates with an extension 170b on stop 170 to maintain it normally in engagement with rack 84c by an extending pin member 178. Pin member 178 is arranged to engage one of the teeth in rack 84c so long as stop 170 is in the condition shown in FIG. 48. Latch 82c on the print head 5c carrier 81c is shown in FIG. 48 along with a stop plate 180 that includes a latch 181 and a cone-shaped latch trip 182. Plate 180 is mounted for movement left to right (or right to left) along with the print head 5c carrier 81c. Latch 181 is pivotally mounted at 183 and 184 for movement toward and away from cone-shaped latch trip 182. The lower extremity of latch 181 extends into proximity with portion 174a of the U-shaped bail 174 (see inset). Springs 186 and 187 arranged at the uppermost and lowermost extremities of latch 181 tend to retain it in the vertical position shown, which is the restore condition.

The mechanism in FIGS. 48 and 52 is set up during the tabbing performed in the first line of each paragraph by control line 104b and serves as a mechanical equivalent of the primary and secondary counter circuits. Paragraph indent logic 103c determines when a paragraph is ending and a new paragraph beginning, as by recognition of two carrier Return codes in succession. Following return of print head 5c to the left margin established by margin stop 83c, paragraph indent logic 103c energizes solenoid 190 which operates a plunger 191 and through link 192 rotates bail 174 in the counterclockwise direction indicated by arrow 193. When bail 174 is rotated in the direction indicated, it reacts against extension 170a on movable stop 170 and due to engagement of extension 170b with resilient member 177, movable stop 170 is disengaged from rack 84 c, and portion 174a of bail 174 moves under the lower extremity of latch 181. Engagement of bail 174 under latch 181 allows latch 181 to pivot first slightly clockwise, then counterclockwise (see inset) so that it assumes the dashed position shown as 181a. The foregoing action retains bail 174 in a rotated condition and enable stop 170 to move to the right due to force exerted by spring 171. Therefore, as Tab operations occur, stop 170 moves along with latch 82c and assumes the farthest position to the right to which print head 5c is tabbed during the first line of printing in the paragraph. As stop 170 moves to the right to assume each new indented position, extension 170c strikes pin 194. Latch trip 182 is biased by spring 195 to the left. When extension 170c strikes pin 194, latch trip 182 is operated to the right and since latch 181 is in the dashed position 181a, latch trip 182 strikes latch 181 moving it clockwise over extension 174a of bail 174. This action restores latch 181 to the vertical condition shown in the inset and enables bail 174 to assume its normal vertical condition thereby dropping stop 170 back into engagement by pin 178 with rack 84c.

For each succeeding line in the paragraph in question, finger 82c encounters movable stop 170 during the Carrier Return action at the end of each line and print head 5c is permitted to move only to the indented level established for that paragraph.

The end of a paragraph is again recognized by two Carrier Return codes in succession or any of the various code combinations discussed and logic 103c, FIG. 52, operates solenoid 190, and rotates bail 174 to disengage stop 170 from rack 84c. As latch 82c moves all the way to the left margin, along with the carrier 81c for print head 5c, latch 82c also drives stop 170 to a restored condition to the extreme left in readiness for a new sequence.

The usual left margin stop 83c may be substituted for by follower 170 to permit stop 170 to serve as a left margin.

The embodiment described in connection with FIGS. 47 and 48 does not require counters for its operation, but is operative in a dynamic and flexible fashion to recognize the tab levels during the first line of each paragraph and to thereafter automatically control the indentation level for each paragraph. It is evident that this version can serve all of the format requirements for any of the formats A–G, including the case where the indentation for the first line of a paragraph differs from the succeeding lines in the same paragraph.

AUTOMATIC FORMAT CONTROL DURING MANUAL OPERATIONS

The automatic format control principles discussed are also advantageous during manual operations of the printing apparatus in contrast with the Adjust or Transfer Adjust modes of operation.

Printer Only

To operate printer 1, FIG. 1, as a conventional typewriter without recording or playback of signals, mode control knob 20 is provided with a "Printer Only" position that disconnects printer 1 from tape console 2. In this mode, depression of data and functional keys on keyboard 3 effects printing of characters on document 4 and performance of functions in a usual manner.

The printer keyboard 3 then becomes the data source for establishing automatic format control of printing, rather than the right tape cartridge 13. Primary counter 100 is reset upon depression of the Carrier Return key twice in succession, or upon depression of Paragraph Identification or Adjust On-Off keys according to the various formats previously presented. During the typing of the first line of each information category, such as paragraphs, primary counter 100 counts Tab key depressions as set forth. Thereafter, during the typing of succeeding lines, the apparatus is automatically operative under control of the primary counter 100, secondary counter 101, and compare network 102 to reestablish the necessary indentation level automatically and without intervention by the operator. With this arrangement, it is necessary for the operator to manually perform Tab operations only for the first line of each new category of information, (such as paragraphs). The equipment then retains the required number of tab operations until the end of the category (end of paragraph). The indentation levels are rapidly and automatically established. Any of the proposed margin and tab stop configurations in FIGS. 40–48 will serve as well, during manual operations, as during automatic operations.

Printing and Recording

By placing the apparatus in a "Record Right" or "Record Left" mode, manual keyboard 3, FIG. 1, serves as a source of signals to be recorded on the tape media selected. The automatic format control just described in the "Printer Only" section above is still effective to establish indentation levels. In addition, when tabbing of printer 1 is performed automatically under control of primary counter 100, secondary counter 101, and compare network 102, Tab code signals are supplied automatically from the automatic format circuits for recording on the selected tape in a manner comparable to that described in connection with the Transfer Adjust operation.

While the invention has been particularly shown and described with reference to several embodiments, it will be understood by those skilled in the art that various changes in format and detail may be made without departing from the spirit and scope of the invention.

What is claimed is:

1. Data processing and printing apparatus for printing a document according to a desired format, comprising:
   a source of data, such as a record medium and associated reading means, for supplying signals representative of characters to be printed or functions to be performed, including Return and Tab functions, said signals being arranged in successive information categories, such as paragraphs, with each information category including termination signals to indicate the end of one information category and the beginning of the next information category;
   printing means, such as a printer, interconnected with said source and operative in response to data signals from said source to print characters on a document and to perform functional operations in relation to said document, including Return and Tab operations;
   first line means responsive to Tab operations in said printer only in the first line of each information category on said document, such as said paragraphs, for retaining the indentation level reached during printing of said first line;
   indentation means for establishing an indentation level for each succeeding line of a said information category following said first line under control of said first line means;
   and means responsive to termination signals as supplied by said source at the end of each information category for resetting said first line means in readiness for the next succeeding information category.

2. The apparatus of claim 1, wherein:
   said printing means includes conventional Return and Tab mechanisms, and wherein
   said indentation means includes means responsive to said first line means for controlling said printing means to perform at least one Return operation followed by at least one Tab operation in order to reach the indentation level established by said first line means.

3. The apparatus of claim 1, further comprising:
   a mechanical follower means in said first line means selectively settable responsive to each Tab operation during printing of a first line to retain the farthest indentation level reached in an individual paragraph, and
   mechanical elements associated with said indentation means, said elements carried in said printing means and responsive to the setting of said follower means to establish the indentation level required for each succeeding line of said individual paragraph.

4. The apparatus of claim 1, wherein:

said source of data signals is a magnetic tape and associated reader for supplying characters and function signals, and wherein said printing means includes a single element print head and a stationary platen with said print head being moved during printing in one direction and moved during Return operations in an opposite direction.

5. The apparatus of claim 1, further comprising:

means for recognizing information categories other than paragraphs, such as sentences, or blocks of information, during operation of said first line means and said indentation means for establishing appropriate indentation levels, as required.

6. The apparatus of claim 1, further comprising:

means for rendering said first line means responsive to a selected number of Tab operations less than the number actually performed by said printer in said first line in order to thereby establish a greater indentation level for the first line of an information category than for the succeeding lines in the same information category.

7. The apparatus of claim 1, wherein:

each line in a paragraph is terminated by a single Return code, with the exception of the last line which is terminated by two Return codes in succession; and wherein said reset means includes means to reset said first line means upon recognition of said two Return Codes in succession.

8. The apparatus of claim 7, wherein:

said date source is operative to record coded combinations in a record medium in response to character signals supplied by said printing means; and wherein said printing means has a keyboard and associated circuitry for establishing character signals in response to key depressions on said keyboard, and including a key for initiating the single Return code or two Return codes in succession, as required.

9. The apparatus of claim 1, wherein:

each line in a paragraph is terminated by a single Return code, with the exception of the last line which is terminated by a single Return code and a Paragraph Identification code in sequence; and wherein said reset means includes means to reset said first line means in response to recognition of said Return and Paragraph Identification code sequence.

10. The apparatus of claim 9, wherein:

said data source has provision for recording coded combinations in response to character signals supplied from said printing means; and wherein said printing means has a keyboard and associated circuitry for establishing character signals in response to depression of keys thereon, including a key for establishing the single Return code, or the Return code and Paragraph Identification code, as required.

11. The apparatus of claim 1, further comprising:

utilization means controlled by said source and said printing means for storing data signals according to said desired format concurrently with printing operations.

12. The apparatus of claim 11, further comprising:

means in said data source for deriving code signals from a magnetic storage medium and for supplying said code signals to said printing means; and means in said utilization means responsive to signals from said printing means and said data source for recording code signals in a magnetic tape record medium.

13. The apparatus of claim 11, wherein:

said utilization means includes means for processing a magnetic tape and means responsive to signals from said data source and said printing means for recording signals according to said desired format on said magnetic tape.

14. The apparatus of claim 1, further comprising:

means for establishing an Adjust mode of operation in said apparatus in which the response of said printing means is thereby dependent upon whether or not printing is in progress in a Region area or outside a Region area and including means for selecting Tab code signals from said source or Region Tab signals to maintain proper document format;

tabulation means controlled by said selecting means for tabbing said printing means in response to conventional Tab code signals from said source and under control of Region Tab signals, as appropriate during printing;

and means in said first line means and said indentation means responsive to conventional Tab signals and said Region Tab signals as appropriate, to control the indentation format of a document.

15. The apparatus of claim 14, further comprising:

utilization means for storing data signals concurrently with operation of said data source and said printing means; and means controlled by said tabulation means to store in said utilization means signals that accurately reflect the actions of said printing means during said Adjust mode, and the format of a printed document.

16. The apparatus of claim 14, further comprising:

means to terminate response of said first line means upon recognition of the termination of said first line according to signals stored in said data source, and also upon recognition of termination of said first line due to encountering said Region area, whichever occurs first.

17. The apparatus of claim 14, wherein:

each line in a paragraph is terminated by a single Return code, except the last line which is terminated by an Adjust On-Off code sequence; and wherein said reset means includes means to reset said first line means in response to said Adjust On-Off code sequence.

18. The apparatus of claim 17, wherein:

said data source is operative to record coded combinations in response to character signals from said printing means; and wherein said printing means includes a keyboard and associated circuitry for establishing said character signals, including, specifically, keys for initiating recording of the Return code and the Adjust On-Off code sequence, as required.

19. The apparatus of claim 14, further comprising:

means responsive to recognition of special character signals in the Region area to convert said character signals to a Return operation and a desired number of Tab operations of said printing means.

20. The apparatus of claim 19, further comprising:

utilization means for recording signals on a medium concurrently with operation of said data source and said printing means, said utilization means for recording being operative to record coded signals representative of said Return and Tab operations, upon occurrence, rather than the character signals recognized in said Region area.

21. Data processing and printing apparatus for printing a document according to a desired format, comprising:
   a source of data, such as a record medium and associated reading means, for supplying signals representative of characters to be printed or functions to be performed, including Return and Tab functions;
   printing means, interconnected with said source and operative in response to data signals from said source to print characters on a document and to perform functional operations in relation to said document, including Return and Tab operations, said printing means including a plurality of left margin means for establishing related different margin indentation levels for said document;
   first line means reponsive to Tab operations in said printing means only in the first line of an information category on said document, such as a paragraph, for retaining the indentation level reached during printing of said first line;
   and indentation means for establishing an indentation level for each succeeding line of a said information category following said first line under control of said line means, with said indentation means being controlled by said first line means to select one of said left margin means prior to a Return operation, whereupon said printing means returns directly to said selected left margin means for each succeeding line in a paragraph without the necessity for intervening Tab operations.

22. The apparatus of claim 21, wherein:
   said first line means includes a counter means for retaining the number of Tab operations in the first line of an individual paragraph; and wherein
   said indentation means is responsive to setting of said counter means to select an individual left margin means.

23. The apparatus of claim 22, wherein:
   said left margin means is divided into a plurality of sets of margin means; and wherein
   logical circuitry is provided for selecting one of said sets for operation under control of said counter means.

24. The apparatus of claim 22, wherein:
   said indentation means further includes a whiffle-tree linkage arrangement and associated solenoids that are controlled by said counter means to select one of said left margin means.

25. Data processing and printing apparatus for printing a document according to a desired format, comprising:
   a source of data, such as a record medium and associated reading means, for supplying signals representative of characters to be printed or functions to be performed, including Return and Tab functions;
   printing means interconnected with said source and operative in response to data signals from said source to print characters on a document and to perform functional operations in relation to said document, including Return and Tab operations;
   program tape sensing means associated with said printing means for sensing a program tape having a coded perforation for each possible indentation level;
   first line means responsive to Tab operations in said printing means only in the first line of an information category on said document, such as a paragraph, for retaining the indentation level reached during printing of said first line;
   and indentation means for establishing an indentation level for each succeeding line of a said information category following said first line under control of said first line means, said indentation means including circuitry responsive to said first line means for establishing the required indentation level for each succeeding line in a paragraph.

26. The apparatus of claim 25 wherein:
   said first line means includes a counter means that retains the number of Tab operations occurring in the first line of an individual paragraph and that supplies count signals representative of said retained number; and wherein
   said indentation means is responsive to the code perforations in said program tape and to count signals from said counter means to establish the required indentation level for succeeding lines in said individual paragraphs.

27. The apparatus of claim 26, wherein:
   said indentation means is effective to Return said printing means upon recognition of the termination of a line in a paragraph, to thereafter sense a perforation in said program tape, and thereafter stop said Return operation; and wherein
   means are provided that are subsequently operable in the event said printing means stops past the desired location in the Return direction to tab said printing means a sufficient number of times to return said printing means to the proper indentation level as determined by said program tape.

28. Data processing and printing apparatus for printing a document according to a desired format, comprising:
   a source of data, such as a record medium and associated reading means, for supplying signals representative of characters to be printed or functions to be performed including Return and Tab functions;
   printing means interconnected with said source and operative in response to data signals from said source to print characters on a document and to perform functional operations in relation to said document, said printing means including conventional Return and Tab mechanisms to perform Return and Tab operations;
   first line means responsive to Tab operations in said printing means only in the first line of an information category on said document, such as a paragraph, said first line means including a primary counter that is operated to store the number of Tab operations during the printing of the first line of an individual paragraph for retaining the indentation level reached during printing of said first line;
   indentation means for establishing an indentation level for each succeeding line of a said information category following said first line under control of said first line means, said indentation means including a secondary counter and compare logic for establishing indentation levels for succeeding lines in said individual paragraph by count comparison of said primary and secondary counters, and said indentation means being operative to establish at least one Return operation followed by as many Tab operations as to reach the indentation level established by said first line means;

said primary counter further being operated to store the number of Tab operations during the printing of the first line of an individual paragraph;

said secondary counter and compare logic establishing indentation levels for succeeding lines in said individual paragraph by count comparison of said primary and secondary counters.

29. The apparatus of claim 28 further comprising:

means for resetting said primary counter upon recognition of the termination of each paragraph and for resetting said secondary counter upon recognition of termination of each line in an individual paragraph.

30. Data processing and printing apparatus for printing a document according to a desired format, comprising:

a source of data, such as a record medium and associated reading means, for supplying signals representative of characters to be printed or functions to be performed, including Return and Tab functions;

printing means interconnected with said source and operative in response to data signals from said source to print characters on a document and to perform functional operations in relation to said document, including Return and Tab operations;

means for establishing an Adjust mode of operation in said apparatus according to Table C in the specification with the response of said printing means thereby being dependent upon whether or not printing is in progress in a Region area or outside a Region area;

tabulation means for tabbing said printing means in response to conventional Tab code signals from said source and under control of Region Tab signals, as appropriate during printing;

first line means responsive to Tab operations in said printing means only in the first line of an information category on said document, such as a paragraph, for retaining the indentation level reached during printing of said first line, each line in a paragraph being terminated by a single Return code, except the last line which is terminated by an Adjust On-Off code sequence;

means responsive to Tab codes recognized during a non-Adjust mode of operation to render said first line means non-responsive to Tab operations of said printing means in order to thereby establish a greater indentation level for the first line of a data category than for the succeeding lines in the same data category;

indentation means for establishing an indentation level for each succeeding line of a said information category following said first line under control of said first line means;

means in said first line means and said indentation means responsive to conventional Tab signals and said Region Tab signals, as appropriate, to control the indentation format of a document;

and means to reset said first line means in response to said Adjust On-Off code sequence.

31. The apparatus of claim 30, further comprising:

means to establish said greater indentation level by recognition of the code sequence Adjust On-Off, Tab, Adjust On-Off.

32. Data processing and printing apparatus for printing a document according to a desired format, comprising:

a source of data, such as a record medium and associated reading means, for supplying signals representative of characters to be printed or functions to be performed, including Return and Tab functions;

printing means interconnected with said source and operative in response to data signals from said source to print characters on a document and to perform functional operations in relation to said document, including Return and Tab operations, said printing means having a margin rack;

first line means responsive to Tab operations in said printing means only in the first line of an information category on said document, such as a paragraph, for retaining the indentation level reached during printing of said first line, said first line means including a mechanical follower means selectively movable during printing of a first line to the farthest indentation level reached, said follower means being mounted for selective movement along said margin rack in the tab direction;

indentation means for establishing an indentation level for each succeeding line of said information category following said first line under control of said first line means;

mechanical elements associated with said indentation means, said elements carried in said printing means and responsive to the setting of said follower means to establish the indentation level required for each succeeding line of said paragraph;

and latch means associated with said follower means and said margin rack to enable said follower means to follow said printing means as tabbing occurs during a first line, said latch means being reset by said follower means upon the termination of each Tab operation in said tab direction.

33. Printing apparatus for printing a document according to a desired format, comprising:

printing means operative to print characters on a document and to perform functional operations in relation to said document, including Return and Tab operations, said printing means including a plurality of left margin means for establishing related different margin indentation levels for said document;

first line means responsive to Tab operations in said printing means only in the first line of an information category on said document, such as a paragraph, for retaining the indentation level reached during printing of said first line;

and indentation means for establishing an indentation level for each succeeding line of a said information category other than said first line under control of said first line means, said indentation means being controlled by said first line means to select one of said left margin means prior to a Return operation, whereupon said printing means returns directly to said left margin means selected for each succeeding line in a paragraph without the necessity for intervening Tab operations.

34. The apparatus of claim 33 wherein:

said first line means includes a counter means for retaining the number of Tab operations in the first line of an individual paragraph; and wherein said indentation means is responsive to setting of said counter means to select an individual left margin means.

35. Printing apparatus for printing a document according to a desired format, comprising:

printing means operative to print characters on a document and to perform functional operations in relation to said document, including Return and Tab operations;

program tape sensing means associated with said printing means for sensing a program tape having a coded perforation for each possible indentation level;

first line means responsive to Tab operations in said printing means only in the first line of an information category on said document, such as a paragraph, for retaining the indentation level reached during printing of said first line;

and indentation means for establishing an indentation level for each succeeding line of a said information category other than said first line under control of said first line means, said indentation means including circuitry responsive to said first line means and to said program tape sensing means for establishing the required indentation level for each succeeding line in a paragraph.

36. The apparatus of claim 35 wherein:

said first line means includes a counter means for retaining the number of Tab operations occurring in the first line of an individual paragraph; and wherein said indentation means is responsive to the code perforations in said program tape and to said counter means to establish the required indentation level for succeeding lines in said individual paragraphs.

37. Printing apparatus for printing a document according to a desired format, comprising:

printing means operative to print characters on a document and to perform functional operations in relation to said document, including conventional Return and Tab mechanisms to perform Return and Tab operations;

first line means responsive to Tab operations in said printing means only in the first line of an information category on said document, such as a paragraph, for retaining the indentation level reached during printing of said first line, said first line means including a primary counter that is operated to store the number of Tab operations during the printing of the first line of an individual paragraph;

and indentation means for establishing an indentation level for each succeeding line of a said information category other than said first line under control of said first line means, said indentation means including a secondary counter and compare logic for establishing indentation levels for succeeding lines in said individual paragraph by count comparisons of said primary and secondary counters, and said indentation means being operative to establish at least one Return operation followed by as many Tab operations as necessary to reach the indentation level established by said first line means.

38. The apparatus of claim 37 further comprising:

means to reset said primary counter upon recognition of the termination of each paragraph and to reset said secondary counter upon recognition of termination of each line in an individual paragraph.

39. Printing apparatus for printing a document according to a desired format, comprising:

printing means operative to print characters on a document and to perform functional operations in relation to said document, including Return and Tab operations;

first line means responsive to Tab operations in said printing means only in the first line of an information category on said document, such as a paragraph, for retaining the indentation level reached during printing of said first line, each line in a paragraph being terminated by a single Return operation, with the exception of the last line which is terminated by two Return operations in succession;

indentation means for establishing an indentation level for each succeeding line of a said information category other than said first line under control of said first line means;

and means to reset said first line means upon recognition of said two Return operations in succession.

40. The apparatus of claim 39 wherein:

said printing means has a keyboard for data to be printed and functions to be performed, associated circuitry for establishing character signals in response to key depressions on said keyboard, and including a key for initiating the single Return operation or two Return operations in succession, as required.

41. Apparatus for controlling the operation of a data processing system printer having printing mechanism for printing characters and functional mechanism for selecting the location of printing of characters, first means for sensing a first characteristic operation of the printer, second means enabled in response to the sensing of said first characteristic operation for counting a first succession of second characteristic functional operations including first storage means for storing the count of said second characteristic functional operation, comparison circuit means for counting a second succession of said second characteristic functional operations, and means limiting said second succession of second characteristics functional operations when the count of said second succession bears a preselected relationship to the count of said first succession of second characteristic functional operations.

42. The apparatus of claim 41 wherein said first characteristic is an indication of the start of a block of data having successive lines.

43. The apparatus of claim 42 wherein said first characteristic is a double carriage return.

44. The apparatus of claim 43 wherein said first means includes bistable storage means having a set state and a reset state, said storage means being switched to said set state in response to the sensing of said second carriage return.

45. The apparatus of claim 44 wherein said second means includes gate means having an input circuit connected to said bistable storage means, said gate means being enabled in response to the set state of said bistable storage means.

46. The apparatus of claim 45 wherein said bistable storage means is switched to the reset state in response to the sensing of a carriage return, said gate means being disabled in response to said reset state.

47. The system of claim 41 wherein said first storage means includes a first binary counter circuit and said comparison circuit includes a second binary counter circuit, the outputs of said first and second binary counters being compared during the generation of certain successive lines of data.

48. The apparatus of claim 47 wherein said comparison circuit means includes a plurality of gate circuits, each of said gate circuits having input circuits for receiving selected combinations of output configurations of each of said first and second counters.

49. The apparatus of claim 48 wherein said limiting means includes a skip circuit for skipping subsequent second characteristic operations after achieving coincidence of the outputs of said first and second counters.

50. The apparatus of claim 41 wherein said second characteristic operation includes tab operations.

51. The apparatus of claim 50 wherein said first characteristic is double carriage return.

52. The apparatus of claim 51 wherein said first means includes bistable storage means having a set state and a reset state, said storage means being switched to said set state in response to the sensing of said second carrige return.

53. The apparatus of claim 52 wherein said first storage means includes a first binary counter circuit and said comparison circuit includes a second binary counter circuit, the outputs of said first and second binary counters being compared during the generation of certain successive lines of data, and wherein said comparison circuit means includes a plurality of gate circuits, each of said gate circuits having input circuits for receiving selected combinations of output configurations of each of said first and second counters.

* * * * *